(12) United States Patent
Tsuei et al.

(10) Patent No.: US 7,213,748 B2
(45) Date of Patent: May 8, 2007

(54) ANONYMOUS MAILING AND SHIPPING TRANSACTIONS

(75) Inventors: Henry Tsuei, Omaha, NE (US); Stephen Wells, Springfield, NE (US); Lynn Holm Blagg, Omaha, NE (US); Peter Richard Barton, deceased, late of Englewood, CO (US); by Laura P Barton, legal representative, Englewood, CO (US)

(73) Assignee: First Data Corporation, Greenwood Village, CO (US)

( * ) Notice: Subject to any disclaimer, the term of this patent is extended or adjusted under 35 U.S.C. 154(b) by 241 days.

(21) Appl. No.: 10/710,740

(22) Filed: Jul. 30, 2004
(Under 37 CFR 1.47)

(65) Prior Publication Data

US 2004/0254893 A1    Dec. 16, 2004

Related U.S. Application Data

(63) Continuation of application No. 10/248,345, filed on Jan. 10, 2003, which is a continuation-in-part of application No. 09/326,298, filed on Jun. 4, 1999, now abandoned, which is a continuation of application No. 09/294,270, filed on Apr. 19, 1999, now abandoned, said application No. 10/248,345 is a continuation-in-part of application No. 10/259,190, filed on Sep. 27, 2002, now abandoned, which is a continuation of application No. 09/474,110, filed on Dec. 29, 1999, now abandoned, said application No. 10/248,345 is a continuation-in-part of application No. 09/474,378, filed on Dec. 29, 1999, now abandoned, and a continuation-in-part of application No. 09/471,744, filed on Dec. 23, 1999, now abandoned, and a continuation-in-part of application No. 10/284,056, filed on Oct. 30, 2002, now abandoned, which is a continuation of application No. 09/614,302, filed on Jul. 12, 2000, now abandoned, which is a continuation-in-part of application No. 09/471,744, filed on Dec. 23, 1999, now abandoned, said application No. 10/248,345 is a continuation-in-part of application No. 10/331,142, filed on Dec. 27, 2002, now abandoned, which is a continuation of application No. 09/476,175, filed on Dec. 30, 1999, now abandoned.

(60) Provisional application No. 60/165,547, filed on Nov. 15, 1999, provisional application No. 60/165,546, filed on Nov. 15, 1999, provisional application No. 60/164,169, filed on Nov. 9, 1999.

(51) Int. Cl.
*G06K 5/00* (2006.01)

(52) U.S. Cl. ...................................... 235/380; 235/375

(58) Field of Classification Search ................ 235/380, 235/449, 493, 375, 379, 382, 382.5; 705/1, 705/54, 74, 14, 26, 67; 709/204, 206, 248
See application file for complete search history.

(56) References Cited

U.S. PATENT DOCUMENTS 6,067,529 A * 5/2000 Ray et al. ..................... 705/26

(Continued)

*Primary Examiner*—Le Thien
(74) *Attorney, Agent, or Firm*—Morris, Manning & Martin LLP

(57) ABSTRACT

The anonymity of a consumer is protected in mailing and shipping transactions by utilizing an alias. A secure database is utilized to retrieve the true name and address for making mail delivery or shipment. The true name and address may be retrieved by the shipper during transit, by a disguised mailing center, or by a mail distributor. The anonymous mailing and shipping transactions may include anonymous payment transactions, such as payments made from an anonymous credit card account.

56 Claims, 28 Drawing Sheets

U.S. PATENT DOCUMENTS

| | | | |
|---|---|---|---|
| 6,161,129 A * | 12/2000 | Rochkind | 709/206 |
| 6,591,291 B1 * | 7/2003 | Gabber et al. | 709/206 |
| 6,592,044 B1 * | 7/2003 | Wong et al. | 235/493 |
| 6,675,153 B1 * | 1/2004 | Cook et al. | 705/74 |
| 6,711,555 B1 * | 3/2004 | Sanders | 705/406 |
| 2002/0013739 A1 * | 1/2002 | O'Donnell et al. | 705/26 |
| 2002/0023023 A1 * | 2/2002 | Borecki et al. | 705/26 |
| 2002/0095298 A1 * | 7/2002 | Ewing | 705/1 |
| 2003/0120608 A1 * | 6/2003 | Pereyra | 705/64 |
| 2003/0130857 A1 * | 7/2003 | Matsuo | 705/1 |
| 2003/0233409 A1 * | 12/2003 | Awada et al. | 709/206 |
| 2004/0083190 A1 * | 4/2004 | Sanders | 705/404 |
| 2004/0181670 A1 * | 9/2004 | Thune et al. | 713/176 |
| 2004/0193489 A1 * | 9/2004 | Boyd et al. | 705/14 |
| 2004/0193685 A1 * | 9/2004 | Proehl | 709/204 |
| 2004/0215588 A1 * | 10/2004 | Cornelius | 707/1 |
| 2004/0260653 A1 * | 12/2004 | Tsuei et al. | 705/54 |
| 2005/0074112 A1 * | 4/2005 | Timmins | 379/218.01 |
| 2005/0097225 A1 * | 5/2005 | Glatt et al. | 709/248 |
| 2005/0147221 A1 * | 7/2005 | Aoki | 379/88.22 |

\* cited by examiner

Table 1: Matching Database

| Field Name | Data type | Description |
|---|---|---|
| PrimaryAccountNumber | AlphaNumeric | This field will contain the account number for any primary account that has a Alias account. |
| AliasAccountNumber | AlphaNumeric | This field will contain the account number for the Alias account for the given Primary account number. |
| AliasBoxNumber | Numeric | This field will contain the alias box number for its Alias account. This number will be generated by a special algorithm. |
| ActivePrimaryAccount | Boolean | This flag if set, indicates that the primary account is active and if reset, indicates that it is not. |
| ActiveAliasAccount | Boolean | This flag if set, indicates that the Alias account is active and if reset, indicates that it is not. |
| ProcessingRequired | Boolean | This flag if set, indicates that a non-mon has been generated for this account. Hence it need not be considered again for sending to the host in the next cycle. |
| LastUpdateDateTime | DateandTimeStamp | This field indicates the date and time of the last update done on this account. |
| PrimaryCreditLine | Numeric | This field will contain the current value of the maximum available credit for the Primary account. |
|  | Numeric | This field will contain the current value of the maximum available credit for the Alias account. |
|  | AlphaNumeric | This field will contain the issuer code for the Cardholder. |
|  | DateStamp | This field will contain the date on which the Alias account was created. |
|  | DateStamp | This field will contain the date on which the Alias account was terminated. |

FIG. 13

Table 2: Temporary Database Fields

| Field Name | Data Type | Description |
| --- | --- | --- |
| IsNew | Boolean | This field will decide if the Alias account to be created is for a new or an existing Primary Account |
| DocumentTrackingNumber | AlphaNumeric | This field will contain the document tracking number for a new primary account for which an Alias account has to be created |
| AliasName | AlphaNumeric | This field will contain the alias name for the Alias account. The name will be selected from the available names list. |
| AliasAddress | AlphaNumeric | This field will contain the alias address for its Alias account. It will be generated by a special algorithm. |
| PrimaryAccountNumber | AlphaNumeric | This field will contain the account number for any primary account for which an Alias account has to be created. |
| RealName | AlphaNumeric | This field will contain the real name for its primary account. |
| RealAddress | AlphaNumeric | This field will contain the real address for its primary account. |
| IssuerCode | AlphaNumeric | This field will contain the issuer code for the Cardholder. |
| IsAccountCreated | Boolean | This flag if true will indicate that the Alias account has been created. |

FIG. 14

Table 3: Account Block Database

| Field Name | Data type | Description |
|---|---|---|
| IssuerCode | AlphaNumeric | This field will contain the issuer code. |
| IssuerName | Alpha | This field will contain the issuer name. |
| StartBlock | Numeric | This field will contain the start of the account block for the current Issuer. |
| End Block | Numeric | This field will contain the end of the account block for the current Issuer. |
| LastAccountNumber | Numeric | This field will contain last account number used for the current Issuer. |

FIG. 15

Table 4: Issuer Database

| Field Name | Data type | Description |
|---|---|---|
| IssuerCode | AlphaNumeric | This field will contain the issuer code. |
| PrimaryCreditProportion | Numeric | This field will store the percentage of the Primary credit line of a cardholder. |
| AliasCreditProportion | Numeric | This field will store the percentage of the Alias credit line of a cardholder. |
| ActiveDate | DateStamp | This file will indicate the date from which the change of Credit line has to come in effect. |

FIG. 16

Table 5: Mail Redirection Database

| Field Name | Data Type | Description |
| --- | --- | --- |
| AliasBoxNumber | Numeric | This field will contain the alias box number for its Alias account. This number will be generated by a special algorithm. |
| PrimaryAccountNumber | AlphaNumeric | This field will contain the Primary account number for the Alias account. |
| RealName | AlphaNumeric | This field will contain the real name for its primary account. |
| RealAddress | AlphaNumeric | This field will contain the real address for its primary account. |
| AliasName | AlphaNumeric | This field will contain the alas name for the current Alas account. |
| AliasAddress | AlphaNumeric | This field will contain the alias address for its Alias account. |

FIG. 17

ANONYMOUS MAILING AND SHIPPING TRANSACTIONS

CROSS REFERENCE TO RELATED APPLICATIONS

The present application is a continuation of Tsuei et al. U.S. patent application Ser. No. 10/248,345 filed Jan. 10, 2003, pending, which is: (1) a continuation-in-part of Peter Barton U.S. patent application Ser. No. 09/326,298 filed Jun. 4, 1999, abandoned, which is a continuation of Peter Barton U.S. patent application Ser. No. 09/294,270 filed Apr. 19, 1999, abandoned; (2) a continuation-in-part of Peter Barton U.S. patent application Ser. No. 10/259,190 filed Sep. 27, 2002, abandoned, which is a continuation of Peter Barton U.S. patent application Ser. No. 09/474,110 filed Dec. 29, 1999, abandoned, which claims priority to Peter Barton U.S. provisional patent application Ser. No. 60/165,546 filed Nov. 15, 1999, expired; (3) a continuation-in-part of Peter Barton U.S. patent application Ser. No. 09/474,378 filed Dec. 29, 1999, abandoned, which claims priority to Peter Barton U.S. provisional patent application Ser. No. 60/165,547 filed Nov. 15, 1999, abandoned; (4) a continuation-in-part of Peter Barton U.S. patent application Ser. No. 09/471,744 filed Dec. 23, 1999, abandoned; (5) a continuation-in-part of Peter Barton U.S. patent application Ser. No. 10/284,056 filed Oct. 30, 2002, abandoned, which is a continuation of Peter Barton U.S. patent application Ser. No. 09/614,302 filed Jul. 12, 2000, abandoned, which is a continuation-in-part of Peter Barton U.S. patent application Ser. No. 09/471,744 filed Dec. 23, 1999, abandoned; and (6) a continuation-in-part of Henry Tsuei et al. U.S. patent application Ser. No. 10/331,142 filed Dec. 27, 2002, abandoned, which is a continuation of Henry Tsuei et al. U.S. patent application Ser. No. 09/476,175 filed Dec. 30, 1999, abandoned, which claims priority to Henry Tsuei et al. U.S. provisional patent application Ser. No. 60/164,169 filed Nov. 9, 1999, abandoned. Priority is claimed in the present application to each of these applications, and each is hereby expressly incorporated by reference herein.

BACKGROUND OF INVENTION

1. Field of the Invention

The field of the invention relates to systems and methods for facilitating, providing, and/or enabling anonymous transactions. In particular, the field of the invention relates to anonymous authentication of customer profile information to an authorized requester, including authentication of customer profile information related to children, and to consumer privacy protection when ordering merchandise by mail by not having to reveal consumer personal information to the merchant and/or shipper.

2. Description of the Related Art

Consumer privacy is becoming a focus of major public interest, especially as computing capacity increases and data handling and storage become easier and less expensive, and information databases are assembled to host a myriad of transactional information. This information, which may be gathered from a number of sources, is stored, categorized and sold. A prime information target is the retail transaction.

For example, for each credit card transaction, an issuer bank's computer system can store the merchant's name, the product purchased, and the amount of the transaction. The issuer bank or credit card company can use the collected information to determine the spending habits of their credit cardholders and then either use that information in its own business or make it available to others. In addition to the information stored in the issuer bank's computer system, as a consequence of a credit card transaction, the individual merchants receive information from the issuer bank about the credit cardholder. This information can be used to provide targeted marketing directed to the credit cardholder, or to provide others with information about the consumer's buying habits.

Membership cards, club cards and credit cards which link a transaction to an individual's database, reveal the purchase, the time of day of the purchase and the retail outlet. This information is then tied to a demographic which is sold to the direct marketing industry. In many cases these databases actually invade a person's privacy and are almost transparent to the unwitting consumer.

The consequences associated with the availability of an individual's spending information range from the merely annoying to the serious. At a minimum, an individual may receive more targeted junk mail than may be desired. More seriously, the same information that is used to target the individual for junk mail can also be used to target the individual for private or governmental harassment. For example, an issuer bank may choose to sell its customer list, with indicia that identifies all credit cardholders that have purchased sporting equipment, to retail sporting good companies. These companies may then inundate a credit cardholder with mail or other forms of advertisements. In a more serious situation, the issuer bank may sell its list of customers that have purchased certain goods (for example, furs or steaks) to activist groups that oppose the purchase of such items. These groups may then use the customer list to expose the credit cardholder to all sorts of harassment and perhaps physical injury.

One way an individual can avoid this problem is to pay for everything with bearer notes such as cash, since nothing on a bank note indicates who its owner is or was. This same property, however, makes cash fungible for both the owner and the thief. It is both easy to lose and easy to negotiate. For these reasons, few people desire to carry a large amount of cash. One way of solving this difficulty is to use electronic cash, as described in David Chaum, "Security without Identification: Transaction Systems to make Big Brother Obsolete," Communications of the ACM, vol. 28, no. 10, pp. 1030–144, October, 1985. When electronic cash is used in an automated transaction, a purchase cannot be associated with a customer. The scheme, however, may be insecure against fraud; see Steven H. Low, et al., "Collusion in a Multi-Communications Protocol for Anonymous Credit Cards" submitted to IEEE/A CM 50, Transactions on Networking. In addition, since the electronic cash is given to a customer, a means is needed to prevent the individual from duplicating and spending it over and over again.

Apart from the opportunity to gather consumer information that arises from the use of a credit card or the like, consumer information also may be gathered when shipping information is provided to a merchant or other third party. It is therefore also desirable to protect the identify of consumers when ordering merchandise over the telephone or the Internet, or by any other means, when such merchandise is to be shipped to the residence or business of the consumer. Currently, the consumer generally has no choice but to give a proper mailing address to the merchant in order to receive the shipped goods. One solution to this problem is to use post office boxes. However, this solution is often expensive, inconvenient and/or requires the use of the consumer's real name.

Accordingly, a need exists for systems and methods for performing transactions that have the convenience and safety of card transactions, such as credit card transactions, and the anonymity of cash transactions. A need further exists for systems and methods for protecting the identity of consumers' names and addresses when a transactions include shipping or mailing to consumers. On or more of these needs are met by one or more embodiments of the present invention.

SUMMARY OF INVENTION

The present invention comprises systems and methods for protecting consumer information by providing for, facilitating, and/or enabling anonymous transactions.

In systems and methods, a service provider or merchant representing an information requester is able to authenticate customer related information and/or records which reside in a secure, offline database without the true identity of a customer being revealed. In these systems and methods, the present invention provides an automated, inexpensive system and method for the confirmed request, processing and confirmed transfer of anonymous customer or subscriber related authentication among service providers and/or information requesters. These systems and methods preferably utilize a software and hardware system to facilitate centralized offline customer identity and business information authentication, while maintaining the anonymity of the customer. This advantageously allows a service provider or information requester to easily and inexpensively authenticate customer related business information without the true identity of the customer being revealed to the service provider. Thus, a benefit of these systems and methods is that the actual transaction is not associated with the true identity or demographics of the customer.

Another benefit of these systems and methods is that a highly efficient system and method is provided for requesting, processing, and anonymously authenticating customer or subscriber related identification and business information between the service provider or information requester and the secure, central database repository. In one aspect of these systems and methods, this comprises an information hub which includes an interactive server and a database. For example, in one embodiment, the database contains a lookup table which blinds the database from the server. Preferably, the coded or addressed anonymous customer identification confirmation or authentication system of the present invention employs an offline central consumer information database or repository, in communication with service providers or information requesters.

These systems and methods also provide for the processing and authentication of requested, specifically identified customer profiles, without identifying the true identity of the customer, and without revealing any business or transaction information to the service provider or information requester. In a preferred embodiment, the authenticity of the information requester is verified prior to responding. Thus, one feature of these systems and methods is that there is a blinding or "bunkering" of any attempt by unauthorized information requesters to cross check against a known transaction to match the alias of the customer or subscriber with the true identity of the customer or subscriber.

Another advantage of these systems and methods is that a service provider or information requester having a system authorization code can electronically request, process and confirm the validity of an anonymous customer's information and/or records. This can be done, for example, from a secure data repository by means of a hardware/software system. Preferably, the hardware/software system is comprised of an offline database and a central server comprising an information processing hub. In this example embodiment, the information processing hub communicates with each service provider or information requester via a communication link.

A feature of these systems and methods is that a confirmed authentication of uniquely identified and stored information between an authorized requester and the database repository is triggered by the use of a unique, assigned alias identifier. For example, the requested subscriber or customer records and/or business information are uniquely identified by means of an alias identification of the customer, which can be alphanumeric, digital, analog or the like. In one embodiment the system can authenticate the existence of the customer alias as relating to the true identity of an individual subscriber.

In another embodiment, authenticated coded triggers are used to release a predetermined portion of the data including, for example, the true identity of the subscriber, to an information requester having authorization for that clearance. In accordance with this embodiment, preferably the information is encrypted. In one aspect, an alphanumeric code is used to identify files within the uniquely addressed customer information profiles. In a preferred embodiment, the system of the present invention confirms requests for authentication to maintain the integrity of the system and the anonymity of the subscriber or customer. In another embodiment the authentication is protected by encryption and a digital signature of the information requester or by use of an authentication code such as a PIN or the like.

In a preferred embodiment, personal or business records and/or information related to a particular subscriber maintained within the offline database can include at least part of at least one subscriber's profile. In one aspect subscriber profiles consist of the subscriber's physical address, social security number, credit limits, email address, and the like.

In accordance with another preferred embodiment, a single centralized offline database or repository is provided in communication with a central processing server. For example, the central processing server acts as a "gatekeeper" to maintain the secrecy of the customer's true identity. In another embodiment, a plurality of servers communicate with the service providers and in turn with a central server in a multi tiered system.

In another aspect of these systems and methods, a computer implemented method is disclosed for providing authentication to an authorized information requester. For example, the information requester may b provided with authentication of the existence of coded, uniquely identified personal business type records and/or information relating to a particular anonymous subscriber or customer. In a preferred embodiment, the records or information are contained in a "blinded" offline database that communicates with each authorized information requester by means of a central processing server. The method, for example, may be accomplished by the subscriber information requester initially generating an authorized formatted request for authentication of the uniquely identified records and/or information related to a particular anonymous subscriber or customer using an alias that retains the anonymity of the subscriber or customer. The method also includes transmitting the request to a confirming central processing server with access to an offline database via the communication link. Additionally, the method includes receiving the formatted request, authenticating the authorization of the information requester and confirming receipt of the formatted request by the central system database. The method also includes processing the request of the subscriber or information requester by blinded communication with the database, generating a formatted response in the database authenticating the alias or denying the alias, transmitting the response, and formatting a server response to the service provider or information requester via the communication link. In one example embodiment, the formatted response to the subscriber or information requester can comprise a denial of the request, an authentication or an authenticated informational compliance. Additionally, the informational compliance can be full or partial. In a preferred embodiment, the requester is logged into the central server. For example, if the information requester is not authorized to address the offline database, the identification of the customer or subscriber is blocked and the information requester is denied further communication. In this example, such a formatted response is a denial of authentication.

In accordance with preferred embodiments of these systems and methods, a medium is provided which contains a unique identification that is either anonymous or an alias with respect to the true identity of the subscriber and/or customer. For example, the medium can be in the form of a standard plastic card with a magnetic strip containing the encoded information or alias information, or it can be in the form of a smart card that has an encoded chip. Thus, for example, the medium can be a credit card issued by, for example, American Express, VISA or MasterCard. Alternatively, in addition to the card, there may be an alias I.D., such as a picture I.D., that authenticates the anonymous code for the user. In an example embodiment, a personal identification number ("PIN") can be used such that the user of the medium would be required to enter a PIN on a keypad or the like, to authenticate the anonymous code. A benefit in these examples is that the user of the medium remains totally anonymous to the service provider or requester. Also in these embodiments, the service provider authenticates the transaction by means of an electronic connection such as telephone wires or the Internet to one or more centrally based processing servers in communication with the offline database as previously described.

In accordance with other systems and methods of the present invention, a credit or debit card that makes limited purchasing power available to children is provided (herein referred to as a "Kid Card"). Preferably, the transactions performed with the Kid Card are anonymous. A child that purchases an item over the Internet, for example, can use the Kid Card to pay for the item. When real time approval is sought by the entity processing the transaction, rather than using true identity data to authenticate the transaction, an alias set of information is used. This alias set of information is compared to an offline secure database that compares the alias information to the true identity data and authenticates the transaction. In this example, the true identity of the purchaser is thus never compromised and therefore never available to the processing company for inclusion on a demographic list or the like. In features of these systems and methods, the products available for purchase with the Kid Card are subject to parental control and children are guided by a hosting entity through an Internet shopping experience by presentation of selected Web pages.

Other systems and methods of the present invention are specifically directed to protecting the identity of a credit cardholder, whereby the cardholder can enter into credit card transactions in complete anonymity. Since the cardholder's identity is protected, the cardholder has the freedom to purchase any goods or services without worrying about receiving unwanted mailings or being personally harassed. Briefly described, these systems and methods allow the establishment of two credit cards with a line of credit that is split across two accounts, i.e., a primary account and an alias account. The primary account is a conventional credit card account constructed in a credit card processing system using the factual information provided by an applicant for a credit card. The primary account is the account used for reporting and investigating the applicant's credit worthiness and establishing credit. The alias account is constructed using security information submitted by the credit card applicant, and information from an associated primary account. The alias account is constructed in a secure database and is identified with an alias name and address. The secure database is preferably maintained in a secure facility or vault operated by an independent third party, for example a privacy foundation that is not beholden to credit card companies or to merchants. The vault maintains the identity of the alias account holders; the identities are not disclosed to others except under certain limited conditions. Once primary account is constructed in the credit card processing system, the primary account information is then transferred to the vault. The vault matches the transferred primary account information with the associated security information submitted by the applicant. As a result of matching the primary account and security information, an alias account is constructed in the vault. The vault then transfers the alias account information to the credit card processing system, and the credit card processing system creates a corresponding alias account. The credit card associated with the primary account is used and processed like any other credit card. The credit line for the primary account is established as some portion of the credit line approved during the application process. A remaining portion is assigned to the alias account.

The credit card associated with the alias account is also used like any other credit card, but a number of the credit card processing functions are handled in a different manner from other credit card accounts. The credit card transactions associated with the alias account are processed on the credit card processing system with the alias information (i.e., alias name and address). Therefore, the anonymity of the cardholder is maintained. When the real identity of the cardholder is required to support a credit card processing function, for example issuing the credit cardholder a statement for billing purposes, a mailing address is retrieved from the associated alias account in the vault and associated with the statement for the alias account. For example, the alias account statement is transferred to the secured database or facility to have the real identity of the cardholder determined before the statement is mailed.

In yet further systems and methods of the present invention a means is provided for consumers to order merchandise via telephone, the Internet, or any other means, to be shipped to their business or residence, without having to reveal their true address to the shipper and/or merchant. This is accomplished by relabeling the packages with the true address of the consumer sometime after the packages are shipped by the merchant. This is preferably, but not necessarily, accomplished in conjunction with anyone of the anonymous transaction systems and methods set forth above using one of at least two techniques. The first technique involves shipping the packages to a temporary location where the true address is relabeled on behalf of the consumer using information from the offline database. The second technique involves having the shipping company relabel the packages while in transit by communicating through a secure network connection to the offline database. In response to a valid authorization request, the offline database returns the true address to the shipper. Preferably, this process is automated and is implemented using wireless technology while the package is in transit.

Finally, other systems and methods of the present invention include a private facility for mailings of packages and items, wherein these packages and items are shipped to a temporary location where the true address is relabeled on behalf of the consumer. In these systems and methods, The relabeling is preferably, but not necessarily, accomplished in conjunction with anyone of the anonymous transaction systems and methods set forth above using one of at least two techniques using information from the offline database. Preferably the private facility administers the database, registers the customers, and assigns the mail codes to the registered customers before this anonymous mailing and relabeling service is started. Alternatively, the shipping company preregisters with the private facility that administers the database and receives access to a secure network connection with the offline database. The shipping company in possession of a package labeled with a mailing code sends a valid authorization request, including the mailing code, to the offline database through the secure network connection. The private facility verifies the authorization request and returns the true address of the customer to the shipping company, thus enabling the shipping company to deliver the package directly to the customer. Preferably, this process is automated and is implemented using wireless technology while the package is in transit.

In a related aspect of these systems and methods, the present invention provides a means for a person or entity to receive mail or parcels from a sender (e.g., a merchant) anonymously. For example, the contact with the sender can be via telephone, the Internet, or any other means. The sending may, but need not be, in connection with a commercial transaction (e.g., a sale or purchase) or involve the shipping of ordered goods as described above. Thus, the item can be shipped to their business or residence, without having to reveal their true address to the shipper and/or merchant. The mail or parcel is shipped to a mailing code and relabeled with the true address of the consumer sometime after shipment by the sender. In cases where the item is sent as part of a commercial transaction, this is preferably accomplished in combination with the anonymous transaction systems and methods set forth above.

In embodiments of the systems and methods involving anonymous or disguised mailing or shipping, the mailing code assigned can include limited non identifying information. For example, the code may be formatted similarly to a zip code, in that the code or a portion of the code corresponds to a geographic area or political subdivision. Thus, for example, the code may correspond to a postal zip code area or group of zip code areas, a city, a county, a state, or other suitable area. Also, the readdressing may be physical or electronic, or a combination of the two. Thus, for example, the readdressing may be by affixing or otherwise physically associating, a legible address with or without name, by affixing or otherwise physically associating a machine readable form of the address, e.g., a bar coded or magnetic strip address, by affixing or otherwise physically associating a translatable, machine readable address (e.g., that is translated within a special or general purpose computer), by affixing or otherwise physically associating an access identifier enabling electronic access to sufficient identifying information (preferably on screen or other display) for delivery to the customer or other intended recipient, or by using the mailing code to allow (preferably with additional authorization code) remote electronic access to specific delivery information, preferably during the course of a delivery run. For example, delivery information may be displayed on a computer in a delivery truck or on a handheld computer. Remote access may be by any suitable means, e.g., by telephone (preferably mobile telephone) and/or via satellite communications link, which may involve internet transmission.

These and other features, and advantages of the present invention may be more clearly understood and appreciated from a review of the following detailed description and by reference to the appended drawings and claims.

BRIEF DESCRIPTION OF DRAWINGS

FIG. 13 is a table setting forth fields contained in a Matching Database in a preferred embodiment of the present invention.

FIG. 14 is a table setting forth fields contained in a Temporary Database in a preferred embodiment of the present invention.

FIG. 15 is a table setting forth fields contained in an Account Block Database in a preferred embodiment of the present invention.

FIG. 16 is a table setting forth fields contained in an Issuer Database in a preferred embodiment of the present invention.

FIG. 17 is a table setting forth fields contained in a Mail Redirection Database in a preferred embodiment of the present invention.

DETAILED DESCRIPTION

Figure 1:
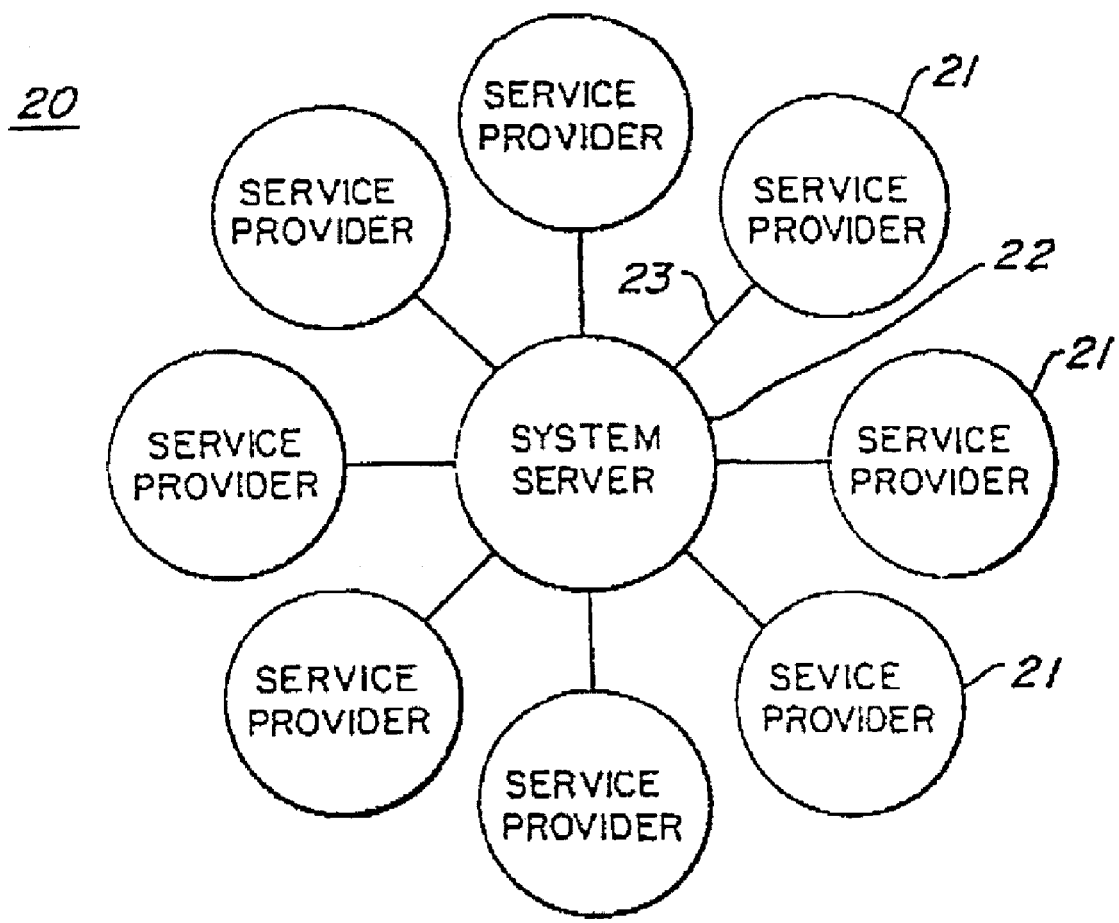
FIG. 1 is an example of a schematic view of an information flow model that can be used in accordance with one embodiment of the present invention.

I. Preferred Systems and Methods for Authentication in Anonymous Transactions

After reading the following description, it will become apparent to one of ordinary skill in the art how to implement the invention in alternative embodiments and alternative applications. Moreover, other examples for blinding interaction and transaction will readily come to mind, once the inventive aspect of the instant invention is understood. Although the instant system can be used to blind customer profiles from a service provider for a number of applications, credit card transactions will be used as a specific example for ease of understanding. As such, this detailed description of a preferred and alternative embodiments should not be construed to limit the scope or breadth of the present invention, which be used, for example, with telephone cards, frequent flyer club cards, grocery store cards and the like.

Definitions

For purposes of this Section I, a "Subscriber" is an entity who subscribes to a transaction based service and whose data is in the offline database.

A "Service Provider or Information Requester" is an entity with which the particular Subscriber is consummating a transaction. Service Providers could be, for example, local retailers, banks, travel agencies and the like.

"Subscriber ID" is an alias system identifier that can be used as an alias or a code to uniquely identify a particular Subscriber and corresponding records.

"Subscriber Profile" or "Service Profile" means customer related business information and/or records such as a particular Subscriber's financial information, or address.

"Subscriber Related Business Information Request" is a request from a Service Provider for authentication of all or part of a particular Subscriber Profile or Service Profile. The Profile preferably contains readable system code allowing the system to verify that the requester is part of the system.

A "Subscriber Related Business Information Request Response" is a response to a Subscriber Related Business Information Request. For example, the Response could be a listing of all or part of a particular Service Profile, an authentication of a Subscriber's identity, or a denial of such information. In a preferred embodiment, the Response is encrypted. A Subscriber Related Business Information Request Response can also include a "Transaction Authorization" or "Confirmation Request" such as used in the credit card industry.

Briefly described, and in accordance with a preferred embodiment in operation, an information hub housing a central server receives a request for authentication from a service provider or information requester. In this example embodiment, the central server verifies that the service provider or information requester is authorized to obtain authentication for the transaction or the requested information from the database. Upon verification of the validity of the request, the central server queries the database for authentication of the anonymous customer. The database contains, for example, a lookup table that links the anonymous identification of the medium card holder, for example, a credit card holder, to the true identity of the card holder. In this example embodiment, the lookup table functions a barrier between the system traffic and the stored identity information. Continuing with the example, if the information requested matches the search in the lookup table, a verification response is generated by the central server to authenticate the transaction.

Turning now to FIG. 1, there is shown a schematic of a preferred embodiment of the alias method and system 20 of the instant invention. This preferred embodiment comprises a number of Service Providers or Information Requesters 21, each communicating with a system server/database 22 by means of a preexisting communication link 23, such as the public telephone system. A Subscriber Profile data and/or authentication is relayed to a requesting Service Provider 21 through the system server/database 22, in computer accessible code, via the communications link 23. The information flow is virtually instantaneous, and the response information puts the necessary information in the hands of the Service Provider or Information Requester 21. This information is preferably delivered in a usable form, expediting the transaction. The system server/database 22, for example, represents a centralized information hub having a preexisting communication link 23 for the purposes of receiving, authenticating and transmitting information to Service Providers 21. In an alternative embodiment, the central information hub comprises more than one physical element. For example, a multi tiered server system (not shown) may be practical in some applications. Furthermore, a public communications system is not necessary to link the system server database 22 to the Service Providers 21. The communications link 23 may alternatively be a private leased line, a local area network, cable TV network, or the Internet. In this preferred embodiment, the system server/database 22 comprises a server and an offline database as more fully described below in relation to FIG. 2.

Figure 2:
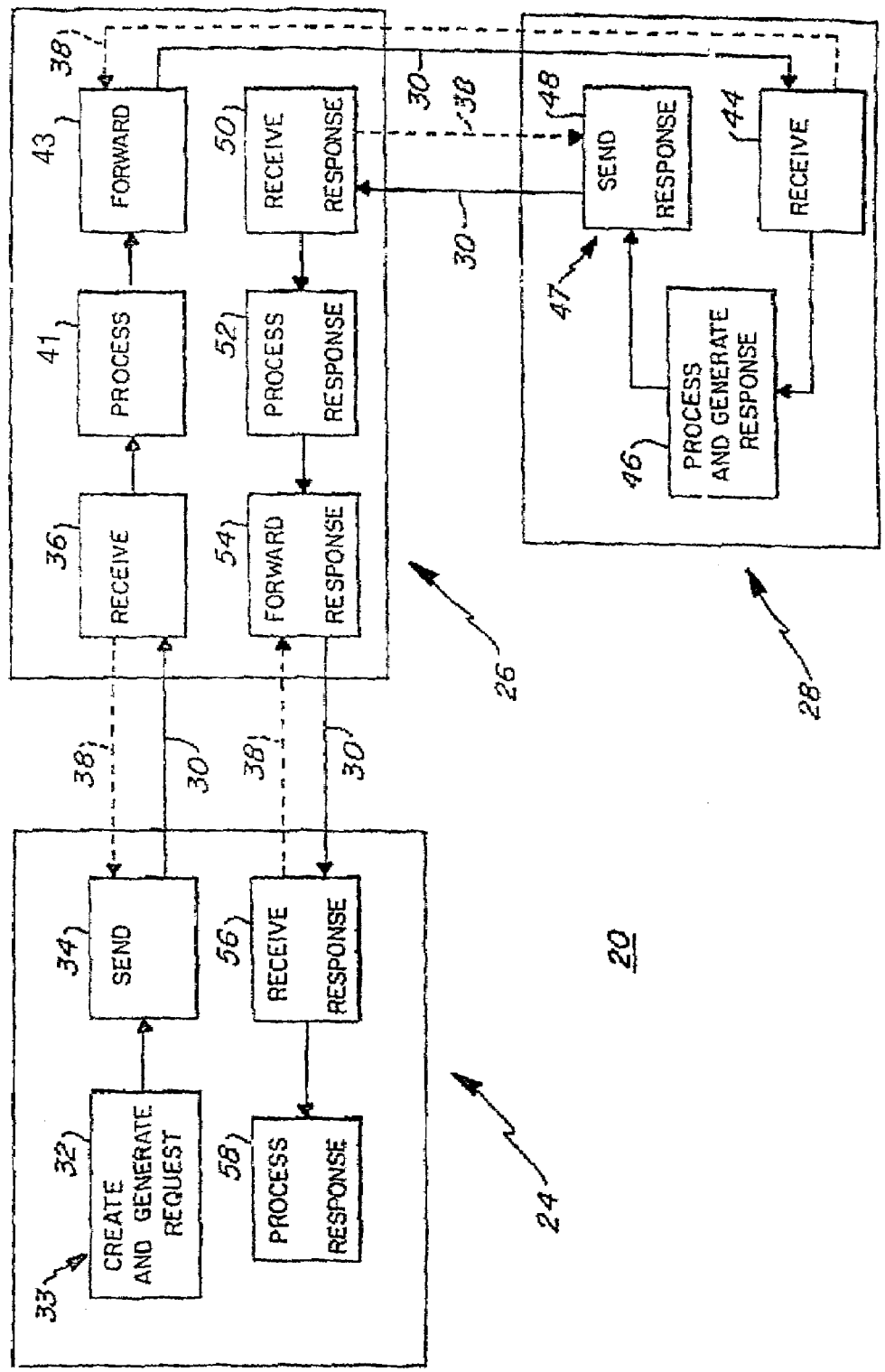
FIG. 2 is an example of a schematic view of an information flow model that can be used with one embodiment of the present invention having a central processing server and an offline database.

Turning to FIG. 2, there is shown an example of a preferred information flow of the alias method and system 20. In FIG. 2, the transfer of a Subscriber's authentication or Subscriber Profile information between the Service Provider or Information Requester and the offline centralized database is shown. Preferably, the system server is accessible to all Service Providers 21. For example, the Service Providers 21 can access the System Server 22 by merely addressing the alias customer information profile by means of the Service Provider's identification through the communication link.

As further shown in FIG. 2, the system 20 comprises an authorized Service Provider 24, a System Server 26, an offline database 28, and an interconnecting communications link 30. The communications link 30 connects the Service Provider 24 and database 28 with the server 26. Preferably, all communication takes place over communications link 30. The process boxes or units in FIG. 2 represent execution steps for creating, transferring and confirming information between Service Provider 24, server 26, and offline database 28, all of which is described now in greater detail.

FIG. 2 Data Flow: Generation of Request for Subscriber Authentication or Information First, Service Provider or Information Requester 24, by means of unit process 33, generates a Subscriber Related Business Information Request 32. The request is generated in a specified format and includes an informational header. This header includes, for example, the Subscriber's alias, PIN or other anonymous inquiry keys and information. Additionally, the header may include address information and a formatted message portion comprised of, for example, the date, time, and amount of the transaction. The data used to generate the Subscriber Related Business Information Request 32 can be provided in more than one way. A first example of a method for creating the Subscriber Related Business Information Request 32 is by using an application Graphical User Interface, preferably written in Java. In one embodiment, the Graphical User Interface provides the user with input fields for all elements of the Subscriber Related Business Information Request 32, including input fields for the Service Provider 24. Additionally, the Graphical User Interface can perform input validations, convert the input data into a binary stream using Java serialization, and store the document. For example, the document can be stored in binary object form in the Service Provider or Information Requester's 24 relational database AA second example of a method for creating the Subscriber Related Business Information Request 32 is through the use of the Client Integration Subsystem. In a preferred embodiment, the Client Integration Subsystem is a configurable set of services and infrastructure. These services can be written, for example, in the C++ and Java programming languages, which allow an organization to "plug in" their existing systems to automatically generate a Subscriber Related Business Information Request 32 in accordance with the present invention. This, for example, is the coded information in a credit card transaction that authorizes a merchant's request and identifies the return path I In either example embodiment, the resulting document is stored in the Service Provider or Information Requester's 24 relational database coupled with additional document information. Such information could include date and time stamps, document state information, creating user identification, and the like. Furthermore, this information could be linked to a particular Subscriber Related Business Information Request 32 and simultaneously stored along with the Subscriber Related Business Information Request 32. Preferably, the date and time stamps are used to determine whether the request is sent and received within the industry allotted time period. This, for example, would prevent hacking through the use of different requester locations attempting to obtain client Subscriber Related Business Information in the offline database 28. Additionally, the user identification information is preferably used by the System Server 26 and the offline database 28 to help verify the validity of the Subscriber Related Business Information Request 32. This can be done, for example, by determining that the Subscriber Related Business Information Request 32 was sent by an authorized Service Provider or information Requester 24 I In this example, when the Subscriber Related Business Information Request 32 is completed by entering the necessary data, it is marked as ready to be sent. Conversely, if the Subscriber Related Business Information Request 32 is not completed, for example, due to missing data, it is marked for review and stored until the Subscriber Related Business Information Request 32 data is entered into the Subscriber Related Business Information Request 32. Preferably, this prevents overriding the system by not having a complete request. This is important, for example, when service information provider or information requesters 24 are given security codes allowing access to differing information and/or levels of information.

FIG. 2 Data Flow: Send Subscriber Business Information Request from Service Provider or Information Requester to the System Server In a preferred embodiment, once created, the Subscriber Related Business Information Request 32 is prepared to be sent to the System Server 26 by means of unit process 34 via communications link 30. An example of the aspects of unit process 34 include application of the digital signature, data encryption, alias and attaching the routing information. For example, the Subscriber Related Business Information Request 32 carrying the alias identifier is encrypted by an encrypting service. In one example embodiment, the encrypting service utilizes Pretty Good Privacy encryption with the System Server's 26 public key. In one embodiment, an online service can be used or alternatively, the software can be downloaded from www.MIT.edu for inclusion in process 34. Continuing the example, the document is digitally signed using the Service Provider's 24 private key. Preferably, this private key has been previously configured by the system administrator. The Subscriber Related Business Information Request 32 is sent to the server 26 using communication link 30. Various systems can be used to connect the Service Provider or Information Requester 24 to the System Server 26. For example, the message can be sent either via X400 protocol or using a virtual private network protocol. Preferably, the choice is based on the configuration implemented by the generating entity's system administrator, based on system requirements for response times and cost of implementation. Preferably, the data is sent over an existing communication system such as the Internet or a Virtual Private Network. A lookup of the System Server 26 destination address in the Service Provider or Information Requester's 24 database is performed. Preferably, the process 34 appends the appropriate routing information for the transmission type used by the generating entity system. A fully qualified Internet address is an example of appropriate routing information.

FIG. 2 Data Flow: Receipt of Subscriber Related Business Information Request by System Server The Subscriber Related Business Information Request 32 is received by Server 26 from Service Provider or Information Requester 24. This is accomplished by means of unit process 36 via communications link 30. In one embodiment, the system is activated by data being received. Preferably, unit process 36 includes steps for receiving the message, authenticating the signature on the message and responding to the sender if the signature is valid. For example, upon receipt of a Subscriber Related Business Information Request 32, the server 26 first logs the receipt and then authenticates the digital signature. Within process 36 an interim file representation of the document is created, after extracting the document from the transport mechanism and stripping off header information. The file is then stored in a system defined, file system directory. Subsequently, the document digital signature is verified using the Pretty Good Privacy signature authentication service based on the sender's public key, which is retrieved via the previously configured information in the Pretty Good Privacy security database. Continuing the example, if the signature is authentic, the Subscriber Related Business Information Request 32 is decrypted using the Pretty Good Privacy decryption software and stored. Preferably, a verification of receipt message 38 (shown in dotted lines) is sent back to Service Provider or Information Requester 24 via the communication link 30. In a preferred embodiment, the Service Provider or Information Requester 24 verifies the sender as the System Server 26. In an example embodiment, the validity of the Subscriber Related Business Information Request 32 is based on several criteria. Preferably, if the Subscriber Related Business Information Request 32 is not authentic, the Request 32 is not honored. For example, in one embodiment, the invalid Request 32 is first returned to the Service Provider or Information Requester 24 via the Communications Link 30. Then, a message is sent noting the receipt of an invalid Subscriber Related Business Information Request 32. Furthermore, receipt of the invalid Subscriber Related Business Information Request 32 is logged by the System Server 26. Preferably, the address of the invalid Service Provider or Information Requester 24 thereafter is blocked from the system 20 and the information pertaining to the unauthorized Service Provider or Requester 24 is maintained in the system 20 for future reference.

FIG. 2 Data Flow: Processing of the Subscriber Business Information Request for Subscriber by System Server Valid Subscriber Related Business Information Requests 32, received by the System Server 26, are processed in accordance with unit process 41. For example, the processing includes decrypting the message and preparing the message for forwarding to the offline database 28. Preferably, a message header is appended to the message and a document timer is activated to track the time until the System Server 26 receives a request response from the offline database 28. To process the Subscriber Related Business Information Request 32 in accordance with unit process 41, the System Server 26 preferably records receipt of the Subscriber Related Business Information Request 32 into the System Server's 26 relational database. In this same embodiment, the Subscriber Related Business Information Request 32 is marked as received by the System Server 26. Furthermore, the Server 26 can also be configured to execute certain user defined operations which are triggered during this processing depending upon the nature of the Subscriber Related Business Information Request 32 as further described below. For example, if the request is a credit card transaction, certain information may be forwarded to the issuing bank after database manipulation as further described below. In one embodiment, the document file is read in by the Server's 26 document handler, decrypted, and the document is then stored in the Server 26. For example, a document handler rules engine is used to process the document in accordance with unit process 41. Based on a user defined rules set, preferably stored in an ASCII text file, a rules agenda is created based on the contents of the document. In this example, the rules engine matches patterns in the rules conditions with the document and executes actions associated with the conditions. Examples of actions include updating database tables, modifying/transforming the document header information, and adding additional/alternative document routing instructions. Preferably, a timer is activated by storing a new record with Subscriber Related Business Information Request 32 information in the timer table.

FIG. 2 Data Flow: Send the Subscriber Business Request for Subscriber Profile from the System Server to the Database Subscriber Related Business Information Requests 32, thus processed, are forwarded to offline database 28 by means of unit process 43 via communication link 30. An example embodiment of unit process 43 includes the steps of encrypting the message, digitally signing the message, and sending the message to the offline database 28. Preferably, the functions required to prepare a document for forwarding are based on the type of Service Provider 24 from which the Subscriber Related Business information Request 32 is received. Offline database 28 has authority and access to the data required to respond to the Subscriber Related Business Information Requests 32, i.e., create a Subscriber Related Business Information Request Response.

FIG. 2 Data Flow: Receipt of the Subscriber Business Information Request for Subscriber Information from System Server by Offline Database The offline database 28 receives, logs, and authenticates the Subscriber Related Business Information Request 32. For example, in unit process 44, the offline database 28 receives the message, the signature on the message is authenticated and a response is sent to the System Server 26 if the signature is valid. In this manner only the Server 26 can access the offline database 28. Specifically, unit process 44 creates an interim file representation of the document after extracting the document from the transport mechanism and stripping off header information. Here, the priority code is interpreted so that the appropriate information from the lookup table can be retrieved. Continuing the example, the Subscriber Related Business information Request 32 is stored and the appropriate customer related information is coupled with the document header. Preferably, the file is stored in a system defined file system directory. Subsequently, the digital signature is verified using the Pretty Good Privacy signature authentication service based on the sender's public key, which is retrieved via previously configured information in the Pretty Good Privacy security database. If the signature is authentic, the document is decrypted using the Pretty Good Privacy decryption software based on the Server's 26 private key data. Once the document is decrypted, the header information is separated from the Subscriber Related Business Information Request 32 and the Subscriber Related Business Information Request document 32 is stored. A message 38 (shown in phantom) acknowledging the receipt of the Subscriber Related Business Information Request 32 is then sent by the offline database 28 to the Server 26 via communications link 30. Preferably, Erroneous Subscriber Related Business Information Request 32 receipts are logged and the Server 26 is notified via message 38. In this manner only requests from Server 26 are accepted for processing.

FIG. 2 Data Flow: Processing of the Subscriber Business Information Request for Subscriber Information and Generation of Response by Offline Database Once the Subscriber Related Business Information Request 32 is processed as set out above in unit process 44 by offline database 28, it is processed in accordance with unit process 46. An example of the method steps within unit process 46 includes: the Subscriber Related Business Information Request 32 is decrypted, the document is stored into the offline database 28 and the Subscriber Related Business Information Request Response 47 is created. For example, the offline database 28 formats the data into a document message and the offline database 28 appends reader information such as routing and document type to the message. Additionally, the subscriber Related Business Information Request 32 is stored in the offline database 28. When the Subscriber Related Business information Request 32 has been processed, the Offline Database 28 responds. For example, the Offline Database 28 sends a Subscriber Related Business Information Request Response 47 back to the Service Provider or Information Requester 24 through the System Server 26 via communications link 30. Preferably, the Subscriber Related Business Information Request Response 47 is generated in accordance with unit process 46. In one example, the Subscriber Related Business Information Request Response 47 is prepared using an application Graphical User Interface preferably written in Java. The Graphical User Interface preferably provides the user with input fields for all elements of the Subscriber Related Business Information Request Response 47, including input fields for the Service Provider or Information Requester 24. Preferably, the Graphical User Interface performs input validations, converts the input data into a binary stream using Java serialization, and stores the document in binary object forth into the offline database's 28 relational database. The document is stored into the offline database's 28 relational database. The document may be stored with additional document information such as date and time stamps, document state information, creating user identification and the like which are linked to a particular Subscriber Related Business Information Request Response 47. Preferably, the document state information is used by the system to determine whether the Subscriber Related Business Information Request Response 47 is ready to be transferred to the System Server 26. Additionally, the user identification information is used by the System Server 26 to help verify the validity of the Subscriber Related Business Information Request Response 47 by determining that the Subscriber Related Business Information Request Response 47 was sent by offline database 28 or an entity having access to the subscriber information and authority to disseminate authentication or information. When the Subscriber Related Business Information Request Response 47 is completed by entering the necessary data, it is marked as ready to be sent. Conversely, if the Subscriber Related Business Information Request Response 47 is not completed due to missing data, it is marked for review and stored until the Subscriber Related Business Information Request Response 47 data is entered into the Subscriber Related Business Information Request Response 47. If appropriate, a message is sent to the Server 26 requesting additional information be placed in the database 28 to fill the request.

FIG. 2 Data Flow: Send the Response to the Request for Subscriber Information to System Server from Offline Database After Subscriber Related Business Information Requests Response 47, has been processed, it is forwarded to System Server 26 by means of unit process 48 via communication link 30. For example, within unit process 48, Subscriber Related Business Information Requests Response 47 is encrypted, digitally signed, and sent to the Server 26. After processing, the Subscriber Related Business Information Request Response 47 is preferably stored in the relational database coupled with additional information such as date and time stamps, and user identification.

FIG. 2 Data Flow: Receipt of the Response to the Subscriber Information Request by System Server from Offline Database After the Subscriber Related Business Information Request Response 47 is received by the System Server 26, it is handled in accordance with unit process 50. Within unit process 50, the System Server 26 receives the Subscriber Related Business Information Requests Response 47, the signature on the Subscriber Related Business Information Requests Response 47 is authenticated, and a response 38 is sent to the offline database 28 if the signature is valid. Preferably, the Subscriber Related Business Information Request Response 47 is acknowledged by message 38 to the offline database 28 via link 30 and its receipt is logged. The Subscriber Related Business Information Request Response 47 then is processed by Server 26. An example of this processing includes authentication of the Subscriber Related Business Information Request Response 47 and validation of the intended Service Provider 24 address. Additionally, the receipt event is logged. Preferably, the document is decrypted as above described and checked against existing Subscriber Related Business Information Request 32 for a match. For example, Subscriber Related Business Information Request Response 47 match errors and destination errors are logged and notifications sent back to the offline database 28. Furthermore, the respective unit process 50 creates an interim file representation of the document after extracting the document from the transport mechanism and stripping off header information. In this same example, the file is stored in a system defined file system directory, which preferably is a persistent storage mechanism.

FIG. 2 Data Flow: Processing the Response to the Subscriber Information Request by System Server After the Subscriber Related Business Information Request Response 47 response is received by Server 26, it is processed as shown by unit process 52. Such processing, for example, includes storing the document, logging its receipt and managing the timers associated with the original request. For example, within unit process 52, an ID is matched against the initial request sent, the message is stored into the System Server 26 database, the document timer is deactivated, the Subscriber Related Business Information Requests Response 47 is prepared for forwarding to the requesting Service Provider 24 and a message header for sending Subscriber Related Business Information Requests Response 47 to the requesting Service Provider 24 is appended. Preferably, the Subscriber Related Business Information Request Response 47 receipt is logged and the document state is set to "complete." Such a setting indicates that the Subscriber Related Business Information Request Response 47 is ready, for example, to be encrypted, signed, and forwarded to the Service Provider or Information Requester 24, as represented by unit process 54. In the preferred embodiment, the document file is read in by the Server's 26 document handler process and the document is then stored in the Server 26. The Document Handler Rules Engine is then activated to process the document. For example, a rules agenda is created based on the contents of the document. The rules engine matches patterns in the rules conditions with the document and executes actions associated with the conditions. The rules match the Subscriber Related Business Information Request Response 47 by document identifier information with the Subscriber Related Business Information Request 32. Preferably, the system timer that was created when the document was originally received by the server 24 is deleted from the server timer table. Subsequently, in this example, the destination for the Subscriber Related Business Information Request Response 47 is validated and any erroneous Subscriber Related Business Information Request Responses 47 are logged. Preferably, the Document Handler process modifies the Subscriber Related Business Information Request Response 47 header information for document transmission status and stores the information to the database.

FIG. 2 Data Flow: Send Response to Subscriber Information Request from System Server to Service Provider The Subscriber Related Business Information Requests Response 47 is sent to the Service Provider 24 using the communication link 30 in accordance with unit process 54. For example, within unit process 54, the Subscriber Related Business Information Requests Response 47 is encrypted, digitally signed, and then sent to the Service Provider 24. Additionally, the system appends the appropriate routing information for the transmission type used by the Service Provider 24. Furthermore, acknowledgment of receipt is received via 38 and logged. Preferably, match and destination error notifications are received and logged, corrections are made and the response resent if necessary.

FIG. 2 Data Flow: Receipt of the Response to the Subscriber Information Request by Service Provider Upon receipt of the Subscriber Related Business Information Request Response 47, the Service Provider or Information Requester 24 authenticates the System Server 26 as the sender and logs the receipt of the Subscriber Related Business Information Request Response 47 in accordance with unit process 56. For example, within unit process 56, Subscriber Related Business Information Request Response 47 is received, the digital signature is authenticated, and a response 38 is sent to the System Server 26 if the signature is valid. Additionally, the Subscriber Related Business Information Request Response 47 is matched against the Subscriber Related Business Information Request 32. Preferably, the Subscriber Related Business Information Request Response 47 is processed in a manner similar to unit process 52 in accordance with unit process 58.

FIG. 2 Data Flow: Service Provider Processing of the Response to the Subscriber Information Request The Service Provider or Information Requester 24 processes the Subscriber Related Business Information Request Response 47 in unit process 58. For example, within unit process 58 Subscriber Related Business Information Request Response 47 is decrypted and matched to the Subscriber Related Business Information Requests 32 stored in the requesting Service Provider's 24 database. Furthermore, the document status is set to complete or rejected depending on the response data sent in the Subscriber Related Business Information Requests Response 47 by the offline database 28. Preferably, the completion of this step is the termination of the process. In a preferred embodiment, a log entry is made into the system server database recording information about the document reception process. For example, the document state is set to complete by the document processor of Server 26 by updating the document header in the database. Preferably, a trigger is fired to perform a system defined service upon document completion. Triggers, for example, can perform actions such as sending a user defined message to a socket, storing data in another database, performing communications and the like. In this manner transaction data can preferably be sent to, for example, an issuing bank.

FIG. 2 Architecture of Systems Server and Offline Database

In the embodiment of FIG. 2, the systems server and offline database architecture preferably consists of six subsystems: process control subsystem, communication subsystem, document processing subsystem, security subsystem, user interface subsystem, and a data handling and storage subsystem. The process control subsystem preferably includes a system that invokes and controls the other custom and commercial software that make up the system server. This subsystem, for example, is able to automatically restart erroneously terminated processes and logs such terminations for later analysis. Preferably, users are able to configure the process control subsystem to take additional actions when a process terminates.

The communication subsystem preferably comprises of an X400 agent and/or virtual private network communication agent. Preferably, this subsystem uses either agent to send documents out of the system server to external recipients, and relies on a fully qualified Internet address for routing. For example, the communication subsystem's message receiving functions include determining how to route a message to its recipient, and accepting and transferring mail from and to intermediate agents. Additionally, address interpretation and transformation into a compatible format is handled by the communication subsystem. The communication subsystem also implements special actions indicated by the message header such as verifying delivery. For example, when message delivery cannot be done, the communication subsystem queues messages, or reroutes documents with erroneous addresses, as required. To send messages to a recipient, the communication subsystem determines the recipient's preexisting public communication system host, then initiates a transfer protocol session with the host. Preferably, an unsuccessfully transferred message is queued for later delivery. In an embodiment where the System Server 26 functions as a routing hub for the system, the communication subsystem receives and processes all incoming document transfer protocol sessions from client systems. For example, outbound documents are packaged and sent to the communication agent for processing. Additionally, the communication subsystem automatically processes received messages by first authenticating, then decrypting, and then sending the message to the document processing subsystem. In one embodiment, the communication subsystem places a time stamp on each message that when compared with the message status indicates when a message has not been successfully delivered. Unsuccessfully sent messages are preferably resent a predetermined number of times according to preset communications subsystem parameters.

The document processing subsystem preferably processes all messages received into the System Server 26. For example, this subsystem can be responsible for message parsing, message storage, Subscriber Related Business Information Request processing, Subscriber Related Business Information Request Response processing, message routing and message timers. Preferably, messages are processed in the order in which they are received and deleted after successful processing. In a preferred embodiment, a message is logged into the activity log upon reception and then parsed. For example, the message parser divides the message into two parts: header and message data. Message type information contained in the header determines which type of action the system server should take with the message data. After parsing, the message data is stored. Preferably, the message data is stored according to message type and the message header is logged. For example, a Subscriber Related Business Information Request is stored in a Subscriber Related Business Information Request table; and a Subscriber Related Business Information Request Response is stored in a Subscriber Related Business Information Request Response table. In an alternative embodiment, table entries are crossed referenced, and transmission verification messages and the status of the corresponding message are logged. In an example embodiment, after the message is stored, the Subscriber Related Business Information Request 32 is processed. For example, the first step in processing a Subscriber Related Business Information Request 32 is to log the event. Then the name of the service provider 24 is extracted and the service provider's address is obtained from a lookup table. The Subscriber Related Business Information Request 32 is then sent to the offline database 28. Preferably, the Subscriber Related Business Information Request 32 is marked as sent when a return receipt is received. In preferred embodiments, Subscriber Related Business Information Requests 32 can be in any of four states based on responses from the offline database 28: pending, sending, inactive, or completed. In a preferred embodiment, after the Subscriber Related Business Information Request 47 is processed and sent to the service provider, the Subscriber Related Business Information Request Response 47 is processed after it is received from the service provider. For example, when a Subscriber Related Business information Request Response 47 is received by the document processing subsystem, the corresponding Subscriber Related Business Information Request identification number is located and the Subscriber Related Business Information Request status is checked. The Subscriber Related Business Information Request Response 47 is marked as invalid if the Subscriber Related Business Information Request 47 is not pending. Preferably, document status is updated when the Subscriber Related Business Information Request Response 47 is processed, forwarded to the requesting Service Provider or Information Requester 24 and stored into the system. In a preferred embodiment, a message's time in the document processing system is tracked by a timer. In one example, default events are set to occur at preset times. Preferably, such default events include setting a message's status to a certain value if no response has been received or to send the message again if no return receipt is received.

The security subsystem primarily preferably secures four areas: system data and file access, the relational database, the system administrative user interfaces and data and messages. For example, system data and file access to the offline database 28 is protected by a user identification string that allows access to only the owner. Preferably, access to the relational database is controlled through a data owner's user identification string and password, and no access privileges are granted to any other user. Additionally in this example, the system administration user interfaces and data are protected by another set of user identification numbers and passwords. Preferably, users cannot gain access to the system administration user interfaces and data through other databases. In one embodiment, messages are secured by encryption and a digital signature. For example, commercial security software does the encrypting and decrypting, message authentication, and digital signature verification. Software specifically designed to secure document transmissions using Public Key Cryptography is preferred. In alternative embodiments, Public Keys can be manually transferred between system/client administrators via email or disk/tape. Preferably, key transfers are authenticated by verifying the digital signature of the sent document. Furthermore, all messages preferably receive a digital signature based on the private key of the sending system. For example, upon receipt, the digital signature of a message is automatically verified. Messages that fail digital signature verification are not processed, but rather are stored and the failure noted in the automated activity log. Preferably, the sender is not notified when a message fails verification. This, for example, prevents attacks from hostile systems.

The user interface subsystem preferably allows a system administrator to add or delete service providers, add or update message routing information and monitor system activity. Preferably, the interface is accessed through Java software applets which can be executed within a web browser, such as Netscape Navigator or as a stand alone application. With regard to the data handling and storage subsystem, the offline database system data preferably is stored in a commercial relational database. For example, the offline database system uses a database access and storage facility implemented using embedded structured query language in the user application processes and Java Database Connectivity. In an alternative embodiment, the Unix file system can be used to store system data.

With regard to the systems and methods in accordance with FIGS. 1 and 2, it will be realized by the skilled artisan that many transactional applications lend themselves to the anonymity provided by the instant invention. Accordingly, in one aspect, particular service providers or Information Requesters have security codes and/or priority codes which allow them access to some, if not all, of the information contained in the offline database. This, for example, would be the situation with an issuing bank with a particular credit card that has been issued to a Subscriber in the anonymous system and various pieces of information with regard to, for example, financial status of the Subscriber are required in accordance with the Agreement between the Subscriber and the bank. Preferably, this information flow is handled by the server as set forth above after authentication of the total transaction. It will be further realized that alternative embodiments of the system in accordance with the instant invention can provide some or all of the information contained in the database to a particular Service Provider or Information Requester depending upon the degree of anonymity, the position of the Service Provider or Information Requester, and the access codes/alias identifiers of the system. Thus, in accordance with one aspect of the invention, no information is allowed to any Service Provider or Information Requester and in that aspect the system has the capability of providing authentication or authorization code for a particular transaction completely devoid of any subscriber information. Further, it will be realized that particular embodiments will allow grocery cards and club cards such as frequent flyer and the like (which are primarily involved in gathering demographic information with regard to purchasers) to be "blinded" by the use of the instant invention. It will also be realized that, for example, a number or series of aliases or codes such as personal identification numbers, and the like can be used in association with the medium to reduce risk of unauthorized use of the medium. In accordance with a preferred embodiment, security codes may be issued to the Subscriber such that one or more of the security codes must be used depending on the magnitude of the transaction. Further, it will be realized that although plastic cards are an easy medium in which to embed alias identification, alternative embodiments may employ other mediums such as electronic transfer medium, smart cards, chips and the like. Thus, as long as the medium can maintain and contain at least one set of alias identifiers that can be recognized by the system, any medium can be used in accordance with this invention. For example, codes on keypads and even fingerprints would be acceptable identification to trigger the system.

II. Preferred Systems and Methods for Anonymous Credit Card Transactions

For purposes of preferred systems and methods specifically directed to protecting the identity of a credit cardholder, whereby the cardholder can enter into credit card transactions in complete anonymity, the detailed description of preferred embodiments that now follows is represented in terms of processes and symbolic representations of operations carried out by a credit card processing system. In the corresponding drawings, in which like numerals represent like elements throughout the several figures, features of these systems and methods are described in further detail.

Alias Account

Figure 3:
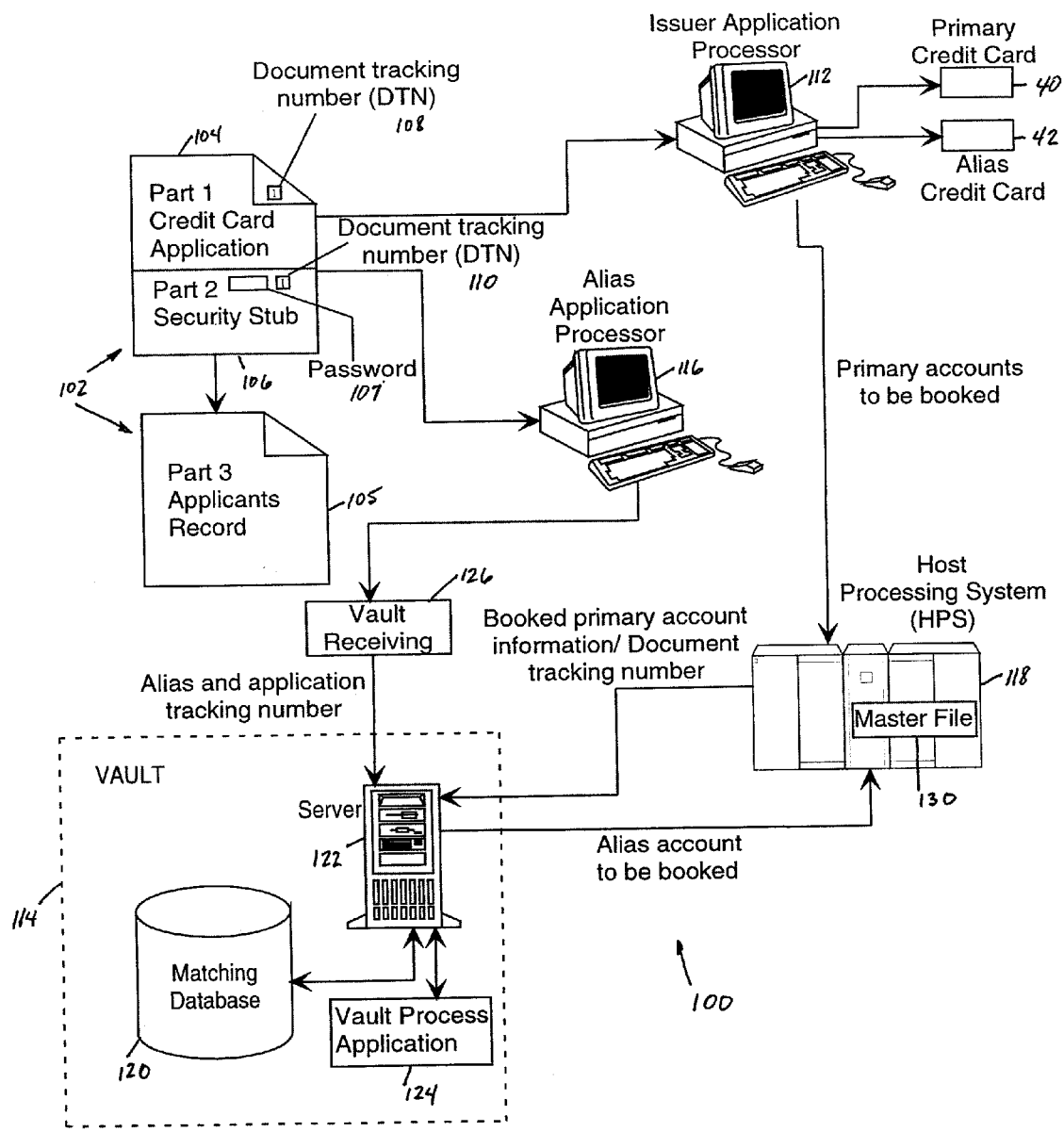
FIG. 3 is a block diagram illustrating an exemplary account setup in the alias account system of the present invention.

FIG. 3 illustrates an exemplary account setup in an alias account payment transaction system 100. The alias account system 100 comprises a three part credit card application 102, an issuer application processor 112, a primary credit card 40 and an alias credit card 42, an alias application processor 116, a host processing system 118, a part 3 applicant record 105, a vault system 114, and a vault receiving element or gateway 126. The vault system 114 includes a server 122, a vault process application 124, and a matching database 120.

The three part credit card application 102 comprises a part 1 credit card application 104 for setting up the primary account, a part 2 security application or stub 106 for setting up the alias account, and a part 3 applicant's record 105 that is retained by the applicant. The card applicant's real identity and factual information used to establish credit are provided on the part 1 credit card application 104. The card applicant's alias identity, for example, an alias name and alias address, are provided on the part 2 security stub 106. The only information in common between the part 1 credit card application 104 and the part 2 security stub 106 is a document tracking number (DTN) 108 and 110. In the preferred embodiment the DTN is the same multi digit number on both part 1 and part 2. Alternatively, a multi part encryption methodology (e.g. public key/private key) can be employed to provide two different DTNs on the parts 104, 106 that when combined according to an encryption/decryption algorithm establish a unique number for associating the primary account and the alias account under appropriate predetermined circumstances.

Generally, the alias account system 100 functions in the following manner. The part 1 credit card application 104 of credit card application 102 is transmitted to the issuer application processor 112 for processing. If the part 1 credit card application is approved, the primary credit card 40 is issued and a primary account is booked on host processing system (HPS) 118. The primary account is a credit card account that functions like any other credit card account.

The part 2 security stub 106 is transmitted to the alias application processor 116, independently of the part 1 credit card application. At the alias application processor 116, the part 2 security .stub 106 is processed and the resulting information is transmitted to vault receiving 126. Vault receiving 126 transfers the information received from alias application processor 116 to the vault 114.

In accordance with a preferred aspect of the invention, the vault 114 is preferably a secure facility operated by an independent third party that is not beholden or obligated to credit card companies or merchants, for example a privacy foundation, where the identity of an alias account holder is maintained and not disclosed to others except under certain limited conditions. The vault may charge a fee for using its facilities, and may contract with credit card companies to provide its vault services, as described herein.

Although the preferred embodiment involves use of an independent secure facility as the vault, it will be appreciated that some degree of cardholder privacy can be realized by maintaining the alias account features described herein with a secure database within the data processing facilities of an issuer or other party. According to this alternative aspect of the invention, secure data may be provided by a secured computer system within an issuer's facility or by a separate secure database with an issuer's computer system for supporting the alias accounts. Cardholder privacy is effected in this alternative approach by password protecting the secure data, by restricting the access of customer service representatives to the secure data, and/or by providing separate personnel to handle the issuer's alias account database.

In vault 114, a vault process application 124 on server 122 receives information from vault receiving 126 and from the primary account booked on HPS 118. This information is input to a matching database 120 and is used to book an alias account in vault 114. The alias account information is then transferred to HPS 118 to set up a corresponding alias account and issue an alias credit card 42. The alias account booked on HPS 118 is identified with an alias name and address.

In the alias account system 100, the key points in protecting the anonymity of the account holder are the facts that the part 1 credit application 104 goes to a different location than the part 2 security stub 106, and that the only information in common between the two parts of credit card application 102 are the DTNs 108 and 110.

In FIG. 3, a new account is set up using the three part credit application 102; information required from credit card applicants is provided on appropriate paper or computer based form. The part 1 credit card application 104 of application 102 is a standard credit application, while the separable part 2 security stub 106 is used to setup the alias account. A part 3 applicant's record 105 is also provided as an applicant's copy of the three part credit card application 102.

The part 1 credit card application 104 captures the normal information the issuer requires to make its credit decision and setup the primary account. The part I credit card application also provides a document tracking number (DTN) 108 for creating an association with a second DTN 110 on the part 2 security stub 106. The DTN 108 is stored in a master file 130 when the application is processed so that it can be passed to the vault 114 after the account is booked.

The issuer processes the part I credit card application 104 as any other application. Credit bureau reports are requested and the account is scored to determine credit eligibility and establish an amount of available credit. If the part 1 credit card application 104 is not approved, the normal letters are sent as with any other credit application. If the application is approved, the primary account is booked on the host processing system (HPS) 118 and a primary credit card 40 is issued to the applicant. Under association regulations the address of the booked account is reported to the Issuers Clearing House (ICS) and the credit bureaus.

There are at least two methods of booking the approved primary accounts on the host processing system. If the credit card issuer uses HPS 118 to process the credit card application, the account is booked automatically on HPS 118. However, if a credit card issuer chooses to use an outside vendor to process the application, HPS 118 will receive an account tape and the accounts are booked as part of the nightly cycle. The nightly cycle also produces a daily report file. This report file shows all accounts that were booked on the system during that day. From this report file, the new primary accounts are captured and transferred to vault 114. HPS 118 may capture the primary accounts, for example, using a flag in the master file that denotes a primary account or using a portfolio segregation method, where the primary accounts are identified by the system and principal number (sys/prin number) in a method that will be familiar to those skilled in the art.

Unlike the part I credit card application 104, the part 2 security stub 106 is transmitted to the alias application processor 116. A data entry operator using alias application processor 116 captures the security information contained on the part 2 security stub 106. The security information, for example, may include the document tracking number (DTN) 110, a password 107, other security information, etc. The alias application processor 116 captures the security information and transfers it to vault receiving 126. Vault receiving 126 does not have to be physically located in the vault 114. It is simply a location where the security information is received and transferred to vault 114.

In vault 114, the security information from the part 2 security stub 106 is used to assign the password 107 to the alias account. The password 107 is used for identification (ID) verification on the alias account. The password 107 may be placed in the mother's maiden name field of the alias account. The part 2 security stub 106 contains a second DTN 110 that is associated with the DTN 108 on the part 1 credit application 104. Since the part 1 credit card application 104 and the part 2 security stub 106 have an associated document tracking number (DTN) 108 and 110, the DTNs are used to construct a relationship between the primary account and the alias account. Because they are used for this purpose, the document tracking numbers are preferably unique to an issuer.

In addition to providing the password 107 to the alias account, the security information is also input to vault process application 124 on server 122. The vault process application 124 constructs a matching database 120 using two data sources. The first source is the security stub 106. The security stub 106 contains the password 107 and the DTN 110. The second source is HPS 118. HPS 118 transfers certain primary account information to the vault 114 for purposes of maintaining the alias account.

As new security information is transferred from vault receiving 126 to the vault 114, vault process application 124 receives the security information and updates the matching database 120. If, when the security information is received and processed and it is determined that the DTN 110 is already in the matching database 120, the vault process application 124 determines if the alias account information has already been posted by vault 114. If it has not, then, HPS 118 received the part 1 credit card application 104 before the security information arrived at vault 114. In this case, HPS 118 has already approved and booked the associated primary account and transferred its information to vault 114. To proceed with alias account establishment in this case, an alias account record is created and added to a new account file and is sent to HPS 118 for posting. This process creates the alias account on HPS 118.

If, when the security stub 106 is received and processed and it is determined that DTN 110 is already in matching database 120, the vault process application 124 determines that the alias account information is already posted and reports an error, because the security stub information is a duplicate record.

If, when the security stub 106 is received and processed and it is determined that DTN 110 is not already in the database, the primary account information has not been transmitted from HPS 118 to vault 114. In this case, the security stub information is maintained on file until it can be matched with a new primary account or for a predetermined holding time. For example, after 6 months the record may be removed from the file.

In the above process, the vault process application 124 is taking information from the daily cycle in HPS 118 and using it to create an input file for the next day's cycle. This means that, if an account is approved before a day's cycle ends, the new account is built in HPS 118 and the information for the vault 114 is extracted from the files created that night, during the processing of the daily report file. The extracted information is transmitted to vault 114. This input to the vault is processed and a request for a new alias account file will be transferred back to HPS 118 for the next night's processing of the daily report file. As a result of this process, the new alias account is booked in HPS 118.

Once an alias account is booked on HPS 118, the alias accounts are not reported to the credit bureaus or the Issuers Clearing House (ICS). The alias account is not reported to the credit bureaus because the primary account was already reported. The alias account is not reported to ICS because the address on the account is meaningless. Furthermore, the credit available to the credit cardholder is split or allocated between the primary account and the alias account on a predetermined basis, with the total credit available to the credit cardholder not exceeding the sum of the primary account and the alias account.

In HPS 118, all alias accounts will be assigned a fictitious name to populate the fields within the alias account and facilitate identification and recognition of alias accounts within the HPS system. For example, the account name may be assigned a made up name such as "Pat G. Alias". The remaining account information for the alias account is generated in the vault 114. Vault 114 generates a mailing address for the account that consists of an apartment number that is unique and a city, state and zip code that is special for the account, again to facilitate identification and recognition of alias accounts within the HPS system. The zip code is used in the mailing process to identify a document with an alias name and address. The mailing process for alias accounts will be discussed later in detail.

The booked alias accounts are reported on the daily report file in the manner known to those skilled in the art. A file of these accounts is created and sent to the vault 114 so that a report can be created for the issuer and the privacy foundation. The vault 114 will provide daily reports showing the primary accounts that are booked but have no matching part 2 security stub 106 and primary accounts that have successfully set up an alias account. The vault will also generate a weekly report to inform the issuer of the number of alias accounts issued and the number of account numbers available for assignment.

Account Transactions

Figure 4:
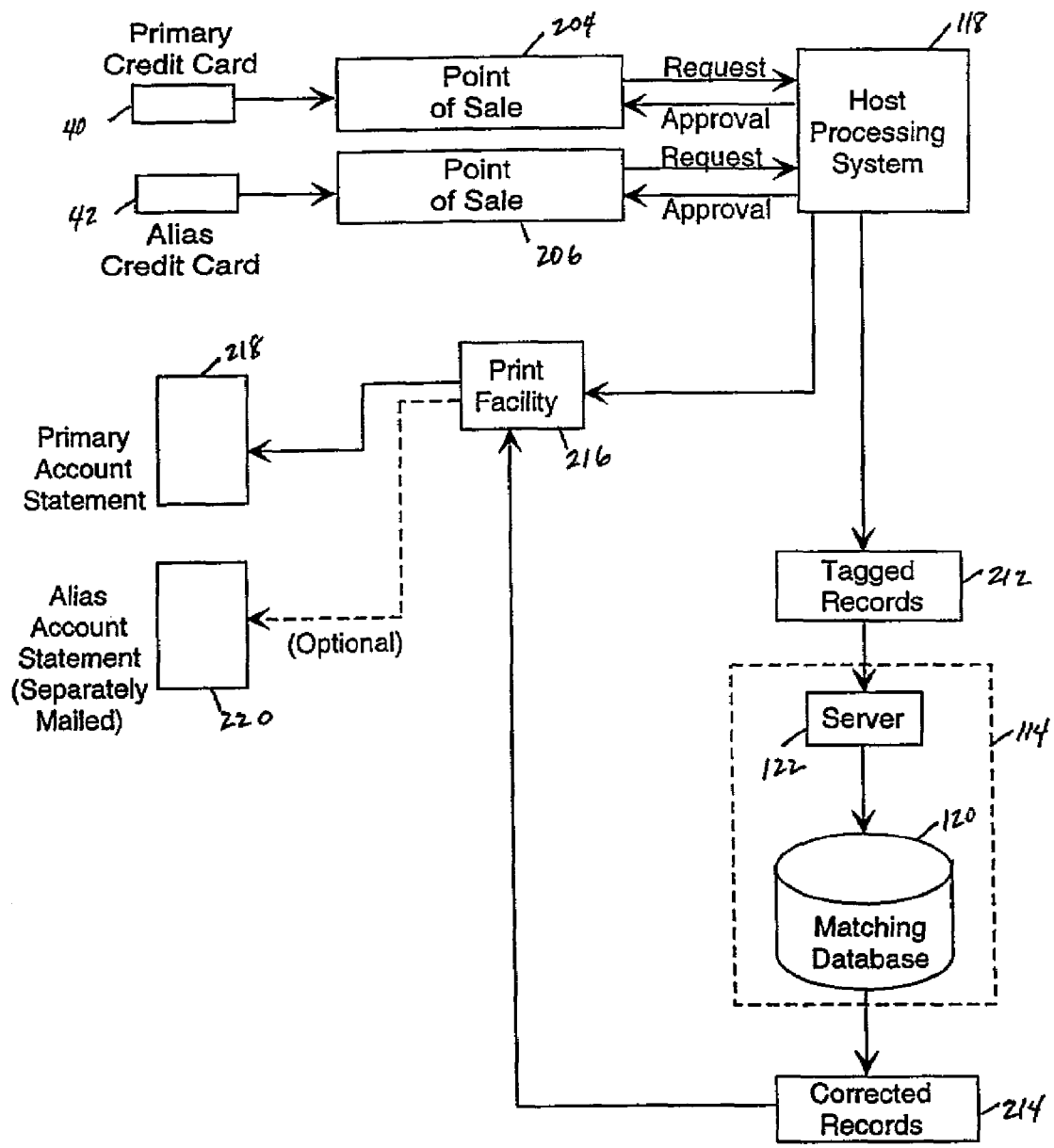
FIG. 4 is a block diagram illustrating a typical credit card transaction using the credit cards of the present invention.

FIG. 4 illustrates a typical credit card transaction using the credit cards of the present invention. Credit card 40 is associated with the primary account and credit card 42 is associated with the alias account. The primary and alias credit cards 40 and 42 are used like any other credit card. The cardholder presents either the credit card 40 or 42 to a merchant at a point of sale 204 or 206 (which can be in person, on line, via telephone, etc.). The merchant at the point sale submits the credit card account number for authorization to an acquirer. The acquirer is an entity that enters into an agreement with a merchant for authorization and settlement of its credit card transactions. The acquirer may be a bank, a credit card company (for example, VISA, AMERICAN EXPRESS, MASTERCARD, etc.), or some other entity.

In FIG. 4, the Host Processing System (HPS) 118, which may be operated by an acquirer or by another entity, receives the authorization request from the merchant and provides authorization of the credit card transaction. Assuming that the credit card transaction from either the primary credit card 40 or the alias credit card 42 is approved, the transaction is treated in a similar fashion to other credit card transactions, with the exception of the statement printing process. The statement printing process for the alias account is different from the printing process of the primary account and other credit card accounts. The primary account statement 218 associated with credit card 40 is printed in print facility 216, using the name and address associated with the primary account in HPS 118.

In contrast to the statement printing process for primary accounts, alias accounts are tagged in HPS 118 for purposes of identifying alias accounts and distinguishing them from other accounts. The alias accounts are tagged, for example, by setting a flag, identifying special fields, or assigning a system and principal number (sys/prin. number) to the alias accounts. In accordance with the present invention, however, the alias accounts are not associated with any primary account at the HPS. The tagged records 212 are then transferred to vault 114 for processing. In vault 114, the fictitious name and address on the alias account is replaced with the cardholder's real name and address. The real name and address is retrieved from matching database 120. The corrected records 214 are transferred to print facility 216, where an alias account statement 220 is printed. The alias account statement printing process will be discussed in greater detail below.

Account Updates

Figure 5:
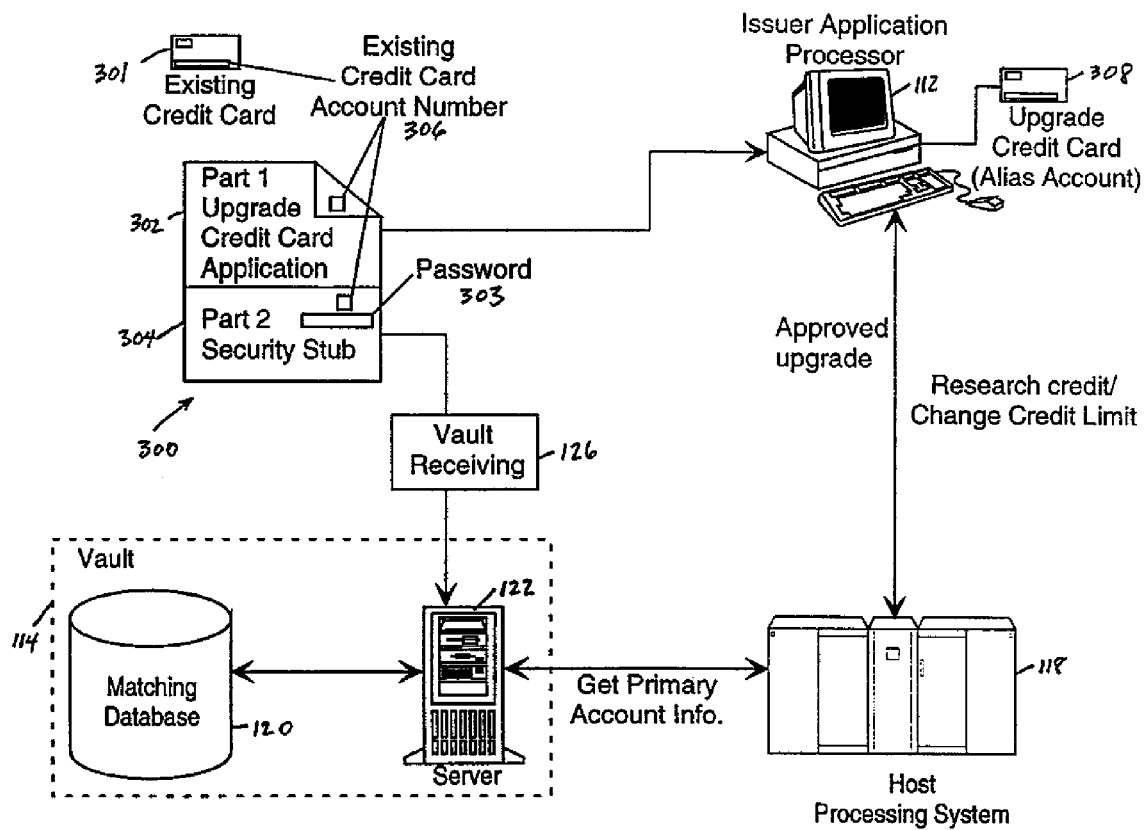
FIG. 5 is a block diagram illustrating an upgrade of an existing account to an alias and primary account, in accordance with the present invention.

Referring now to FIG. 5, an existing cardholder can upgrade or modify their credit card account to add an alias account. An upgrade or preapproved application 300 is used to sign up an existing cardholder for an alias account. The upgrade or preapproved application 300 comprises two parts. Part 1 302 is an upgrade credit card application and part 2 304 is a security stub. According to this aspect of the invention, unlike new account setup, the two parts of application 300 need not be associated by using the DTN information. Instead, the two parts of the application may be associated by using the credit card account number 306 on the cardholder's existing credit card 301. The credit card account number 306 is affixed to both parts of the application. A password 303 selected by the cardholder is provided on the part 2 security stub for security purposes.

As illustrated in FIG. 5, the part 1 upgrade credit application 302 is transmitted to issuer application processor 112. The issuer or its agent will handle the processing of the part 1 upgrade credit application 302. Similarly, the part 2 security stub 304 is transmitted to vault receiving 126 for processing. Vault receiving 126 captures the password 303 and the current credit card account number 306 on part 2 security stub 304. This information is transferred to the server 122 to populate the table for matching database 120. The part 2 security stub 304 information is stored on server 122 for a predetermined period of time or until the corresponding account information is received from HPS 118 and an alias account is built.

When the upgrade credit card application 302 is approved, the issuer initiates an account transfer. The existing account is transferred to a primary account and a new upgrade credit card 308 is issued as the card for the alias account. The existing account may be transferred, for example, by flagging the existing account as a primary account in the master file or using a portfolio segregation method and switching the existing account to a system and principal number (sys/prin. number) assigned to primary accounts. The credit limit on the new primary account is also set to a value that can be distributed between the primary account and the alias account that will be created. The credit limit distribution process will be discussed in detail in the account management section.

HPS 118 captures the account transfers on a report file and checks the report file for existing accounts that have been identified as primary accounts. This report is used to transfer the primary accounts to the vault 114. When vault 114 receives the new primary account information and matches the credit card account number 306 on the part 2 security stub 304 with the credit card account number 306 on the primary account, it will create a new alias account. All other processes for creating the alias account are the same as those described in new account setup.

Credit Limit Changes

Figure 6:
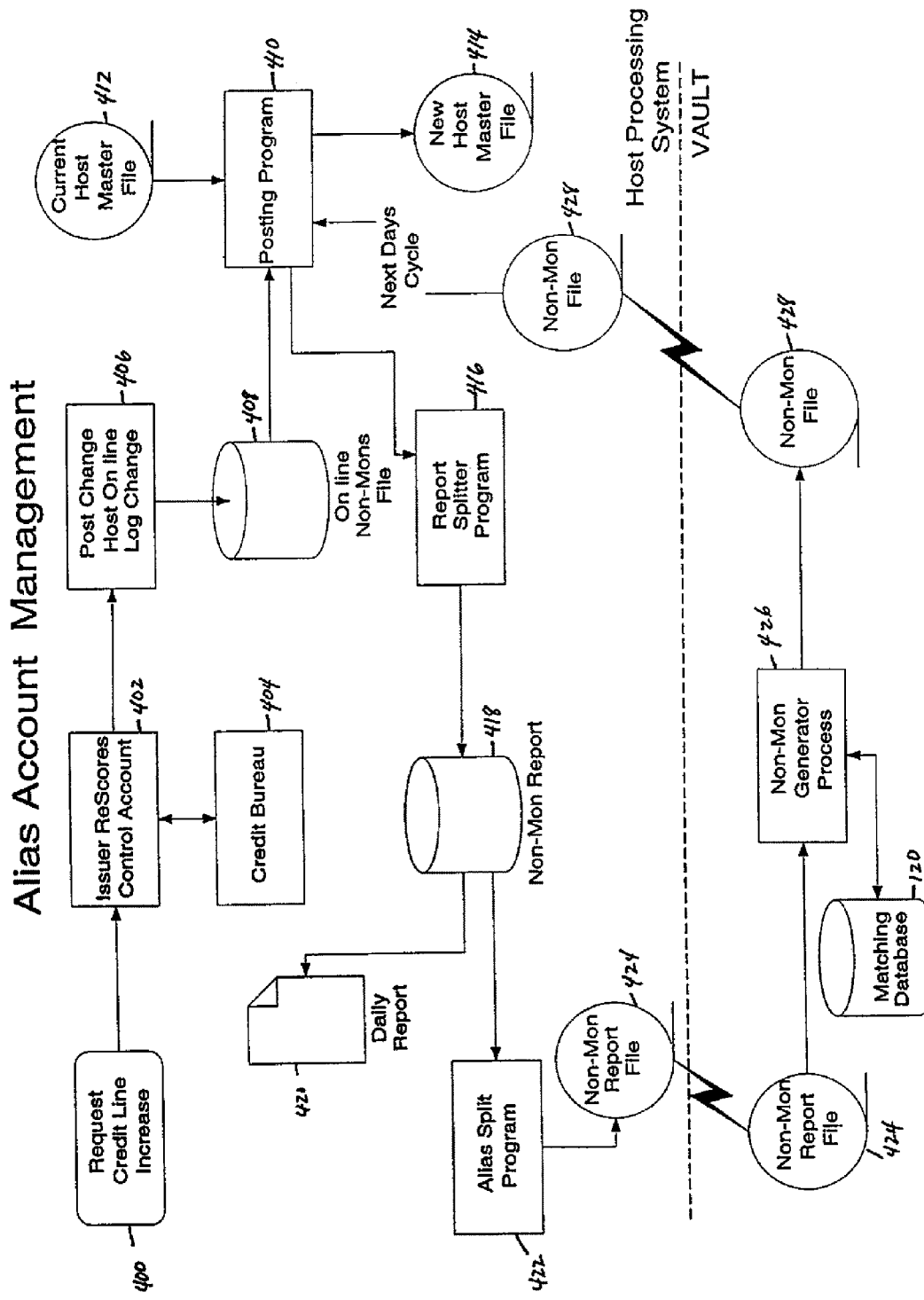
FIG. 6 is a general block diagram illustrating an embodiment of the alias account management process of the present invention.

Refer now to FIG. 6 for a discussion of the account management functions. In particular, the following discussion relates to the manner in which the credit limit assigned to a particular cardholder is increased (or decreased) and the changed credit limit is allocated between the primary account and the alias account.

Account management functions generally do not involve monetary values or relate to specific financial transactions, and are often called non monetary or "non mon" transactions. Generally, a non mon transaction is a transaction that affects account information, but does not affect the monetary information for an account. For example, name, address, and credit limit changes to an account are non mon transaction, and such changes are generally called updates. In the alias account system 100, non mon updates to the primary account are processed on HPS 118.

The primary account controls the credit line on both the primary and the alias accounts because all credit decisions are based on the primary account. When HPS 118 establishes a primary account, a credit limit is set for the primary account. This credit limit is passed to the vault 114 as part of the alias account setup process. When the vault 114 creates the alias account it will take the credit limit passed and divides it based on a percentage allocation or distribution ratio established by the issuer. A non mon transaction is created to set the primary account's credit limit to its proper value. The alias account's credit limit is set to the remaining amount. In addition, there is information stored with the primary account recording the change to the credit limit, and the fact that the vault 114 issued the change. This information is important because a customer service representative (CSR) making a change to the credit limit can recognize that there is an alias account associated with the primary account.

It will be appreciated that the allocation of available credit between the primary account and the alias account is within the discretion of the issuer and, if desired, selection by the cardholder. An issuer may require a predetermined allocation, for example 50%, of the available credit between the two, or may allow some discretion on the part of the cardholder. The issuer may allocate 0% or 100% or any number in between of the available credit to the primary account, with the remainder to the alias account.

A CSR may retrieve the information stored with the primary account to help determine the combined credit exposure and make the decision to issue a non mon setting a new credit limit. The vault 114 will capture the non mon when it is reported on a daily report file and will recalculate bout credit limits and issue a non mon for each account. It will be understood that in current systems this process may require a number of cycles to complete so there is additional exposure to the issuer from the time that the non mon is issued until the vault 114 issues the non mons for both accounts and they are processed by HPS 118. This process applies to both increases and decreases of the credit limit.

It is important to note that if the issuer changes the distribution ratio of the credit limit, vault 114 will not immediately recalculate the credit limit associated the alias accounts on file. The accounts will remain at the old ratio until a non mon is issued for the account. This is to prevent the possibility of putting accounts over that were not over the limit before the change. Online changes of the alias account's credit limit is preferably not allowed.

FIG. 6 is a general block diagram illustrating an embodiment of the alias account management process. The alias account management process starts at block 400 with a request from a cardholder for a credit line increase. This is usually made through a phone call to the issuer. The issuer receives the request at block 402 and requests a credit bureau report of the cardholder. Based on the credit bureau report, at block 402 the issuer rescores the customer's credit and determines the customer's eligibility for a credit line increase.

If the credit increase is approved, the issuer at block 406 will perform an online non mon transaction to HPS 118 to post the change of the primary account credit limit. The non mon transaction is logged in an online non mons file 408. The online non mons file 408 is then transferred to the posting program 410. The nightly posting program 410 also receives the current host master file 412. Once both files are received, the posting program 410 posts the online non mons in file 408 to the current master file 412 and generates a new host master file 414. The posting program 410 also generates a number of report files. These report files are input to a report splitter program 416 that will split off a non mon report 418. The non mon report 418 contains the primary and alias account information associated with the posted transactions that do not effect the account's monetary value. The non mon report file 418 is used as input to alias split program 422 and to generate a daily report 420. The alias split program 422 separates the alias and primary account transactions and generates a non mon report file 424 that only includes the alias account transactions. This non mon report file 424 is then transferred to vault 114.

In vault 114, the non mon report 424 is input to the non mon generator process 426. The non mon generator process 426 retrieves the issuer's percentage allocation or distribution ratio from the matching database 120 and applies it to the new credit line limit received in non mon report file 424. In applying the issuer percentage allocation, the non mon generator process 426 takes the new credit line limit and apportions it based on the percentage assigned to the primary and alias account. To set the apportioned credit limits in HPS 118, the non mon generator 426 outputs a non mon file 428 to HPS 118. The non mon file 428 is input to the posting program 410 in the next day's cycle. The posting program 410 will post the modified credit limits to the primary and alias accounts.

Figure 7:
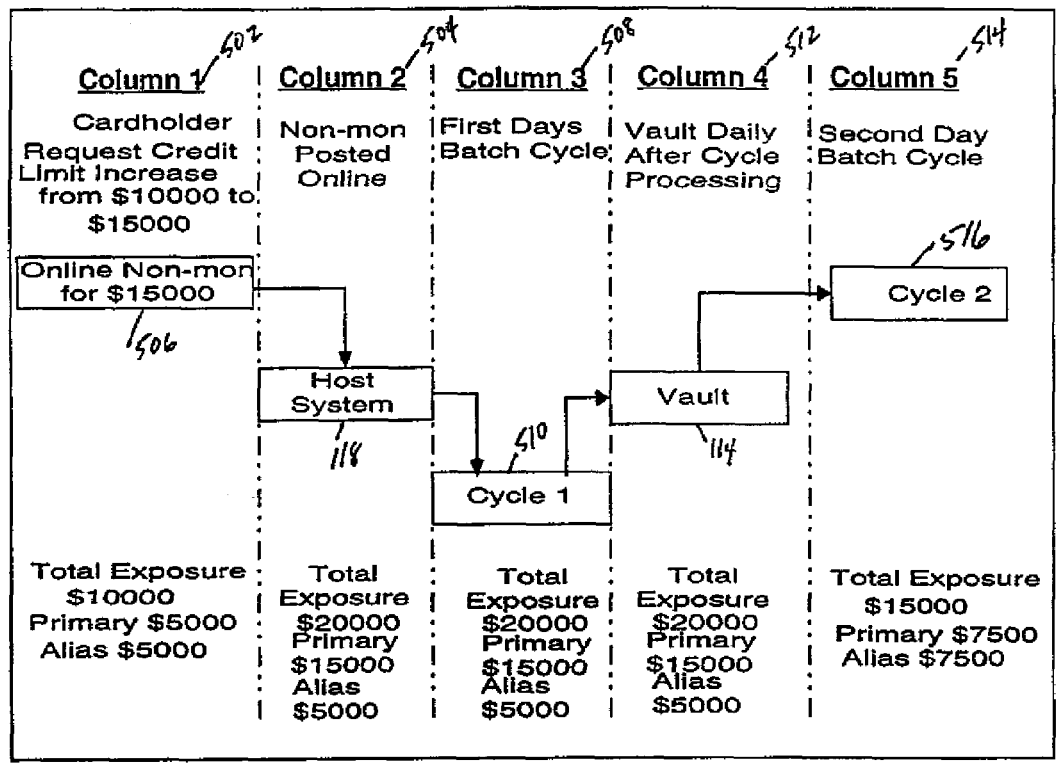
FIG. 7 is a timing diagram illustrating an example of an issuer's credit exposure when a credit limit increase is processed using the account management process of FIG. 6.

FIG. 7 is an example of an issuer's credit exposure when a credit limit increase is processed using the account management process of FIG. 6. In column 1 502, when the cardholder makes a request for the issuer to increase the primary account credit limit from $10,000 to $15,000, the issuer's total exposure is $10,000 prior to the credit limit increase. The $10,000 exposure is divided according to the issuer's percentage allocation, which in this example is 50%. Therefore, the issuer's exposure is $5,000 for the alias account and $5,000 for the primary account.

In column 2 504, when the issuer enters the online non mon 506 for $15,000 to HPS 118, the change of the primary account credit limit is posted and the issuer's total exposure is increased to $20,000 ($15,000 for the primary account and $5,000 for the alias account). In column 3 508, during the fast day's batch cycle (cycle 1 510), the issuer's exposure remains at $20,000.

In column 4 512, after HPS 118 completes the cycle 1 510, the credit limit increase is transferred to vault 114 for processing. During the processing, the issuer's credit exposure remains at $20,000 ($15,000 for the primary account and $5,000 for the alias account). Once the processing is complete, in column 5 514, the modified alias and primary credit limits are transferred back to HPS 118 for input to the second day's batch cycle (cycle 2 516). At this point, the issuer's credit exposure is $15,000 ($7,500 for the alias account and $7,500 for the primary account).

Non Mon Updates

Figure 8:
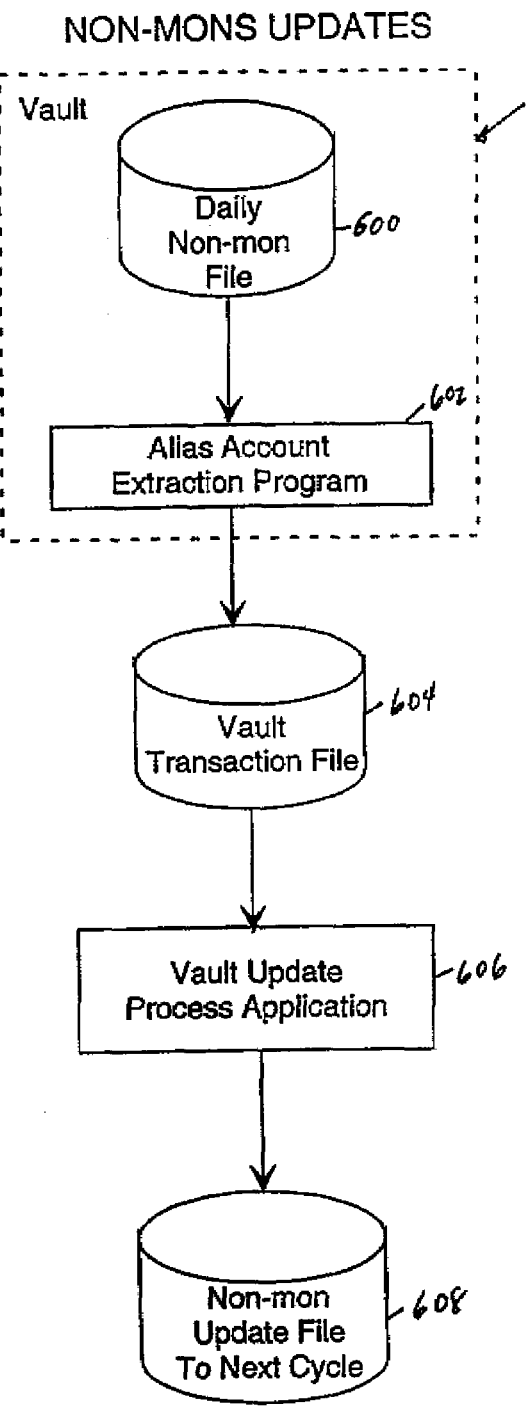
FIG. 8 is a block diagram illustrating a process for performing non mon updates, such as name and address changes, in the alias account system of the present invention.

FIG. 8 illustrates a process for performing non mon updates such as name and address changes. Daily non mon file 600 contains the records of the non mon updates to the primary accounts. The daily non file file 600 also includes tables of the sys/prin. number and non mon values associated with a non mon update. The sys/prin. number and non mon values within the tables are easily modified.

The daily non mon file 600 is stored and processed outside of the HPS's critical path. HPS 118 uses an extraction program 602 to read the daily non mon file 600 and create a vault transaction file 604 that is later transferred to vault 114. The extraction program 602 selects the records that are added to the transaction file 604 using the record's sys/prin. number and non mon values.

On a daily basis, vault transaction file 604 is transmitted to vault 114. The vault update process application 606, on the vault's server 122, takes the name and address changes from the vault transaction file 604 and posts them to the matching database 120. This ensures that the mailing labels have the correct mailing information. For changes that need to be propagated from the alias account in vault 114 to the associated primary account on HPS 118, a non mon update file 608 is created and transferred to HPS 118 for the next day's processing cycle.

An application program on HPS 118 provides a report and input to vault 114 of all changes made to the HPS database and processing counts. The application program selects the report entries in a manner similar to the alias account extraction program 602. This report will provide an audit trail of all transactions passed to vault 114.

As a safety precaution, HPS 118 is preferably configured to prevent a customer service representative (CSR) from making online changes to an alias account's name, address, social security number, and home and work phone number fields. These online changes to the alias account are blocked because those fields provide a means of compromising the cardholder's identity. To ensure that a cardholder's identity is not compromised and a CSR does not accidentally change these fields, the modification of these fields is assigned to vault 114.

Even though the issuer is prevented from making online name and address changes to the alias accounts, the issuer is able to make these modifications using tape transactions.

However, this procedure should preferably be avoided to ensure that the cardholder's identity is not compromised.

Figure 9:
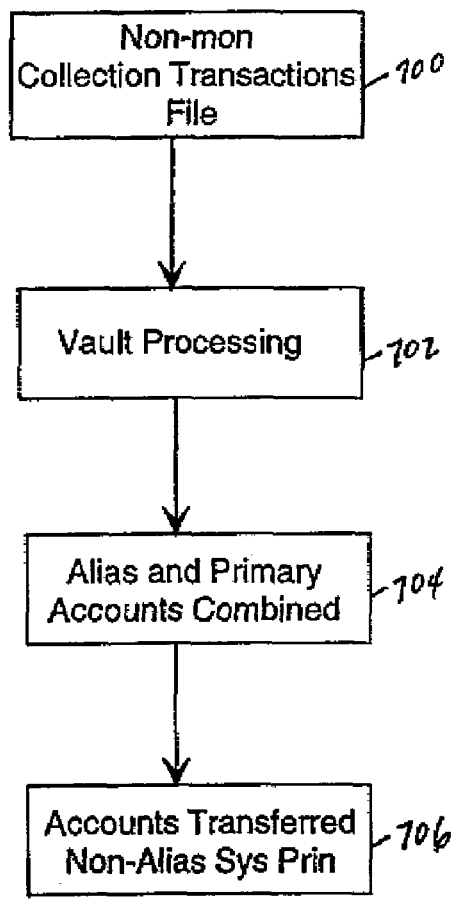
FIG. 9 is a block diagram illustrating the account closing process in the alias account system of the present invention.

It is always possible that the cardholder may want to close the alias or primary account. FIG. 9 illustrates the account closing process. In addition to name and address changes, account closings and personal identification numbers (PINS) associated with ATM transactions are also considered non mon changes. The account closing process starts at step 700. At step 700, HPS 118 transfers the non mon collection transactions file to the vault processing step 702. The non mon collection transaction file contains the primary and alias accounts that are going into collections. In step 702, the vault 114 receives the non mon collection transactions file and proceeds to step 704. At step 704, the vault 114 processes the collection transactions file and combines the two accounts. The accounts are combined, because the cardholder is charged an annual fee for the alias account that is charged on the primary account, and the issuer is paying for two accounts on HPS 118. The combined account is then transferred, at step 706, to a non alias sys/prin. number on HPS 118. Once the accounts are combined, all activity on the alias account is visible on HPS 118. In the preferred embodiment, regardless of whether the alias or primary account is closed, the account closing process remains the same.

Vault 114 also handles the non mon for setting account PINS. If the issuer wishes to allow ATM use of the alias account, the form for selection of a PIN is inserted with a mailing to the cardholder. The mailing process will be described in detail below.

Account Risk Management

In the preferred embodiment, HPS 118 uses a standard credit card authorization system. However, the issuer must establish a method for authenticating the cardholder of an alias account. In an embodiment of the invention, this is accomplished by using the alias "password" that was entered during account setup. The issuer should also have some special procedures to handle referrals and hot calls. Since none of the information on the alias account is real, a phone number is set in the phone number field that will allow the issuer to communicate with the vault and request contact with the cardholder.

In reporting a lost or stolen credit card or to confirm fraud, a cardholder must make a call to report each account. This allows the cardholder to maintain his or her anonymity. A first call is made to report the primary account as themselves and a second call is made to report the alias account with the alias name. For example, the caller may use the name "Pat G. Alias". If the issuer suspects fraudulent use of the alias account, the issuer must contact vault 114. Vault 114 will in turn contact the alias account holder.

Once a credit card is confirmed as lost or stolen or fraudulently used, HPS 118 handles both accounts in the same manner. The account status flag is changed and an instruction is executed to transfer activity to a new account. HPS 118 also issues a new plastic credit card. The instruction generated by HPS 118 is captured from a report file and used to update the matching database 120 in vault 114. Vault 114 monitors the account status flag to generate the appropriate actions. Vault 114 also maintains state images of the accounts to monitor multi step processes, and determines when a process is complete. Vault 114 provides account reports on completed operations.

Unlike the procedure described above, when an alias account or primary account becomes delinquent, the vault will receive notification to combine the two accounts for reporting and/or collection purposes. The customer account disclosures, provided to the customer on account setup to advise of account policies and procedures, inform the cardholders that if the alias or primary account becomes delinquent the alias account will be closed and combined with the primary account. The primary account will be transferred to a non alias sys/prin. number because it is no longer an alias account. The resulting new account is, then, placed into collections.

Customer Communications

In order to bill customers for credit card transactions, the HPS 118 produces on line alias account statements from archives and CD ROM's. All statements produced on line will contain the alias account address information. Statements printed for the alias accounts proceed through the HPS statement processing until they are ready for printing. Monthly statements for the alias accounts are treated as if the issuer or some other vendor is going to print them.

Figure 10:
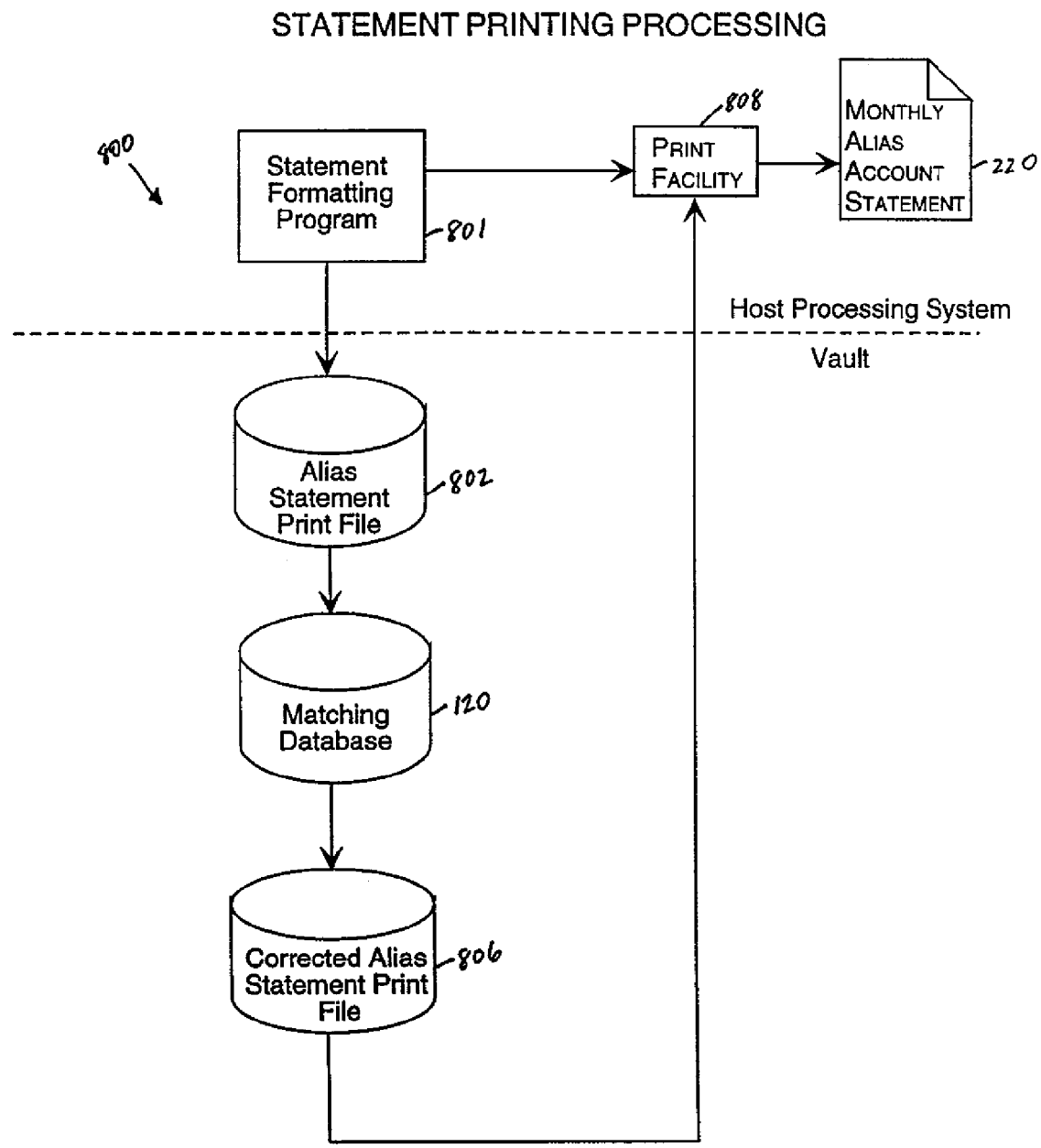
FIG. 10 is a block diagram illustrating an overview of the statement printing process of an embodiment of the present invention.
Figure 11:
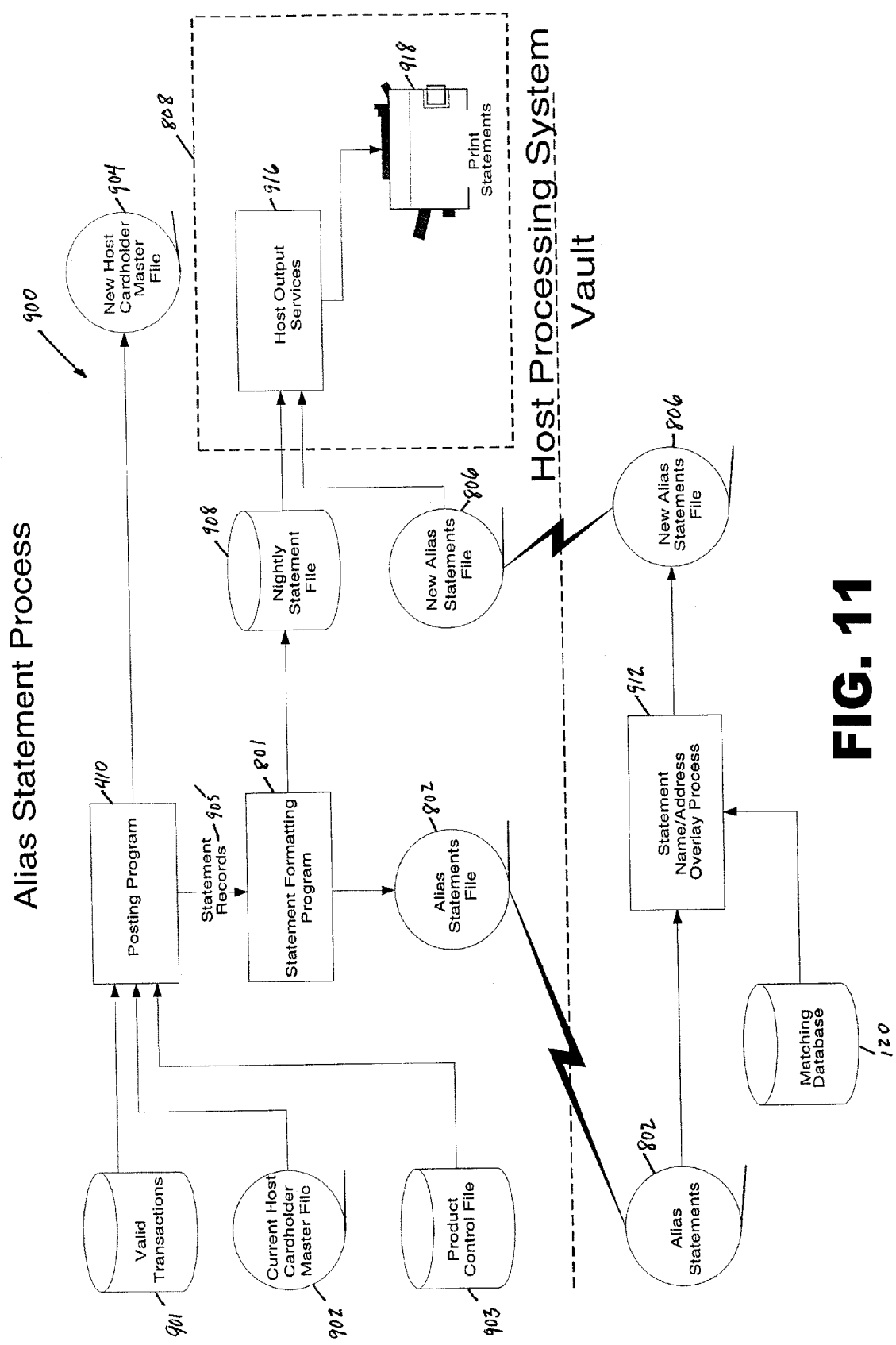
FIG. 11 is a general block diagram illustrating an embodiment of the alias statement process.

FIG. 10 is an overview of the statement printing process 800, while FIG. 11 illustrates a specific implementation of an alias statement process 900. In FIG. 10, a statement formatting process or program module 801 at the HPS 118 produces an alias statement print file 802 of the alias account statement addresses. The alias statement print file 802 is transmitted to vault 114 for processing. Vault 114 is not responsible for mail redirection. However, in accordance with the invention vault 114 supports mail redirection. It will be recalled that to support mail redirection, vault 114 maintains the matching database 120. In the vault 114, the matching database 120 is queried based on the apartment number of the alias address to located the real name and address of the account holder.

The matching database 120 includes the alias apartment number (key), the real name, and the real address. If the apartment number on the alias account statement is successfully located in the matching database 120, the real name and address that will be used for mailing the statement will be retrieved and used to construct a corrected alias statement print file 806. The corrected alias statement 5 print file 806 is then transmitted to a print facility 808 outside the vault 114 that prints the monthly alias account statement 220 with the name and address provided by the cardholder to which the alias statement is to be mailed. Print facility 808 is any facility that can receive an electronic print file and print the monthly alias account statement 220.

In addition to the above mailing requirements, it is also necessary for the vault 114 to replace the alias name and address on the payment coupon with the real name and address for the alias account statement. This will help limit compromising the identity of the cardholder.

In another embodiment of the invention, the security stub 106 (FIG. 1) is provided with an option for an alternate address for mailing the alias account statements. In this case, HPS 118 flags the alias accounts that have an alternate address and transfers them to the alias statement print file 802. The alias statement print file 802 is then transmitted to vault 114 for processing. The vault 114 receives the alias statement print file 802, recognizes the flagged alias accounts, and does not replace the alias address with the real address associated with the primary account, but assigns the alternate address received with the security stub information.

In a further embodiment of the invention, a copy of the matching database 120 is made available to the print facility 808 or a secured site on the Internet that makes the database available to mail distributors that need the information for relabeling. For example, a mail or parcel distributor working in association with the alias account system described herein may be operative to receive purchases made using an alias card, relabel the packages containing the purchases with the primary account address, and reship the packages to the primary account address. As another example, a mail or parcel distributor may effect the same package relabeling to the alternate address instead of the primary account address.

In a system utilizing a mail or parcel distributor, items of mail or parcels addressed to the alias address are received by a predetermined mail distributor that has been established for mail and parcel relabeling and reshipping. It will be appreciated that the alias address should preferably contain indicia (e.g. a data key) that enables the mail distributor to determine the proper real shipping address for each received piece of mail or parcel. For example, all mail or parcels shipped to "Apartment XXXXX, River Street, Des Moines, Iowa", might indicate a mail distributor's facility in Des Moines, Iowa. The "XXXXX" can be a special key unique to a particular alias account cardholder. Upon receipt of a piece of mail or parcel with a certain apartment number, the mail or parcel distributor uses the apartment number key to look up the appropriate relabeling address in the matching database, and prints a new label for reshipping the mail or parcel.

It will be appreciated that the address displayed in the envelope of a received piece of mail or on the label of a received parcel must be sufficient to signal special processing, as well as locate the correct name and address. The alias address, however, is preferably not a post office box, since some merchants will not ship to such an address.

As a signal to mail distributors that a mailed item requires special processing, the alias address may contain a special zip code. The zip code provides a means for mail distributors to determine that the piece of mail needs to be relabeled as part of their normal address scanning process. The zip code may also identify the facility that is assigned to handle the relabeling process.

With this embodiment of the present invention, the alias account holder can direct merchants to ship merchandise purchased with the alias card to the print facility 808 or the mail or parcel distributor for relabeling. This provides the alias cardholder with additional privacy. The alias cardholder is able to keep his or her anonymity, since there is no need to provide the merchant with a mailing address where the cardholder can be reached.

In HPS 118, other customer communications (letters, alias credit card, and PIN mailings) are mailed using the master file address that is associated with the alias account. As described above, vault 114 maintains a matching database 120 that is used to create mailing labels. The matching database 120 uses the apartment number of the alias address or the alias account number as the key to retrieving the real name and address. The real information is used to produce a new mailing label to place over the alias address. However, since this is an expensive process, the issuer may want to tam off most letters to avoid the additional postage and handling costs.

FIG. 11 illustrates the preferred embodiment of the alias statement process 900. To start the alias statement process, a valid transactions file 901, a current host cardholder file 902, and a product control file 903 are input to a posting program 410 (FIG. 6). The posting program 410 outputs a new host cardholder master file 904 and transfers the statement records 905 to a statement formatting program 801. In the statement formatting program 801, the alias account statements are separated into an alias statement print file 802 and transferred to vault 114. All other accounts are output to a nightly statement file 908 that is transmitted to a print facility 808 which includes host output services 916 and statement printer 918. At output services, the statements are produced on statement printer 918.

In vault 114, the alias statement print file 802 is input to the statement name/address overlay process 912. The statement name/address overlay process 912 uses the matching database 120 to retrieve the real names and addresses associated with the alias accounts. Once the real names and addresses are retrieved, the overlay process 912 replaces the names and addresses on the alias accounts in the alias statement file 802, with the real name and addresses and transfers them to a corrected alias statement print file 806. The corrected alias statement print file 806 is then transferred back to HPS 118 as an input to the print facility 808. At output services 916, the alias statements are produced on statement printer 918.

Remittance Processing

Primary account payments are handled in the same manner as any other credit payment. The primary account may use any options of payment the issuer wishes to make available. Unlike the primary account, however, there are some special considerations for handling the alias accounts. To handle the alias accounts, the issuer should preferably select a remittance processor. The remittance processor should preferably not use automatic payment options with alias accounts. The automatic payment options provide a means for the remittance processor to automatically charge a cardholder's checking account for the required payment. However, this requires that the cardholder's checking account number be stored on the HPS master file. Using this information, the alias and primary accounts can be matched and anonymity compromised.

In processing check payments for the alias account, the payment coupon for the alias account will have the cardholder's real name and address that will match their personal check. The payment coupon will also have the alias account number. However, the remittance processor does not have access to HPS 118, and additional information about the cardholder. Thus, the auto payment option and check payment processing provide a small risk that the cardholder's identity may be compromised at the remittance processor.

Vault Database

Figure 12:
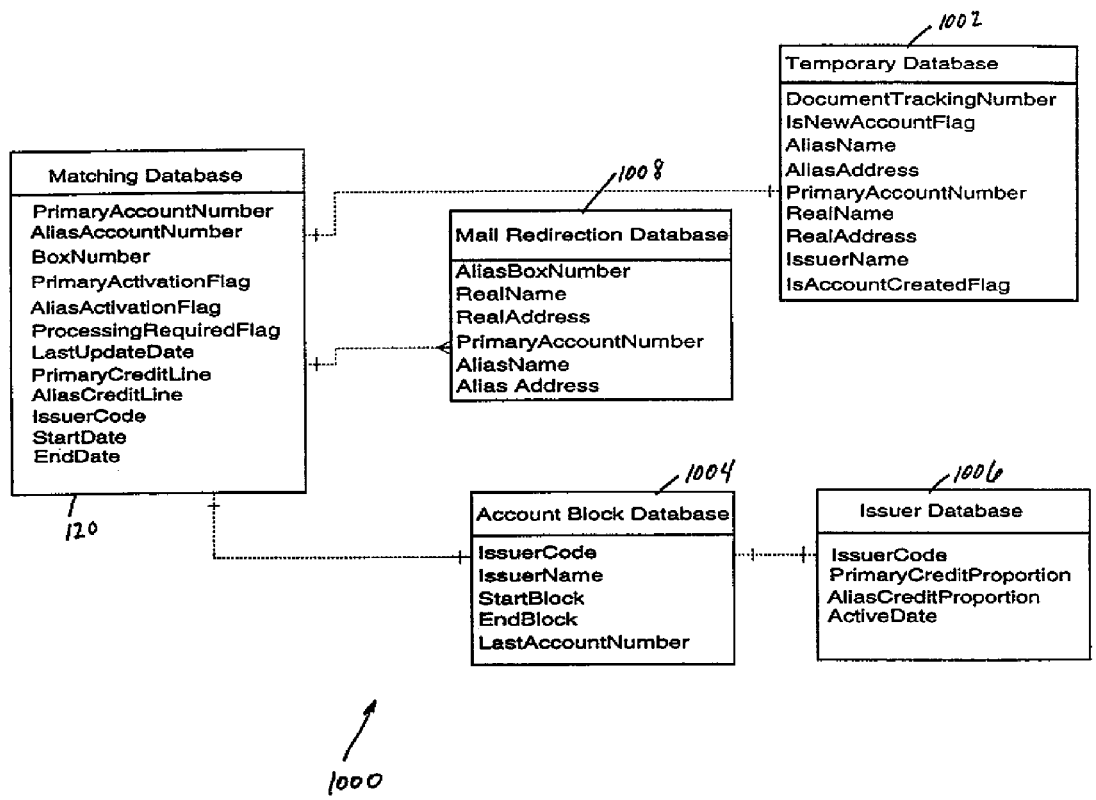
FIG. 12 is a block diagram illustrating the databases employed in the vault and their associated relationships.

FIG. 12 illustrates the databases 900 employed in the vault 114 and their associated relationships. The vault databases comprise a matching database 120 (FIG. 1), a temporary database 1002, an account block database 1004, an issuer database 1006, and a mail redirection database 1008. The matching database 120 contains the alias and primary account information for matching the name and address of the alias account on HPS 118 with the real name and address of the cardholder. The matching database 120 contains a number of fields for managing the alias account. FIG. 12 lists the fields contained in the matching database 120, and Table 1 of FIG. 13 provides a summary of some attributes associated with each of the listed fields for databases constructed in accordance with the invention. For example, the first row of Table 1 summarizes the field "IsNew." The columns of row one include the following: column one identifies the field name; column two identifies the data type associated with the "IsNew" field; and column three gives a description of the function of the field within the matching database.

The temporary database 1002 contains the alias and primary account information for creating the alias account in vault 114. FIG. 12 lists the fields used to create the alias account, and Table 2 of FIG. 14 provides a summary of some attributes associated with each of the listed fields. For example, the first row of Table 2 summarizes the field "PrimaryAccountNumber." The columns of row one include the following: column one identifies the field name; column two identifies the data type associated with the "PrimaryAccountNumber" field; and column three gives a description of the function of the field within the Temporary database.

The account block database 1004 contains the issuer's account number information. This information is used to assign the issuer's account numbers to the alias accounts. FIG. 12 lists the fields use to define the issuer's alias account numbers, and Table 3 of FIG. 15 provides a summary of some attributes associated with each of the listed fields. For example, the first row of Table 3 summarizes the field "IssuerCode." The columns of row one include the following: column one identifies the field name; column two identifies the data type associated with the "IssuerCode" field; and column three gives a description of the function of the field within the Issuer database.

The issuer database 1006 contains the issuer profile within vault 114. The issuer profile includes the issuer's system code, the date the issuer become active on the system, and the credit limit information associated with the issuer's accounts. FIG. 12 lists the fields use to define the profile, and Table 4 of FIG. 16 provides a summary of some attributes associated with each of the listed fields. For example, the first row of Table 4 summarizes the field named "IssuerCode." The columns of row one include the following: column one identifies the field name; column two identifies the data type associated with the "IssuerCode" field; and column three gives a description of the function of the field within the Issuer database.

The mail redirection database 1008 contains the alias and primary account for replacing the name and address on the alias account with the cardholder's real name and address. This is the address to which the cardholder's correspondences will be mailed. FIG. 12 lists the fields used to retrieve the cardholder's real name and address and Table of FIG. 17 provides a summary of some attributes associated with each of the listed fields. For example, the first row of Table 5 summarizes the field "AliasBoxNumber". The columns of row one include the following: column one identifies the field name; column two identifies the data type associated with the "AliasBoxNumber" field; and column three gives a description of the function of the field within the Mail Redirection database.

Alias Account Processing

Figure 18:
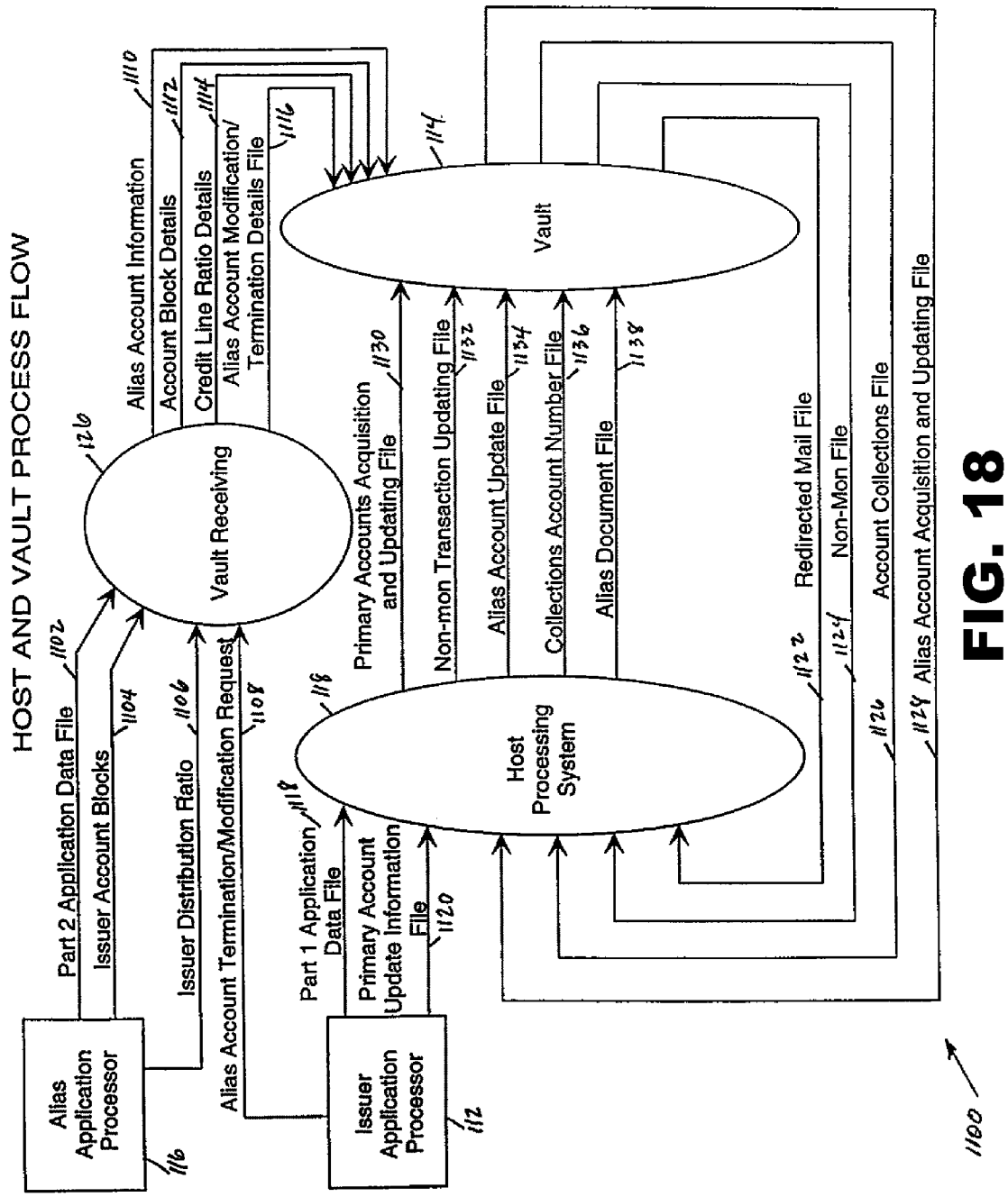
FIG. 18 is a flow diagram illustrating an overview of the host and vault process flow in an embodiment of the present invention.

FIG. 18 is a flow diagram illustrating an overview of the host and vault process flow 1100. To initiate the primary account setup process, the issuer inputs part I credit card application 104 to the issuer application processor 112. After the issuer processes the part 1 credit card application 104, the issuer transfers the part 1 application data file 1118 to HPS 118. The part I application data file 1118 provides HPS 118 with a document tracking number (DTN) 108 and the necessary information to setup a primary account.

The part 2 security stub 106 is input to the issuer's alias application processor 116 to set up an alias account. After the part 2 security stub 106 is processed, the alias application processor 116 transfers the part 2 application data file 1102 to vault receiving 126. The part 2 application data file 1102 is used to assign a password 107 and a DTN 110 that matches the DIN 108 on the part 1 credit card application 104. Alias application processor 116 also transfers the issuer account blocks data 1104 and issuer distribution ratio 1106 to vault receiving 126. Vault receiving 126, in turn, transfers the above information to vault 114 via alias account information 1110, account block details 1112, credit line ratio details 1114, and alias account modification/termination details file 1116. Vault 114 stores the part 2 application data file 1102 in temporary database 1006. Vault 114 uses the issuer account block data 1104 to assign the alias account number, and the issuer distribution ratio 1106 to split the credit limit assigned to the primary account with the alias account. Vault 114 also adds a record to the matching database 120. Matching database 120 stores information such as the primary and alias account numbers. Once the alias account information is stored in vault 114, it issues a non mon transaction via non mons file 1124 to HPS 118 to requests the part 1 application data file 1118. This information is transferred from HPS 118 to the vault 114 via the primary account acquisition and updating file 1130.

Once vault 114 receives the primary account information, it queries the temporary database 1006 for the associated alias account. The temporary database 1006 is queried using the document tracking numbers (DTN) 108 and 110. The alias account found and the primary account are associated in matching database 1002. Vault 114 also transfers a non coon transaction via non mon file 1124 to HPS 118. The non mon is transferred with the alias account acquisition and updating file 1128 to request the creation of the alias account on HPS 118. As a result of this process, two accounts exist on HPS 118. The primary account with the cardholder's real name and address and an alias account with an alias name and address.

To maintain the two accounts HPS 118 transfers various files to vault 114. HPS 118 transfers a primary accounts acquisition and updating file 1130, a non mons transaction updating file 1132, alias account update file 1134, collections account number file 1136, and an alias document file 1138. The primary accounts acquisition and updating file 1130 is used to update primary account information. For example, the primary account acquisition and updating file 1130 may contain an update for the cardholder's name, address, or account credit limit. The non mons transaction file 1132 contains the non monetary instructions to direct vault 114 to execute various functions. For example, the non mons transaction file may include instructions to flag the alias account for collections, to update the alias account details, or update the alias account credit line.

The alias account update file 1134 provides vault 114 with information to update the alias account. For example, the alias account update file 1134 may contain the information to change the credit limit on the alias account. The collections account number file 1136 contains the alias and primary account numbers that are going into collections on HPS 118. The alias document file 1138 transfers documents with an alias address and name to the vault 114 to have the alias name and address replaced with the cardholder's real name and address.

In response to the files and instructions transferred from HPS 118, vault 114 manipulates the primary and alias account information stored in the vault databases. This information is fed back to HPS 118 via alias account acquisition and updating file 1128, account collections file 1126, non mon transaction file 1124, and redirected mail file 1122. The alias account acquisition file and updating file 1128 provides HPS 118 with the credit limit information for the alias and primary account. The account collections file 1126 provides HPS 118 with the information to combine the primary and alias accounts before sending them to collections. The non mon transaction file 1124 serves a similar function as the non mon transaction updating file 1132. The redirected mail file 1122 provides HPS 118 with documents that have had the alias names and addresses replaced with the cardholder's real name and address.

If at any time the cardholder decides to modify or terminate the alias account, the card holder may enter a request via the issuer application processor 112. The issuer application processor 112 transfers alias account termination/modification request 1108 to vault receiving 126. Vault receiving 126 transfers the request to the vault 114 via alias account modification/termination details file 1116. In vault 114, the request is processed and the appropriate outputs are sent to HPS 118.

Account Acquisition Process

Figure 19:
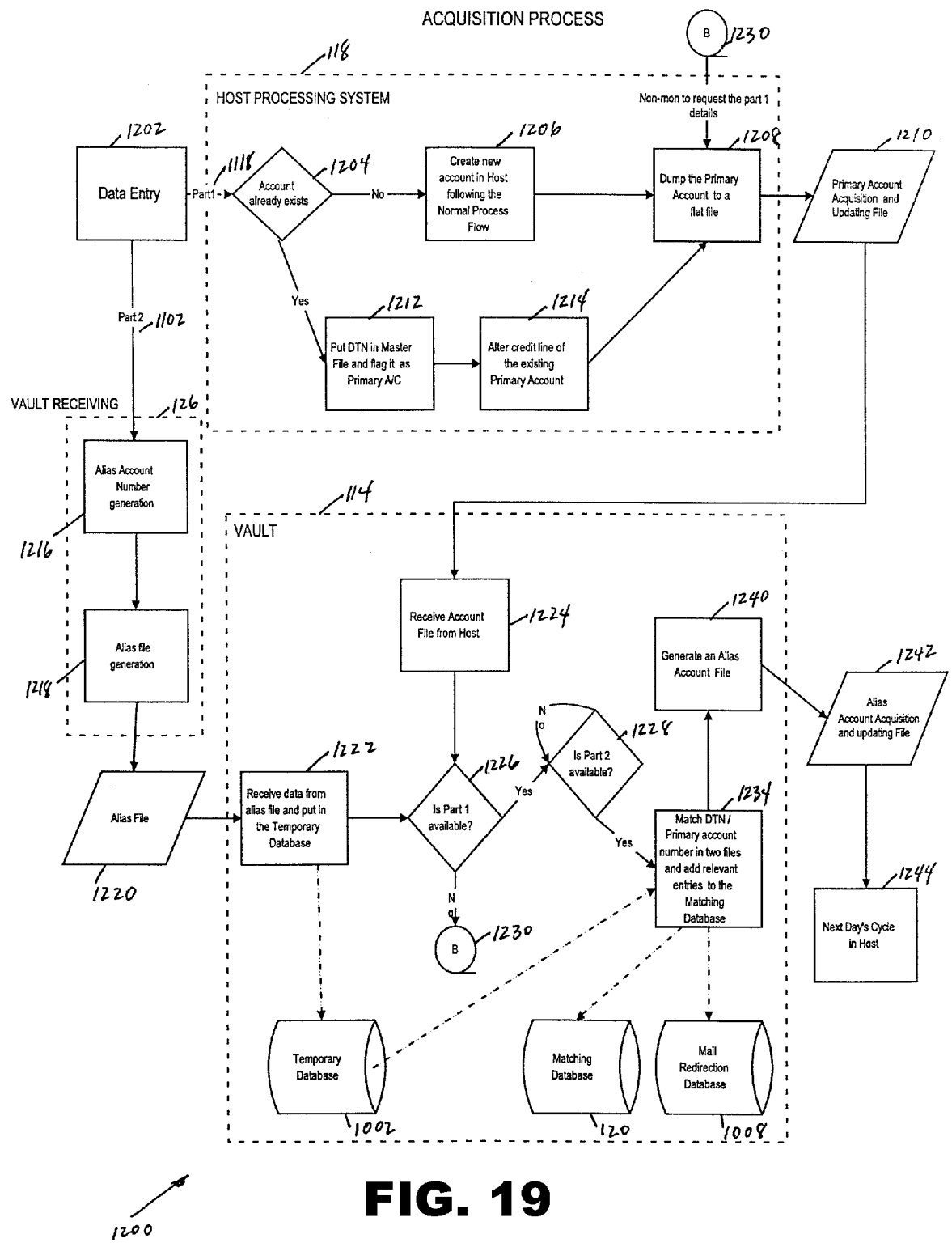
FIG. 19 is a flow diagram illustrating the account acquisition process of an embodiment of the present invention.

FIG. 19 illustrates the account acquisition process 1200. Account acquisition begins at data entry step 1202. The issuer application processor 112 and alias application processor 116 execute data entry step 1202. Once issuer application processor 112 completes data entry step 1202, the part 1 application data file 1118 is transmitted to the host processing system (HPS) 118. HPS 118 at decision block 1204 determines whether an account already exists. If an account already exists, the process proceeds to step 1212, where HPS 118 puts the DTN in the master file and flags it as a primary account. Once the existing account has been converted to a primary account, the credit line of the existing account is altered at step 1214. Then, the process proceeds from step 1214 to step 1208. At step 1208, the primary account is dumped into a file. From step 1208, the file is transferred to step 1210. At step 1210, the file, identified as the primary account acquisition and updating file, is transferred to vault 114 for processing.

If at decision block 1204 HPS 118 determines that an account does not exist, the process proceeds to step 1206. At step 1206, a new account is created in HPS 118. The new primary account is created following the normal process flow of HPS 118. From step 1206, the primary account is transferred to step 1208. At step 1208, the primary account is dumped into a file. Next, the process proceeds from step 1208 to step 1210, where the file, identified as the primary account acquisition and updating file, is transferred to vault 114 for processing.

Once alias application processor 116 completes data entry 1202, the part 2 application data file 1102 is transmitted to vault receiving 126. Vault receiving 126 receives the part 2 application data file 1102 and at step 1216 generates an alias account number. From step 1216, the process proceeds to step 1218, where vault receiving 126 also uses the part 2 application data file 1102 to generate an alias file 1220. The alias file is transferred from step 1218 to step 1220. At step 1220, the alias file is transferred to vault 114 for processing.

Next, at step 1222, vault 114 receives the data from the alias file and puts it in a temporary database 1002. From step 1222, the process proceeds to decision block 1226. At decision block 1226, vault 114 determines if part 1 of the application if available. If part 1 of the application is not available, the proceeds to step 1230. At step 1230, vault 114 transmits a non mon to request the part I application details. If part 1 of the application is available, the process proceeds to decision block 1228. At decision block 1228, vault 114 determines whether part 2 of the application is available. If decision block 1228 determines that part 2 is not available, vault 114 remains at step 1228 until part 2 of the application becomes available. However, if at decision block 1228 vault 114 determines that part 2 of the application is available, the process proceeds to step 1234. At step 1234, the vault 114 will match the DTN on the alias account with the primary account number, stored in two files, and add relevant entries to the matching database 120 (FIG. I) and mail redirection database 1008 (FIG. 12).

Once the vault 114 has matched the primary and alias account at step 1234, the process proceeds to step 1240. At step 1240, vault 114 generates an alias account file. Next, the alias account file is transferred from step 1240 to step 1242. At step 1242, the alias account file, identified as the alias account acquisition and updating file, is transferred to step 1244. At step 1214, the alias account acquisition and updating file is input to the next day's cycle on HPS 118.

Account Maintenance Process

Figure 20:
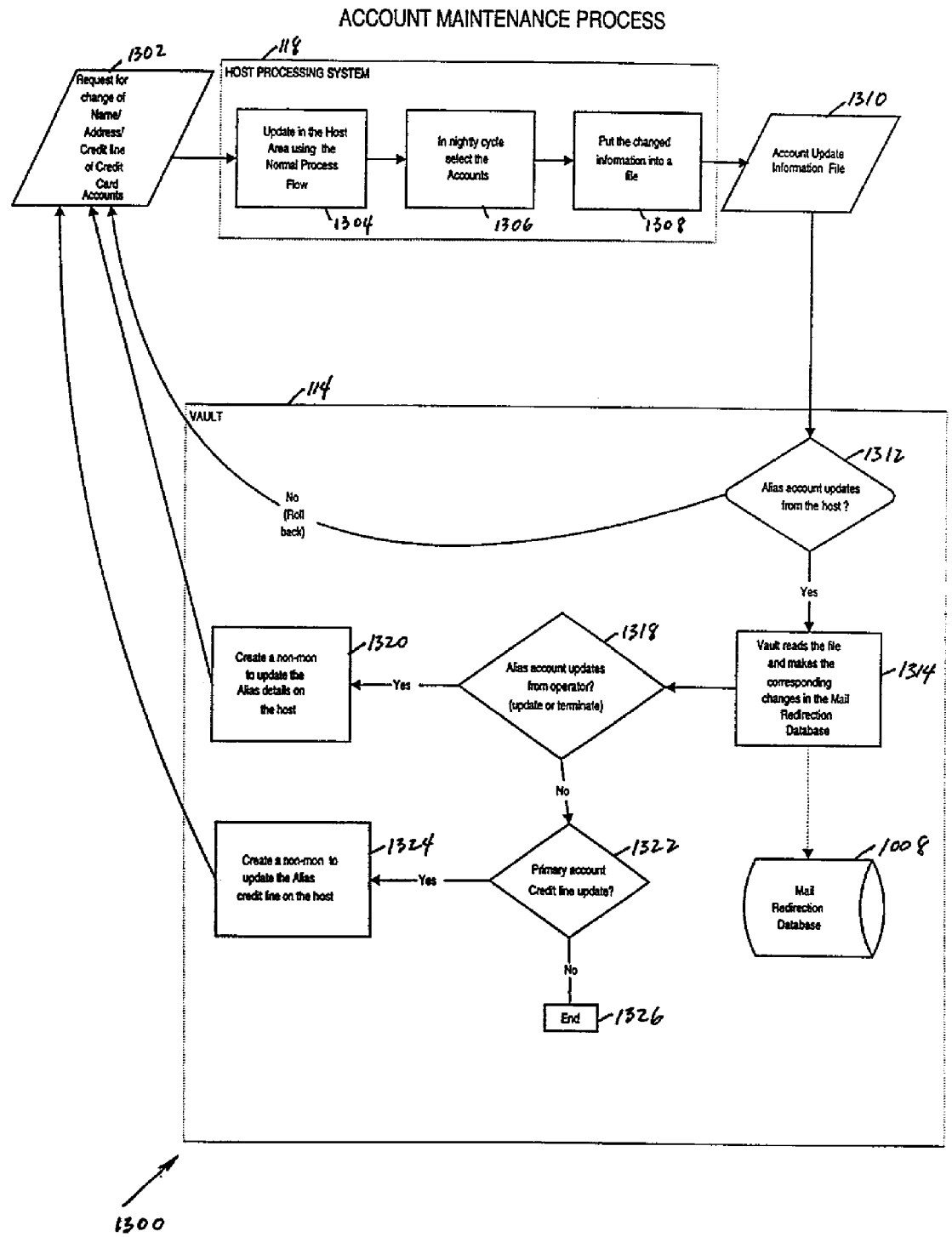
FIG. 20 is a flow diagram illustrating the account maintenance process in an embodiment of the present invention.

FIG. 20 illustrates the account maintenance process 1300. Account maintenance process 1300 is used to change and maintain the primary and alias account information. To initiate a change of name, address or credit line on an account, a request is made at step 1302 and transferred to the host processing system (HPS) 118. The request is then transferred to step 1304. At step 1304, HPS 118 will update, in the normal process flow, the associated account information in the host area. From step 1304, the process proceeds to step 1306. At step 1306, HPS 118 will select, in its nightly cycle, the accounts associated with the alias account system. Once those accounts are selected, the process proceeds to step 1308. At step 1308, the changes are put into a file. From step 1308, the file is transferred to step 1310. At step 1310, the file, identified as the account update file, is transferred to vault 114.

At decision block 1312, vault 114 determines if any alias account update information has been received from the host. If there is no update information received from the host, the process proceeds to step 1302 and waits for the next request. If at step 1312 vault 114 determines that HPS 118 has transferred update information, the process proceeds to step 1314. At step 1314, vault 114 reads the account update file and makes the corresponding changes in the mail redirection database 1008 (FIG. 12).

Once step 1314 is complete, the process proceeds to decision block 1318. At decision block 1318, vault 114 determines if there have been alias account updates from a system operator. If a system operator has made changes to alias accounts, the process proceeds to step 1320. At step 1320, vault 114 creates a non mon to update the alias details in the host (for a further discussion of non mon transactions refer to FIGS. 6, 8, and 9). At this point, the process returns to step 1302 and waits for a new request (change of name, address and/or credit limit).

If at decision block 1318, the vault 114 determines that an operator has made no changes to an alias account, the process proceeds to decision block 1322. At decision block 1322, vault 114 will determine if there has been a request for a primary account credit line update. If at decision block 1322, vault 114 determines that there is no request for a primary account credit line update, then the process proceeds to step 1326 and ends. However, if at decision block 1322, vault 114 determines that there is a request for a primary account credit line update, then the process proceeds to step 1324. At step 1334, vault 114 creates a non mon to update the alias account's credit line on the host. At this point, the process returns to step 1302 and waits for a new request (change of name, address and/or credit limit).

Collections Process

Figure 21:
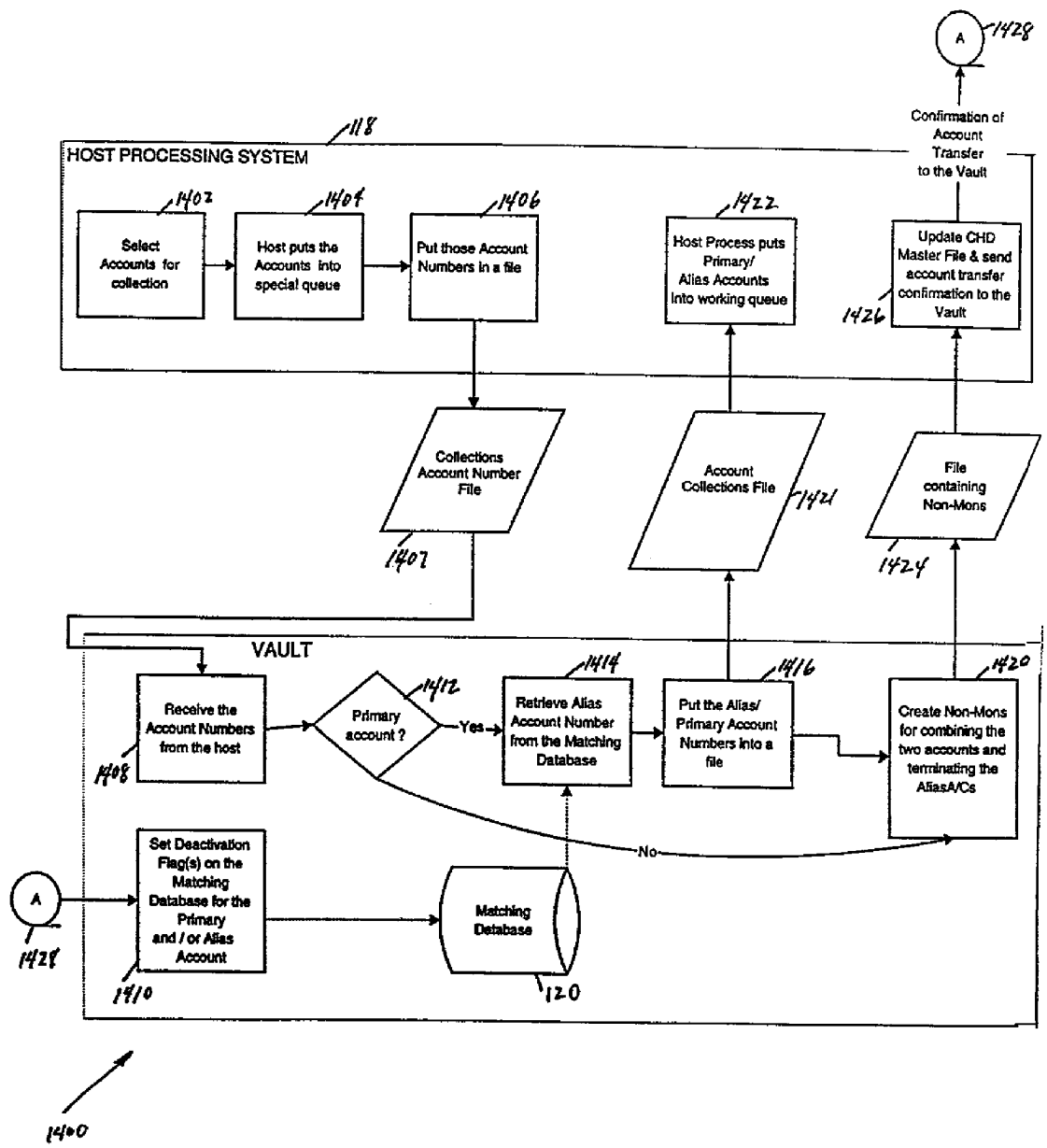
FIG. 21 is a flow diagram illustrating the collections process in an embodiment of the present invention.

FIG. 21 illustrates a collections process 1400. The collections process 1400 identifies the alias and/or primary accounts that are delinquent and going into collections on HPS 118, combines them in vault 114, and sends them to collections. The collections process 1400 begins at step 1402, where HPS 118 selects the accounts for collection. The process then proceeds to step 1404, where HPS 118 places the selected accounts in a special queue. From step 1404, the selected accounts are transferred to step 1406. At step 1406, HPS 118 transfers the account numbers of the selected accounts into a file. From step 1406, the process proceeds to step 1407. At step 1407, the file, identified as a collections account number file, is transferred to the vault 114.

At step 1408, the vault 114 receives the account numbers transferred from step 1407. From step 1408, the account numbers are transferred to decision block 1412. At decision block 1412, the vault 114 determines whether the account sent for collection is a primary account. If the account sent for collection is determined to be a primary account, the process proceeds from decision block 1412 to step 1414. In step 1414, vault 114 will retrieve the alias account number from the matching database 120. Next, the process proceeds from step 1414 to step 1416, where the alias and primary account numbers are put into a file. From step 1416, the alias and primary account numbers are transferred to step 1421. At step 1421, the file, identified as the account collections file, is transferred to step 1422. At step 1422, HPS 118 receives the file containing the alias/primary account numbers and puts them into a working queue.

If decision block 1412 determines that the account sent for collection was not a primary account, the process proceeds to step 1420. Similarly, from step 1416, the alias and primary account numbers are also transferred to step 1420. At step 1420, the alias and primary account numbers are also used to create non mons for combining the two accounts and terminating the alias account. From step 1420, the non mons are transferred to step 1424. At step 1424, the file containing non mons is transferred back to HPS 118. At step 1426, the HPS 118 receives the file containing the non mons transferred in step 1424. Next, the process proceeds to step 1428. At step 1428, HPS 118 updates the master file and sends an account transfer confirmation 1428 back to vault 114. When the vault 114 receives the confirmation 1428 at step 1410, vault 114, sets the deactivation flag in the matching database 120 for the primary and alias accounts.

Mail Redirection Process

Figure 22:
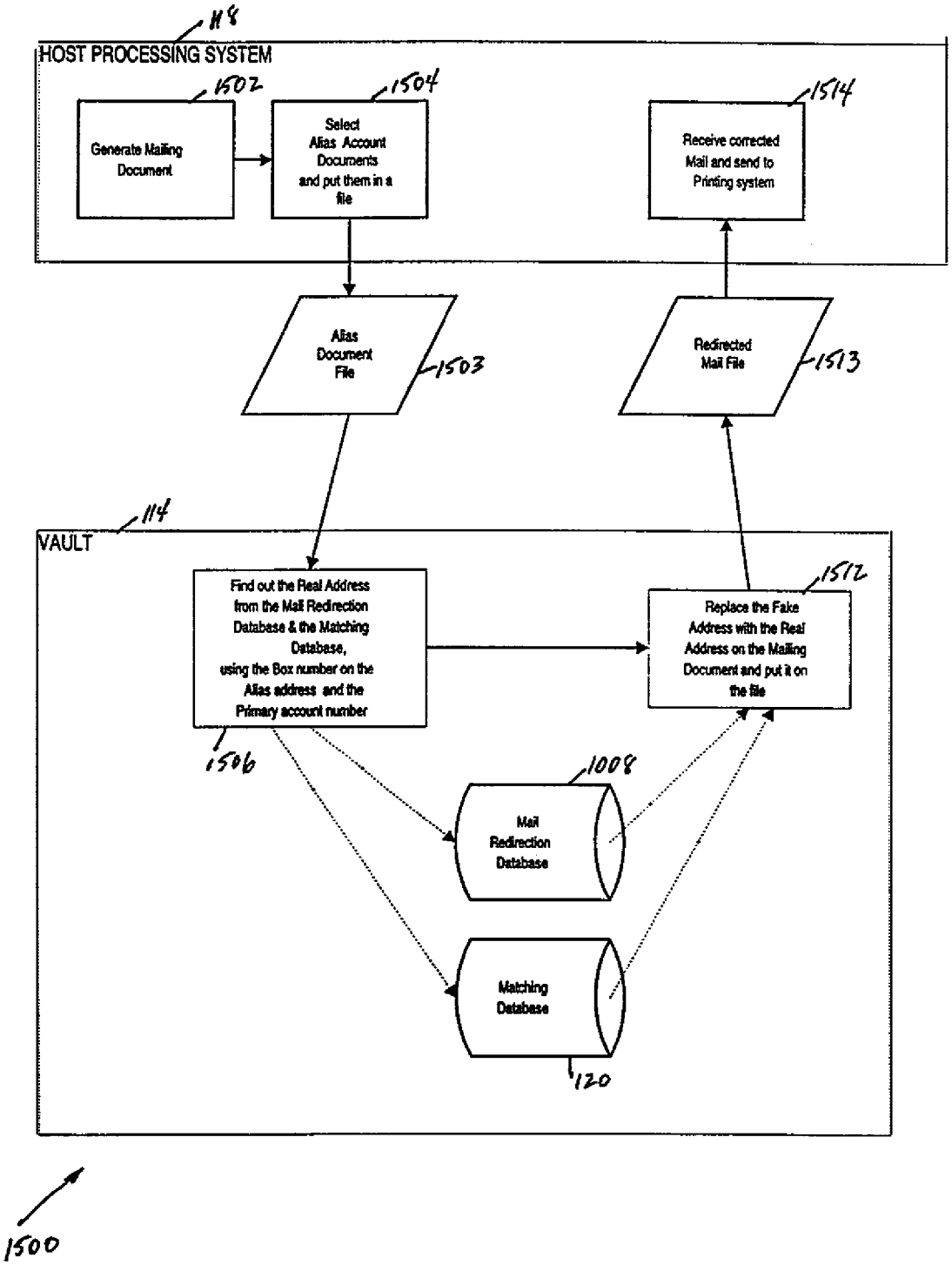
FIG. 22 is a flow diagram illustrating the mail redirection process in an embodiment of the present invention.

FIG. 22 is a flow chart illustrating a mail redirection process 1500. The mail redirection process 1500 is used to replace the alias name and address with the cardholder's real name and address on documents sent to the cardholder. Mail redirection process 1500 begins at step 1502, where HPS 118 will generate a mailing document. Next, the process proceeds to step 1504, where the host processing system (HPS) 118 will select the alias account documents and put them in a file. From step 1504, the process proceeds to step 1503. At step 1503, the file, identified as an alias document file, is transferred to vault 114.

Vault 114, at step 1506, receives the file transferred from step 1503. At step 1506, the vault 114, using the box number on the alias address and the primary account number, determine the real name and address from the mail redirection and matching databases 1008 and 120. Then, the process proceeds to step 1512. In step 1512, the vault 114 replaces the alias name and address with the real name and address on the document and placed them into a file. From step 1512, the file, identified as a redirected mail file, is transferred in step 1513 to HPS 118. The file transferred in step 1513 is received by HPS 118 in step 1514. In step 1514, HPS 118 receives the corrected mail and sends it to the printing system.

In view of the foregoing, it will be apparent that anonymous payment transactions are provided, enabled, and/or facilitated with regard to the account holders so as to avoid undesirable compromises of privacy and anonymity on the part of consumers in their financial transactions.

III. The "Kid" Card for Anonymous Transactions by Minors

The following is a description that depicts one example embodiment of the present invention. While this particular Kid Card embodiment is fully capable of attaining the above described features and benefits of the present invention, it is to be understood that the Kid Card embodiment represents a presently preferred embodiment of the invention and, as such, is merely a representative of the subject matter that is broadly contemplated by the present invention. It is further to be understood that the scope of the present invention fully encompasses embodiments other than the Kid Card and that the scope of the present invention is not limited by the following example embodiment.

In a preferred embodiment, the Kid Card is a credit or debit card that makes limited purchasing power available to children. Preferably, the transactions performed with the Kid Card are anonymous, and the products available for purchase with the Kid Card are subject to parental control. In one embodiment, children are guided through the shopping experience by the Web pages supplied by the hosting entity.

Anonymity

In a preferred embodiment, the transactions performed with the Kid Card are anonymous. For example, a child that purchases an item over the Internet uses the Kid Card to pay for the item. When real time approval is sought by the entity processing the transaction, rather than using true identity data to authenticate the transaction, an alias set of information is used as described above. This alias set of information is compared to an offline secure database in the bunker that compares the alias information to the true identity data and authenticates the transaction. In this example, the true identity of the purchaser is thus never compromised and therefore never available to the processing company for inclusion on a demographic list.

Parental Control

In one embodiment, parents can put restrictions on the types of items that the Kid Card may purchase. For example, the authenticating database might be configured to allow the purchase of only Type1 and Type2 items. Thus, if a child attempted to purchase a Type3 item such as adult content material or a Tommy Gun, the transaction would be denied. Alternatively, the parental control can take the form of restrictions on the products that are available for purchase. For example, a group of parents who have created a Web page can offer the Kid Card. In this example embodiment, the group controlling the content of the Web page additionally controls product availability by selecting the items that are available for purchase by children. Yet another example of parental control is based on a password scheme. In this embodiment, the service provider requires a password from the child before allowing the child to enter the shopping area. Based on that password and input the service provider has received from the parents, the products available to the child for purchase are filtered. Thus, the parents have control over what items are made available to their children by creating a shopping profile. Such a profile could be generated, for example, as part of the application process for the Kid Card.

ISP Guide

In a preferred embodiment, the Internet Service Provider ("ISP") acts as the guide to the children's shopping experience. For example, the ISP could be America On Line ("AOL") or any other provider. Alternatively, the entity providing the Kid Card service could be a web page and not an ISP at all. However, for simplicity in the example, AOL will be used as both the ISP and the entity providing the Kid Card service. In this example, AOL is the ISP. Additionally, AOL hosts a special "kids only" shopping area. The kids only shopping area may be accessible only with an additional password. The additional password could be assigned, for example, as part of the application process for the Kid Card. Because the kids only shopping area is within AOL, AOL is able to create the flow of the pages available to the children as they shop. Therefore, in this example, AOL guides the shopping children through the online store, displaying whatever advertisements and marketing materials deemed appropriate by AOL.

Credit/Debit Cards

In one embodiment, the Kid Card can be a credit card with a predetermined limit. Alternatively, the Kid Card can be a debit card with an available balance that has been paid in advance. For example, the application process for the debit Kid Card might require that a certain amount of money be prepaid on the debit Kid Card to cover any future purchases made with the card. In this example, when the funds are used up, the debit Kid Card no longer allows the purchase of goods. Additional funds must be paid to replenish the purchasing power of the Kid Card and allow the child to purchase additional goods. Alternatively, in the credit card embodiment, the Kid Card can purchase items up to a certain monetary limit. For example, if the credit limit was $200.00 then purchases equaling that amount can be made before payment is required. Additionally in this example, bills must be sent out by the company providing the Kid Card shopping service.

Prepaid Gift Cards

A feature of one embodiment is the availability of prepaid gift cards. These cards operate on the same principle as a debit card or a prepaid phone card. For example, a parent could purchase a Kid Card for $200.00 and give it as a gift to a child. The child is then able to purchase $200.00 worth of goods with the Kid Card. The difference in this example embodiment is that when the funds are exhausted on the gift Kid Card, the level of funds cannot be replenished.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

IV. Anonymous Shipping and Mailing Transactions

As stated, it is often desirable to protect the identity of consumers when ordering merchandise over the telephone, Internet or by any other means, when said merchandise is to be shipped to the residence or business of the consumer. The present invention provides a means for a consumer to order merchandise without revealing their true address to the merchant and/or shipper.

Figure 23:
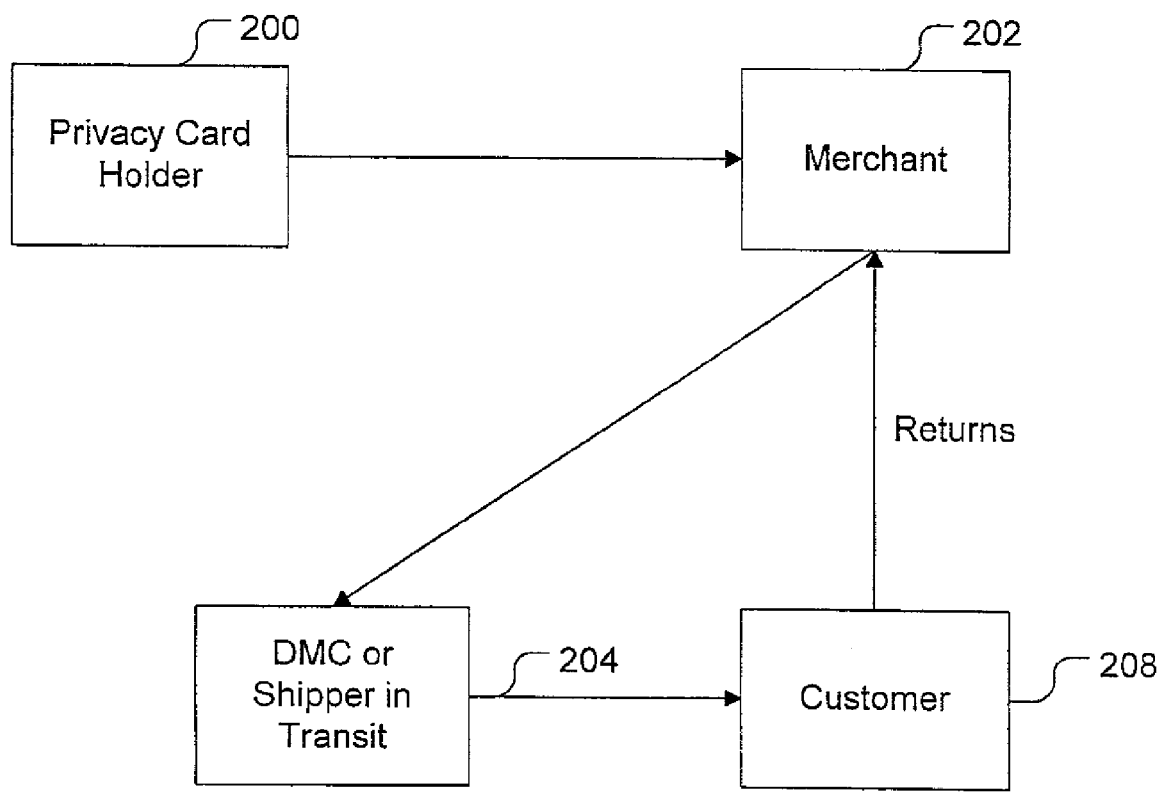
FIG. 23 is a schematic diagram that depicts one embodiment of the disguised mailing feature in accordance with one embodiment of the present invention.

FIG. 23 is a schematic diagram that depicts one embodiment of the disguised mailing feature in accordance with one embodiment of the present invention. As shown a cardholder 200 having an alias account, as described above, makes a purchase from a merchant 202. The purchase can be over the telephone, over the Internet or any other computer network, or via any other means available. The merchant uses the alias address associated with the alias account, as described above, to ship the package. In one embodiment, this alias address is a warehouse or the like, referred to herein as the disguised mailing center (DMC). Typically, a bin number associated with the Alias account is used to store the package in a specific location within the DMC. For example the Alias box number shown in the Mail Redirection data table 182, above, can be used for this purpose. The Alias box number is then used to generate a subscriber information request to the offline database to retrieve the true mailing address of the consumer. Once this address is obtained, the package is relabeled with the true address and sent to the consumer 208. Preferably, this takes place within twenty-four hours to avoid any further delays to the consumer. In case of returns, the consumer is provided with a mailing label that sends the package directly back to the merchant 202. Preferably, the return address printed on the return label will be that of the DMC 204. Alternatively, in a preferred embodiment, the relabeling process takes place by the shipper in transit. For example, the shipper can contact a server 22, which contacts the offline database with a request for address information. The shipper can then relabel the package with the true address while the package is in transit, and thereby eliminate any extra delays.

Figure 24:
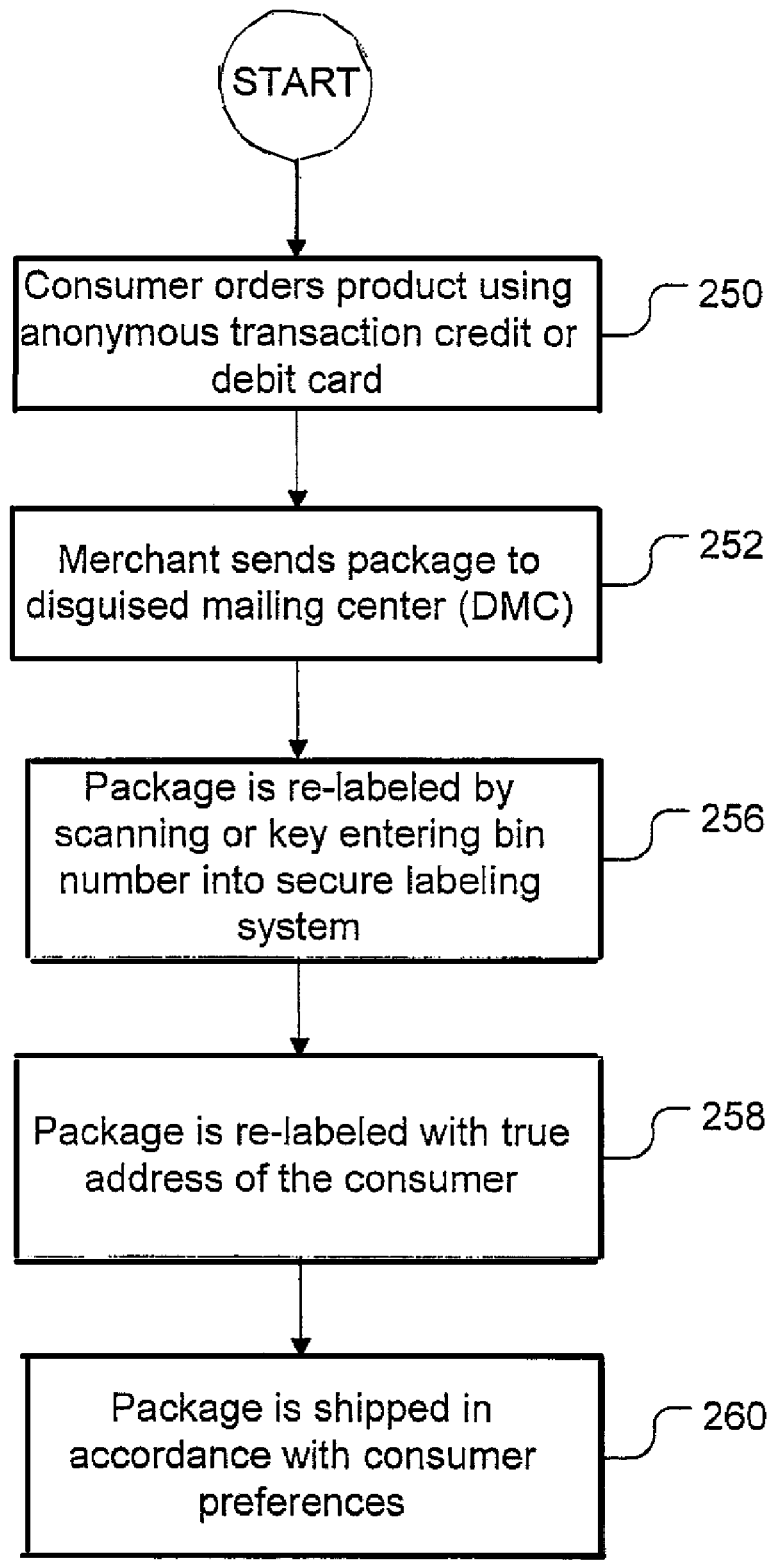
FIG. 24 is a flowchart depicting methods that can be used to implement the disguised mailing feature in accordance with an embodiment of the present invention.

FIG. 24 is a flow chart that depicts a process that can be used to relabel packages in accordance with one embodiment of the present invention as described above. First, as shown by step 250, the consumer orders a product using an anonymous transaction system in accordance with the present invention as described above. Accordingly, the user typically, uses an credit or debit card associated with an Alias account to purchase the merchandise. Next as indicated by step 252, the merchant mails the package (or directs a shipper to mail the package), to the Alias address. In one embodiment, the Alias address is a warehouse or a location referred to as a disguised mailing center (DMC). Next, as indicated by step 255, the bin number for set of characters) is input into a relabeling system. In one example embodiment, the bin number is a unique set of characters which is used to correlate an anonymous name/address (i.e. pseudonym) with a real name/address. The bin is read into the system by scanning in a bar code or the like that comprises the bin. Alternatively, this information can be keyed by hand into the system. In any case, this action generates a request to a server that in turn contacts the bunker for the true address of the consumer. Once this information is retrieved, the package is relabeled with the true address, as indicated by step 258. Finally, as indicated by step 260, the package is shipped to the consumer in accordance with consumer preferences (i.e. overnight, no signature necessary, etc.).

Figure 25:
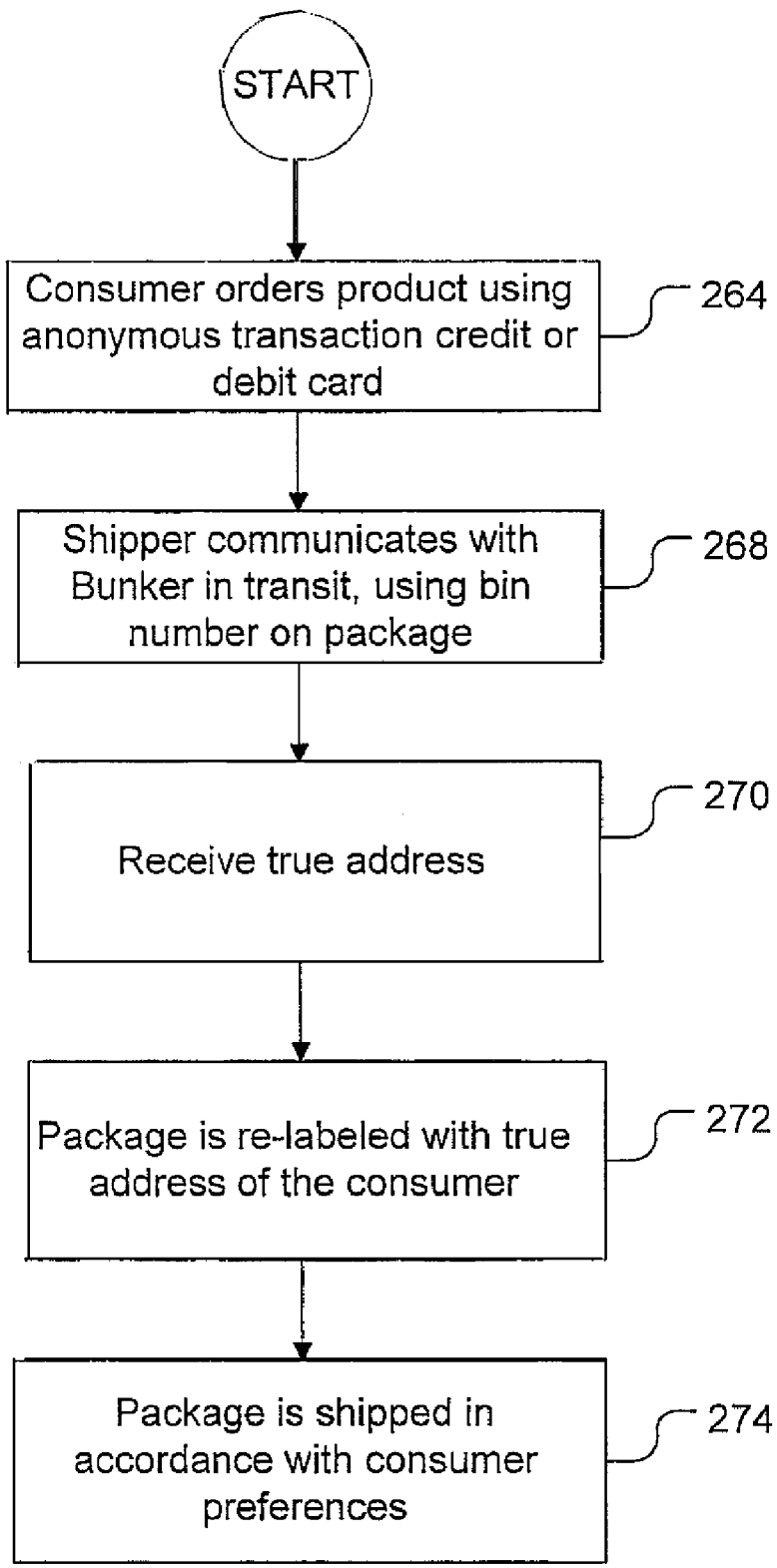
FIG. 25 is a flowchart depicting methods that can be used to implement the disguised mailing feature in accordance with an embodiment of the present invention.

A second example of a method that can be used to relabel packages is depicted by the process flowchart in FIG. 25. As indicated by step 264, the consumer orders a product from a merchant using an anonymous transaction system as described above. As described above, package is shipped using the Alias address associated with the account. Next, as indicated by step 268, the shipper issues a request to the bunker for the true address of the consumer. This is accomplished in a manner as described above, typically through a server 23. Again, the Alias address or bin number in this example, is used to identify the consumer. Next, as indicated by step 270, the shipper receives the true address of the consumer and relabels the package with that address, as shown by step 272. Finally, as indicated by step 274, the package is shipped to the consumer in accordance with consumer preferences (i.e. overnight, no signature necessary, etc.).

In a third embodiment, the anonymous mailing is accomplished by mailing the merchandise to post office box, which is rented by the credit card processing company, on behalf of the cardholder. The address associated with the cardholder alias name is the post office box assigned to the cardholder. In one embodiment, the post office box is as close geographically, to the actual address of the cardholder. In this example embodiment, the cardholder picks up the merchandise from the post office box in person.

Privacy concerns also arise in connection with shipments and mail delivery unrelated to a purchase. For example, a person may wish to enter sweepstakes and order catalogs and samples without revealing own identity. Although these "transactions" do not involve payments, personal information is obtained by the provider of the information or service (also a "merchant" hereinafter). Thus, the shipment methods and systems described above are also useful for private anonymous mail delivery service. Moreover, in our increasingly mobile society, mail and packages are often lost when a person moves to a new address. Although change of address forms may be filed with the United States Postal Service, they stay in effect for only a limited period of time; public entities are also notoriously unreliable. Private mail delivery service nicely solves these problems as well, by providing a relatively more stable mailing "address" coupled with reliance on a for profit, competitive entity having a self interest in customer service.

Figure 26:
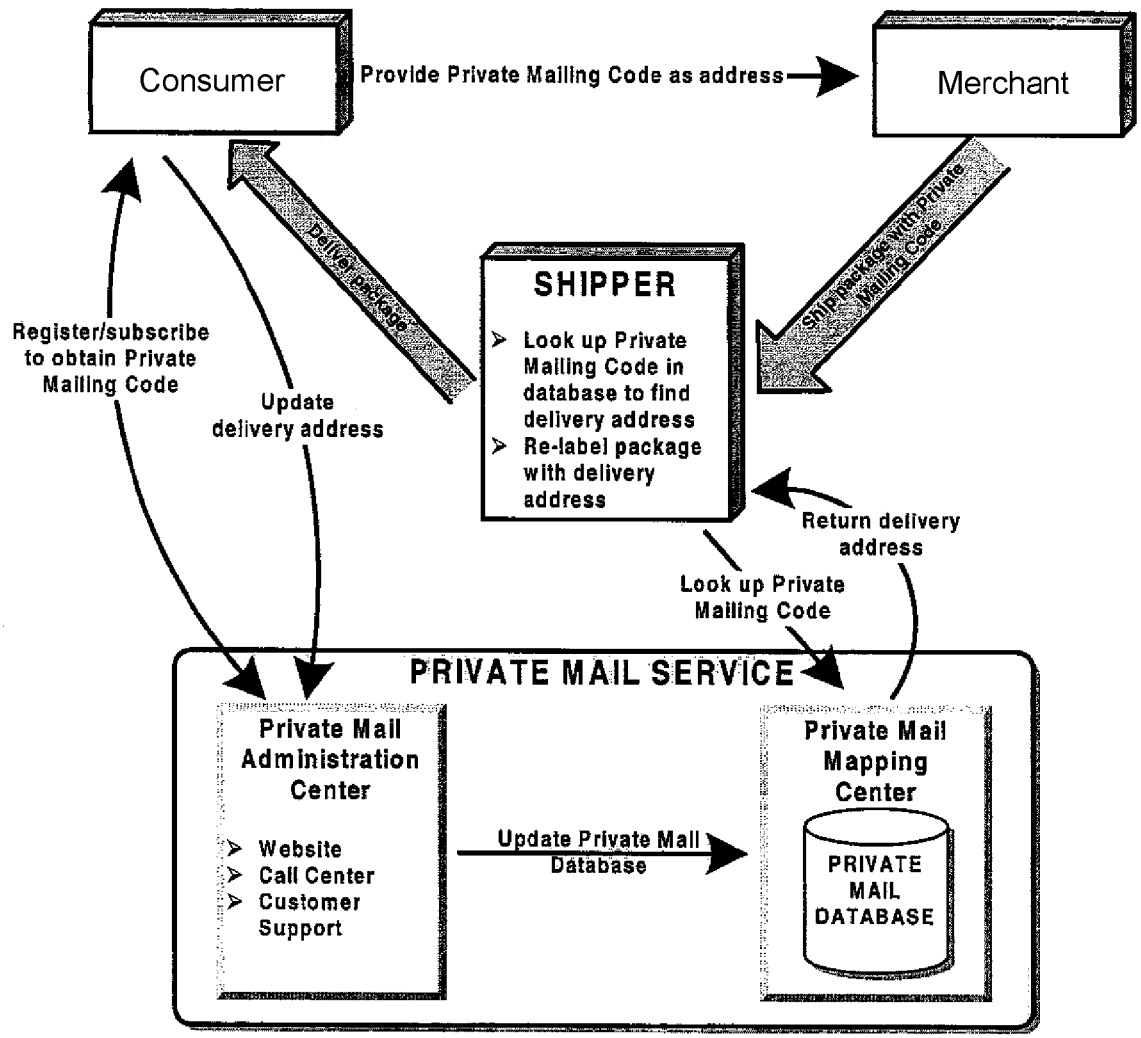
FIG. 26 illustrates information flow during package delivery using the private anonymous mailing service of the present invention.

One embodiment of such generic private mail service is depicted in FIG. 26. Initially, the consumer (301) registers with the private mail service ("PMS" 310), which can be conceptually divided into Private Mail Administration Service ("PMAS" 311) and Private Mail Mapping Center ("PMMC" 312). PMAC is responsible for customer registration and subscription, billing, assignment of Private Mail codes, and customer service functions such as changes to delivery address, modifying account data, canceling subscriptions, as well as various other account maintenance functions.

The PMAC is accessible to customers via the Internet, telephone, and mail, although any one contact method is sufficient. Full service is preferably available through each method of customer contact.

Figure 27:
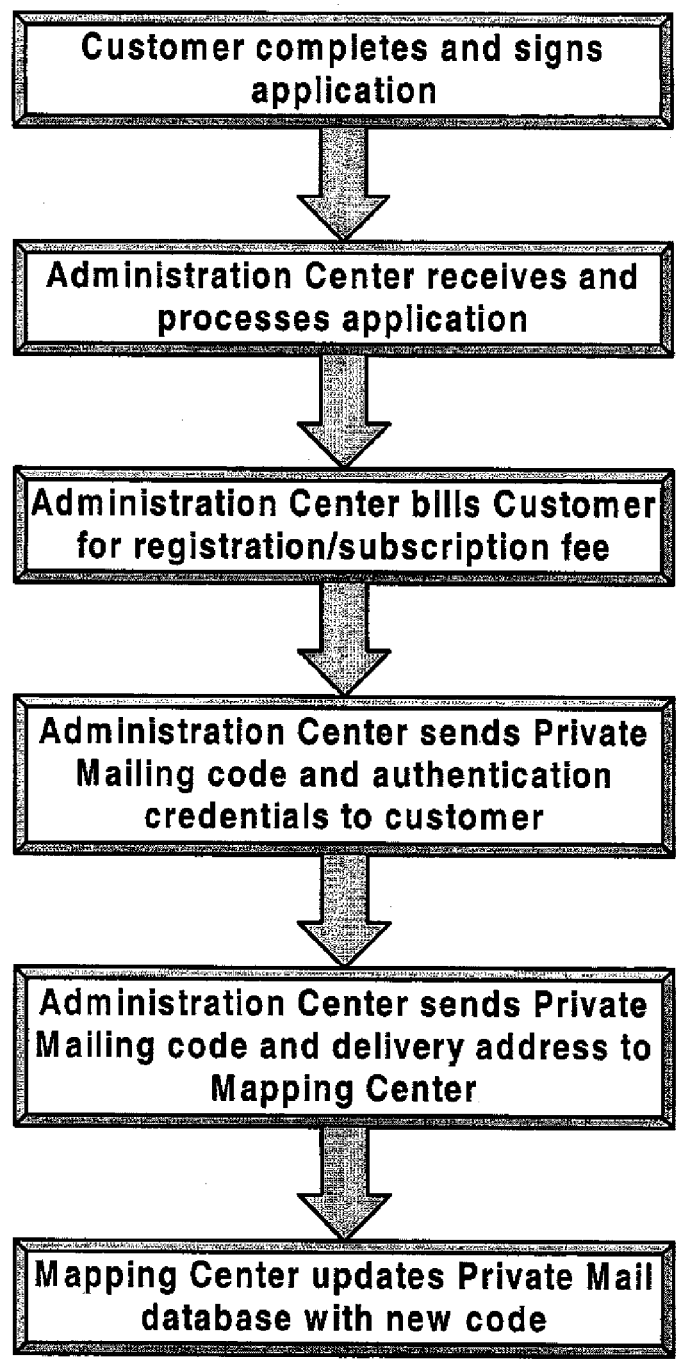
FIG. 27 is a flowchart of the customer registration process used in the private anonymous mailing service of the present invention.

During the registration process, see FIG. 27, the PMAC obtains customer name, billing information, mail delivery address, and possibly other information. Once these data are collected and processed, the PMAC assigns a unique Private Mail Code to a customer. The code is generated by automated Private Mail Code generation process, which assigns a unique character string to be used as the Private Mail code. Next, PMAC maps the code to the customer delivery address on record. More than one code may be generated for one customer.

In order to modify any subscription data, e.g., name or address, the customer will need to authenticate his identity. The authentication process may use a personal identification number (PIN), password, digital certificate, written signature, or other means of positive identification. Customer service is preferably available for PMAC activities, so that account changes and customer issues may be resolved quickly after a customer's registration or other relevant transaction is processed by the PMAC, the delivery address and associated Private Mailing code is added to the PMMC and stored in its database (313). If PMAC and PMMC are physically separate from each other, a secure communication link (314) should be established between them for information transfer. All updates to the PMMC database are preferable made in real or quasi real time. A "live" data backup in another physical location (not pictured) is preferably maintained, so that the data is redundantly stored and service need not be interrupted if PMMC fail or PMAC fail.

Generally, consumers will not be able to update the PMMC database directly, but will have to identify themselves and follow the registration and information updating protocol established by the PMAC, as previously described. The specific update functions that consumers will be able to perform include, but are not limited to creation of a new Private Mail code, deletion of an unwanted Private Mail code, and changes to the delivery address associated with a Private Mail code.

PMMC's main function is to provide shippers with the delivery address information associated with the Private Mail code. It includes a secure interface to allow the shippers to look up the delivery address associated with a Private Mail code. Additionally, the PMMC might handle administration functions associated with the shippers, such as access control to the PMMC, usage, and billing or payment of any transaction fees or service charges.

The PMMC is preferably a high availability service designed for continuous 2417 operations. This will be achieved through the use of redundant equipment, multiple physical data center locations, robust disaster recovery methods, and other means designed to prevent service interruptions. PMMC's database is highly secure, accessible only to authorized users. At a minimum, it maintains the following data: Private Mail code, physical delivery address, authorized users, and audit trail with date/time/user associated with each access.

Shippers' access to the PMMC database is restricted to lookup operations that map a Private Mail code to a delivery address, and to access to certain administrative functions of the PMAC that are used for troubleshooting, problem resolution, and account maintenance.

After a customer's registration is completed, the Private Mail Service is activated. Following activation, the customer has a brand new address (the Private Mailing code) assigned.

Figure 28:
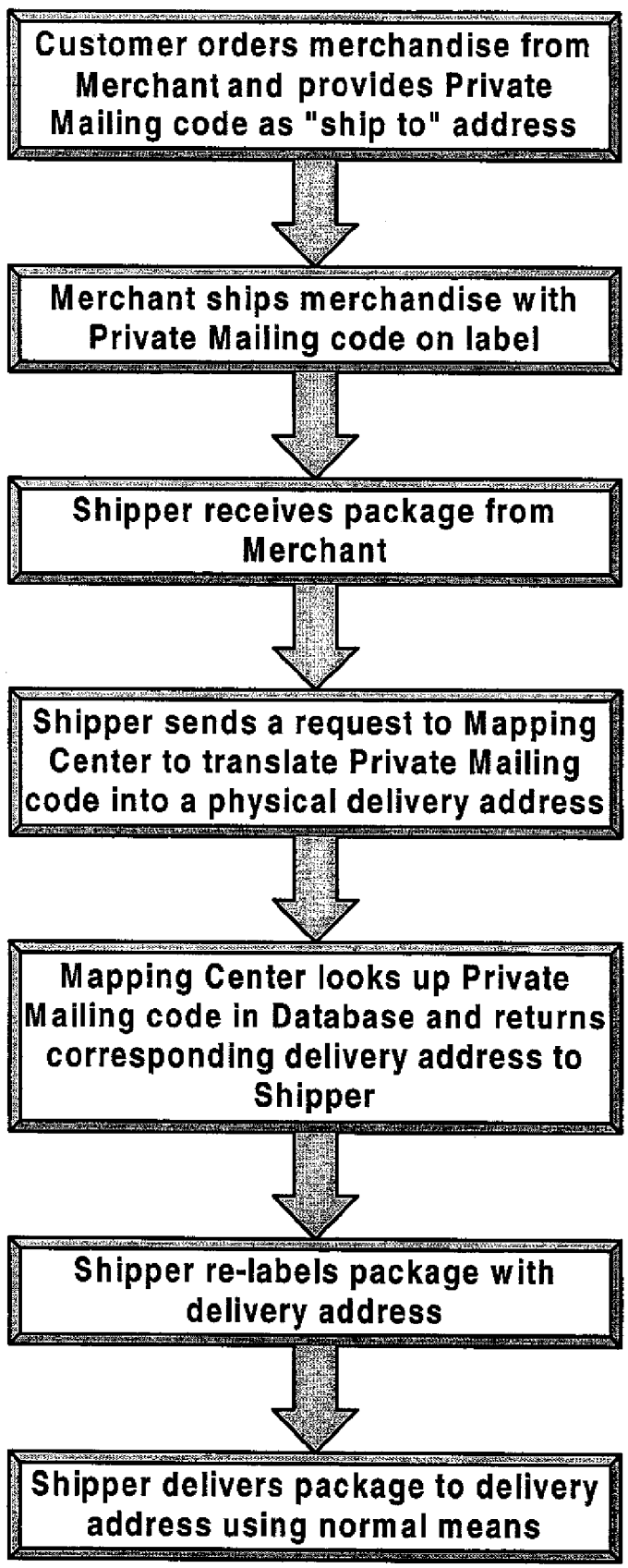
FIG. 28 is a flowchart of the merchandise shipment process in accordance with the private anonymous mailing service of the present invention.

FIG. 28 shows a flowchart of a typical transaction, which, of course, need not be a purchase, but instead may be any interaction that results in a mailing or shipping. The customer provides the Private Mail code to a merchant to enable the merchant to ship mail or parcels to the customer. Using the example of an online purchase, the customer orders from the merchant in the usual way, but supplies only the Private Mail code as the "ship to" address. The merchant then fills the order and labels it for shipment using only the Private Mail code. The parcel is picked up by the shipper. The shipper, a Private Mail partner, accesses the PMMC to map the Private Mail code on the parcel to the customer's physical delivery address. Once the mapping is completed, the shipper relabels the parcel, either physically or electronically, with the delivery address and completes the delivery using conventional means.

While various embodiments of the present invention have been described above, it should be understood that they have been presented by way of example only, and not limitation.

The invention claimed is:

1. A method for protecting anonymity of a consumer when ordering merchandise to be delivered to the consumer, the method comprising the steps of:
   ordering merchandise using an alias credit or debit card, wherein the alias credit or debit card has an associated pseudonym and an associated true name and address of the consumer;
   shipping the merchandise using the pseudonym, wherein the pseudonym includes an address associated with a disguised mailing center (DMC);
   communicating the pseudonym to an offline database to retrieve the true name and address associated with the pseudonym by the steps of:

generating a request for subscriber information to a central server;
processing the request at the central server;
sending the request from the central server to the offline database;
receiving a response including the true address from the offline database at the server; and
sending the response from the server to the DMC;
receiving the response including the true address;
relabeling the merchandise with the true address; and
shipping the merchandise from the DMC to the true address.

2. The method of claim 1, wherein the pseudonym comprises an alias address.

3. The method of claim 1, wherein the pseudonym further comprises an alias name.

4. The method of claim 1, further comprising the step of relabeling the merchandise with the true name.

5. The method of claim 1, wherein the pseudonym includes a bin number.

6. The method of claim 5, wherein the bin number is used as a destination within the DMC.

7. The method of claim 1, wherein the pseudonym is automatically scanned into a relabeling system.

8. A method for protecting anonymity of a consumer when ordering merchandise to be delivered to the consumer, the method comprising the steps of:
ordering merchandise using an alias credit or debit card, wherein the alias credit or debit card has an associated alias name/address and an associated true address of the consumer;
shipping the merchandise from a shipper using the alias name/address;
communicating the alias name/address to an offline database comprising the true address and the alias address; and
retrieving the true name/address and relabeling the merchandise with the true name/address, wherein the steps of communicating, retrieving, and relabeling are accomplished by the shipper while the merchandise is in transit.

9. The method of claim 8 wherein the communicating step is accomplished by the shipper using a wireless connection to a central server.

10. The method of claim 8, wherein said communicating step comprises the steps of:
generating a request for subscriber information to a central server while the merchandise is in transit by the shipper;
processing the request at the central server;
sending the request from the central server to the offline database;
receiving a response from the offline database at the server; and
sending the response from the server to the shipper.

11. The method of claim 8, wherein the alias address includes a bin number.

12. The method of claim 8, wherein the alias name/address is automatically scanned into a relabeling system.

13. A system for protecting anonymity of a consumer when ordering merchandise to be delivered to the consumer, the system comprising:
means for ordering merchandise using an alias credit or debit card, wherein the alias credit or debit card has an associated alias name/address and an associated true name/address of the consumer;
means for shipping the merchandise using the alias name/address, wherein the alias name/address is a disguised mailing center (DMC);
means for communicating the alias name/address to an offline database comprising the true name/address and the alias name/address; said communicating means comprising:
means for generating a request for subscriber information to a central server;
means for processing the request at the central server;
means for sending the request from the central server to the offline database;
receiving a response including the true name/address from the offline database at the server; and
sending the response from the server to the DMC;
means for receiving the response including the true name/address;
means for relabeling the merchandise with the true name/address; and
means for shipping the merchandise from the DMC to the true name/address.

14. The system of claim 13, wherein the alias name/address includes a bin number.

15. The system of claim 14, wherein the bin number is used as a destination within the DMC.

16. The system of claim 13, wherein the alias name/address is automatically scanned into a relabeling system.

17. A system for protecting anonymity of a consumer when ordering merchandise to be delivered to the consumer comprising:
means for ordering merchandise using an alias credit or debit card, wherein the alias credit or debit card has an associated alias name/address and an associated true name/address of the consumer;
means for shipping the merchandise from a shipper using the alias name/address;
means for communicating the alias name/address to an offline database comprising the true name/address and the alias name/address;
means for retrieving the true name/address; and
means for relabeling the merchandise with the true name/address,
wherein the means for communicating, retrieving, and relabeling are performed by the shipper while the merchandise is in transit.

18. The system of claim 17, wherein the means for communicating includes a wireless connection from the shipper to a central server.

19. The system of claim 17, wherein the means far communicating comprises:
means for generating a request for subscriber information to a central server while the merchandise is in transit by the shipper;
means for processing the request at the central server;
means for sending the request from the central server to the offline database;
means for receiving a response from the offline database at the seer; and
means for sending the response from the server to the shipper.

20. An anonymous mailing method for whipping an item from an item provider to a customer having a first physical delivery address, by a shipper, without disclosing to the item provider the first physical delivery address, the method comprising the following steps:
registering the customer with a private mail service by providing to the private mail service the customer's name and the first delivery address, creating a secret customer identifier, and providing the secret customer identifier to the customer;

generating a first unique personal mail code;

assigning the first unique personal mail code to the customer;

mapping the first unique personal mail code to the first physical delivery address;

the customer providing the first unique personal mail code to the item provider, and the item provider shipping the item to the shipper together with the first unique personal mail code;

receiving from the shipper a request to resolve the first unique personal mail code into a physical delivery address;

resolving the first unique personal mail code into the first delivery address; and returning to the shipper the first physical delivery address, thereby enabling the shipper to deliver the item to the customer at the location associated with the first physical delivery address.

21. The method according to claim 20, further comprising the step of providing a secure communication channel for receiving from the shipper the request to resolve and returning to the shipper the first delivery address.

22. The method of claim 21, further comprising the step of ordering the item from the item provider for delivery at the location associated with the first delivery address.

23. The method of claim 22, further comprising the steps of requesting the item by the customer from the item provider;

disclosing to the item provider the first code by the customer;

labeling the item with the first code; and giving the item to the shipper for shipment in accordance with the label.

24. The method of claim 22, wherein the code, the first delivery address, and the mapping from the first code to the first delivery address are stored at an offline database.

25. The method of claim 24, further comprising the step of retrieving the first delivery address from the offline database, the step of retrieving the first delivery address being performed after the step of resolving the code, and the step of retrieving the first delivery address being performed before the step of returning to the shipper the first delivery address.

26. The method of claim 21, further comprising the steps of:

relabeling the item physically or electronically with the first delivery address; and delivering the item to the physical location associated with the first physical address.

27. The method of claim 21, wherein the steps of mapping, resolving, receiving from the shipper a request, returning to the shipper the first delivery address, registering the customer, arid generating the first code are performed by the private mail service.

28. The method of claim 20, wherein the step of registering the customer further includes the step of:

confirming receipt of the secret customer identifier by the customer, thereby enabling the customer positively to identify the customer to the private mail service by submitting the secret customer identifier.

29. The method of claim 20, further comprising the steps of:

receiving from the customer a request to change the customer' mail code;

after receiving from the customer the request to change, requesting the customer to positively identify the customer; and after the customer is identified,
a) generating a second unique personal mail code,
b) assigning the second unique personal mail code to the customer,
c) mapping the second unique personal mail code to die first physical delivery address, and
d) deleting the mapping of the first unique personal mail code to the first physical delivery address.

30. The method of claim 21, further comprising the step of registering the shipper with the private mail service, the step of registering the shipper including the steps of providing the shipper with means for accessing the secure communication channel.

31. An anonymous mailing method for shipping an item, from an item provider to a customer, by a shipper, without disclosing to the item provider the customer's physical delivery address, the method comprising the following steps:

registering the customer with a private mail service, including the steps of,
a) receiving by the private mail service the customer's name and the customer's first physical delivery address,
b) receiving customer payment by the private mail service,
c) selecting a secret customer identifier,
d) sending the secret customer identifier to the customer, and
e) confirming receipt of the secret customer identifier by the customer, thereby enabling the customer positively to identify the customer to the private mail service by submitting the secret customer identifier, storing the customer's name, the customer's first physical delivery address, and the secret customer identifier in a database;

generating a first unique personal mail code;

assigning the first unique personal mail code to the customer;

mapping the first unique personal mail code to the customer's first physical delivery address;

receiving from the customer a request to update the customer's physical delivery address;

after receiving from the customer the request to update, requesting the customer to positively identify the customer;

after the customer is identified, receiving from the customer the customer's second physical delivery address;

storing the customer's second delivery address in the database;

asking the customer whether the customer requires a new personal mail code;

if the customer requires a new personal mail code,
a) generating a second unique personal mail code,
b) assigning the second unique personal mail code to the customer, and
c) mapping the second unique personal mail code to the customer's second physical delivery address;

receiving from the shipper a request to resolve the second personal mail code into a physical delivery address;.

resolving the second personal mail code into the customer's second physical delivery address; and returning to the shipper the customer's second physical delivery address, thereby enabling the shipper to

47 deliver the item to the customer at the location associated with the customer's second physical delivery address.

32. A private mail system for shipping an item from an item provider to a customer at a physical delivery address, by a shipper, without disclosing to the item provider the customer's physical delivery address, the system comprising:
   a customer registration facility for receiving a physical delivery address associated with a particular customer;
   a facility mapping a predetermined mail code to the particular customer's physical delivery address;
   a communication mechanism for communicating with a shipper that has received an item from the item provider and a mail code associated with the item, the mechanism for communicating with the shipper including a mechanism for receiving from the shipper a request to resolve the mail code associated with the item into a physical delivery address and a mechanism for returning to the shipper a physical delivery address; and
   a mechanism for resolving the mail code associated with the item into the particular customer's physical delivery address by determining that the mail code associated with the item is the predetermined mail code, whereby communicating the customer's physical delivery address to the shipper enables the shipper to deliver an item labeled with the predetermined mail code to the customer's physical delivery address.

33. The system of claim 32, further comprising:
   a mail code generator;
   a mechanism for assigning the mail code to the customer; and
   a database for storing the customer's name, the customer's physical delivery address, the mail code, and the mapping between the mail code and the customer's physical delivery address.

34. The system of claim 33, further comprising:
   an identifier for positively identifying the customer; and
   a shipper registration facility, wherein
   a) the means for returning to the shipper the customer's physical delivery address is inoperative until the shipper registers with the system, and
   b) the means for communicating is a secure encrypted electronic means for communicating.

35. A method for a credit card processing system to manage accounts in order to accomplish an anonymous credit card transaction, comprising the steps of:
   a) providing an alias account for a credit cardholder on the credit card processing system that is associated with a first credit card and identifies the cardholder with an alias identity;
   b) providing a primary account for the credit cardholder on the credit card processing system that is associated with a second credit card and identifies the cardholder with the cardholder's real identity; and
   c) providing a secure database to create a relationship between the alias account and the primary account to carry out the credit card processing functions;
   and further comprising the steps of:
   d) transmitting a message containing account information associated with the alias account and identified by the alias identity from the credit card processing system to a mail distributor;
   e) receiving a message with the alias identity at the mail distributor's facility and identifying the message as a message identified with the alias identity;

48 f) accessing a database from the mail distributor's facility and retrieving the real identity from the primary account associated with the alias account;
   g) substituting the alias identity with the real identity retrieved from the primary account; and
   h) transmitting the message identified with the real identity from the mail distributor to the cardholder.

36. A method for managing accounts to accomplishing an anonymous transaction, comprising the steps of:
   a) receiving an application at a processing system that identifies an existing account and based on the application converts the existing account to a primary account that identifies the cardholder with the cardholder's real identity;
   b) receiving a security stub at a secure database containing information to setup an alias account identified with an alias identity and in response to receiving the security stub creating an alias account and providing a request to the processing system to forward the primary account information to create a second primary account that corresponds with the primary account in the processing system;
   c) in response to the processing system receiving the request for the primary account information, the processing system forwards the primary account information to the secure database to create a second primary account that corresponds to the primary account created in the credit card processing system;
   d) in response to receiving the primary account information, the secure database forwards the alias account information to the processing system to create a second alias account that corresponds with the alias account in the secure database;
   e) creating a relationship in the secure database between the alias account and the primary account to carry out the credit card processing functions with the cardholder's real identity only known to the secure database;
   and further comprising the steps of:
   f) transmitting a message containing account information associated with the second alias account and identified by the alias identity from the credit card processing system to the secure database;
   g) receiving the message in the secure database and locating the second primary account associated with the alias account;
   h) retrieving the real identity from the second primary account associated with the alias account;
   i) substituting the alias identity on the message with the real identity retrieved from the second primary account; and
   j) transmitting the message identified by the real identity from the secure database back to the credit processing system for forwarding to the cardholder.

37. A method for managing accounts to accomplishing an anonymous transaction, comprising the steps of:
   a) receiving an application at a processing system that identifies an existing account and based on the application converts the existing account to a primary account that identifies the cardholder with the cardholder's real identity;
   b) receiving a security stub at a secure database containing information to setup an alias account identified with an alias identity and in response to receiving the security stub creating an alias account and providing a request to the processing system to forward the primary account information to create a second primary account that corresponds with the primary account in the processing system;

c) in response to the processing system receiving the request for the primary account information, the processing system forwards the primary account information to the secure database to create a second primary account that corresponds to the primary account created in the credit card processing system;

d) in response to receiving the primary account information, the secure database forwards the alias account information to the processing system to create a second alias account that corresponds with the alias account in the secure database;

e) creating a relationship in the secure database between the alias account and the primary account to carry out the credit card processing functions with the cardholder's real identity only known to the secure database;

and further comprising the steps of:

f) transmitting a message containing account information associated with the second alias account and identified with the alias identity from the credit card processing system to a mail distributor;

g) receiving the message identified with the alias identity at the mail distributor's facility and recognizing the message as a message identified with the alias identity;

h) accessing a database from the mail distributor's facility and retrieving the real information associated the second primary account associated with the alias account;

i) substituting the alias identity on the message with the real identity retrieved from the second primary account; and j) transmitting the message from the mail distributor to the cardholder.

38. A system for managing credit card accounts on a credit card processing system to accomplishing an anonymous credit card transaction, comprising:

a) an alias account for a credit cardholder on the credit card processing system that is associated with a first credit card and identifies the cardholder with an alias identity;

b) a primary account for the credit cardholder on the credit card processing system that is associated with a second credit card and identifies the cardholder with the cardholder's real identity;

c) a secure database to create a relationship between the alias account and the primary account to carry out the credit card processing functions with the cardholder's real identity being only known to the secure database; and d) a message containing account information associated with the second alias account and identified by the alias identity that is transferred from the credit card processing system to the secure database, wherein the secure database, i) receives the message associated with the second alias account and retrieves the real identity from the second primary account associated with the alias account; and ii) substitutes the alias identity on the message with the real identity retrieved from the second primary account and transmits the account information the from the secure database back to the credit processing system for forwarding the card holder.

39. A system for managing credit card accounts on a credit card processing system to accomplishing an anonymous credit card transaction, comprising:

a) an alias account for a credit cardholder on the credit card processing system that is associated with a first credit card and identifies the cardholder with an alias identity;

b) a primary account for the credit cardholder on the credit card processing system that is associated with a second credit card and identifies the cardholder with the cardholder's real identity;

c) a secure database to create a relationship between the alias account and the primary account to carry out the credit card processing functions with the cardholder's real identity being only known to the secure database;

d) a message containing account information associated with the second alias account and identified with the alias identity that is transferred from the credit card processing system to a mail distributor;

e) a system at the mail distributors facility for receiving the message identified with the alias identity at the mail distributors facility and recognizing the message as a message identified with the alias identity; and f) a database for accessing the real identity associated the second primary account from the system at the mail distributor's facility and using the real identity to transmit the message to the cardholder.

40. A method for processing an anonymous credit card transaction on a credit card processing system, comprising the steps of:

a) receiving at a credit card processing system a requests for approval of a credit card transaction from a merchant;

b) providing approval of the credit card transaction and transmitting an authorization to the merchant;

c) processing the credit card transaction that has been authorized on an alias account that identifies a cardholder with an alias identity;

d) transmitting the credit card transaction that has been processed on a periodic basis to a secure database to located a primary account associated with the alias account that identifies the cardholder with a real identity;

e) substituting the credit card transaction's alias identity with the real identity retrieved from the primary account; f) transmitting the credit card transaction back to the processing system for forwarding to the cardholder;

further comprising the steps of, g) transmitting a message containing account information associated with the alias account and identified with alias identity from the credit card processing system to a mail distributor;

h) receiving the message with the alias identity at the distributor's facility and recognizing the message as a message identified with the alias identity;

i) accessing a database from the mail distributor's facility and retrieving a real identity from the primary account associated with the alias account;

j) substituting the alias identity with the real identity retrieved from the primary account; and k) transmitting the message identified with the real identity from the distributor to the cardholder.

41. A method for protecting anonymity of a consumer when ordering merchandise to be delivered to the consumer, the method comprising the steps of:

ordering merchandise using an alias credit or debit card, wherein the alias credit or debit card has an associated pseudonym and an associated true name and address of the consumer;

shipping the merchandise using the pseudonym, wherein the pseudonym includes an address associated with a disguised mailing center (DMC);

automatically scanning the pseudonym into a relabeling system;

communicating the scanned pseudonym to an offline database to retrieve the true name and address associated with the pseudonym;

receiving the true address from the offline database;

relabeling the merchandise with the true address; and shipping the merchandise from the DMC to the true address.

42. The method of claim 41, wherein the pseudonym comprises an alias address.

43. The method of claim 41, wherein the pseudonym further comprises an alias name.

44. The method of claim 41, further comprising the step of relabeling the merchandise with the true name.

45. The method of claim 41, wherein said communicating step comprises the steps of:

generating a request for subscriber information to a central server;

processing the request at the central server;

sending the request from the central server to the offline database;

receiving a response including the true address from the offline database at the server; and sending the response including the true address from the server to the DMC.

46. The method of claim 41, wherein the pseudonym includes a bin number.

47. The method of claim 45, wherein the bin number is used as a destination within the DMC.

48. An anonymous mailing method for shipping an item from an item provider to a customer having a first physical delivery address, by a shipper, without disclosing to the item provider the first physical delivery address, the method comprising the following steps:

registering the customer with a private mail service by providing to the private mail service the customer's name and the first delivery address, creating a secret customer identifier, sending the secret customer identifier to the customer, and confirming receipt of the secret customer identifier by the customer so as to enable the customer positively to identify the customer to the private mail service by submitting the secret customer identifier;

generating a first unique personal mail code;

assigning the first unique personal mail code to the customer;

mapping the first unique personal mail code to the first delivery address;

the customer providing the first unique personal mail code to the item provider, the item provider shipping the item to the shipper together with the first unique personal mail code;

receiving from the shipper a request to resolve the first unique personal mail code into a physical delivery address;

resolving the first unique personal mail code into the first delivery address;

returning to the shipper the first delivery address, thereby enabling the shipper to deliver the item to the customer at the location associated with the first physical delivery address;

receiving from the customer a request to change the customer's unique personal mail code;

after receiving from the customer the request to change, requesting the customer to positively identify the customer, and after the customer is identified,
 a) generating a second unique personal mail code,
 b) assigning the second unique personal mail code to the customer,
 c) mapping the second unique personal mail code to the first physical delivery address, and
 d) deleting the mapping of the first unique personal mail code to the first physical delivery address.

49. The method according to claim 47, further comprising the step of providing a secure communication channel for receiving from the shipper the request to resolve and returning to the shipper the first delivery address.

50. The method of claim 47, further comprising the step of ordering the item from the item provider for delivery at the location associated with the first delivery address.

51. The method of claim 49, further comprising the steps of requesting the item by the customer from the item provider;

disclosing to the item provider the first code by the customer;

labeling the item with the first code; and giving the item to the shipper for shipment in accordance with the label.

52. The method of claim 49, wherein the code, the first delivery address, and the mapping from the first code to the first delivery address are stored at an offline database.

53. The method of claim 51, further comprising the step of retrieving the first delivery address from the offline database, the step of retrieving the first delivery address being performed after the step of resolving the code, and the step of retrieving the first delivery address being performed before the step of returning to the shipper the first delivery address.

54. The method of claim 47, further comprising the steps of:

relabeling the item physically or electronically with the first delivery address; and delivering the item to the physical location associated with the first physical address.

55. The method of claim 47, wherein the steps of mapping, resolving, receiving from the shipper a request, returning to the shipper the first delivery address; registering the customer, and generating the first code are performed by the private mail service.

56. The method of claim 47, further comprising the step of registering the shipper with the private mail service, the step of registering the shipper including the steps of providing the shipper with means for accessing the secure communication channel.

* * * * *